Nov. 13, 1945.    R. E. FRICKEY ET AL    2,388,683
METHOD AND APPARATUS FOR DETECTING FLAWS IN RAILS
Filed March 26, 1941    19 Sheets-Sheet 1
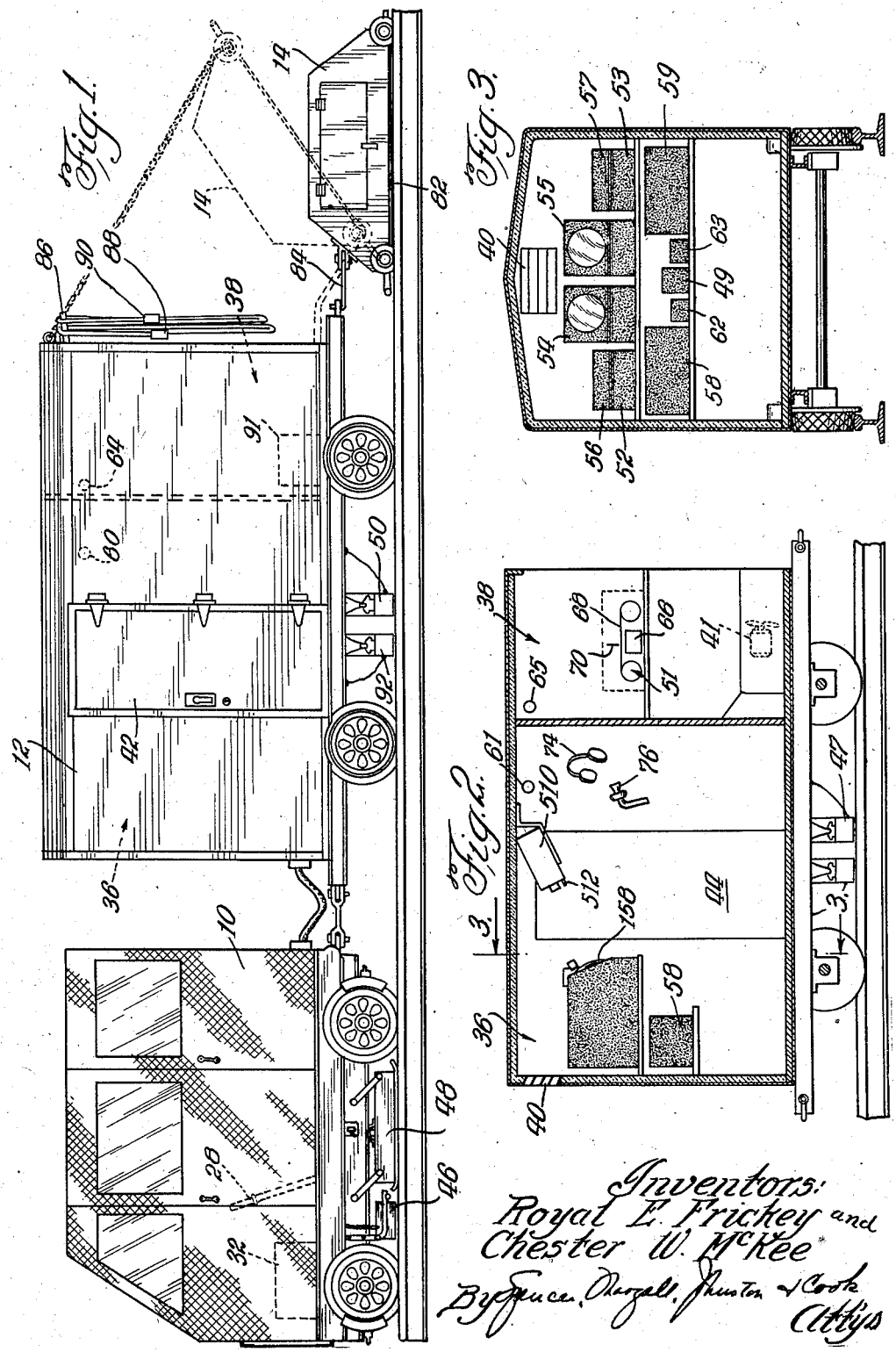
Inventors:
Royal E. Frickey and
Chester W. McKee

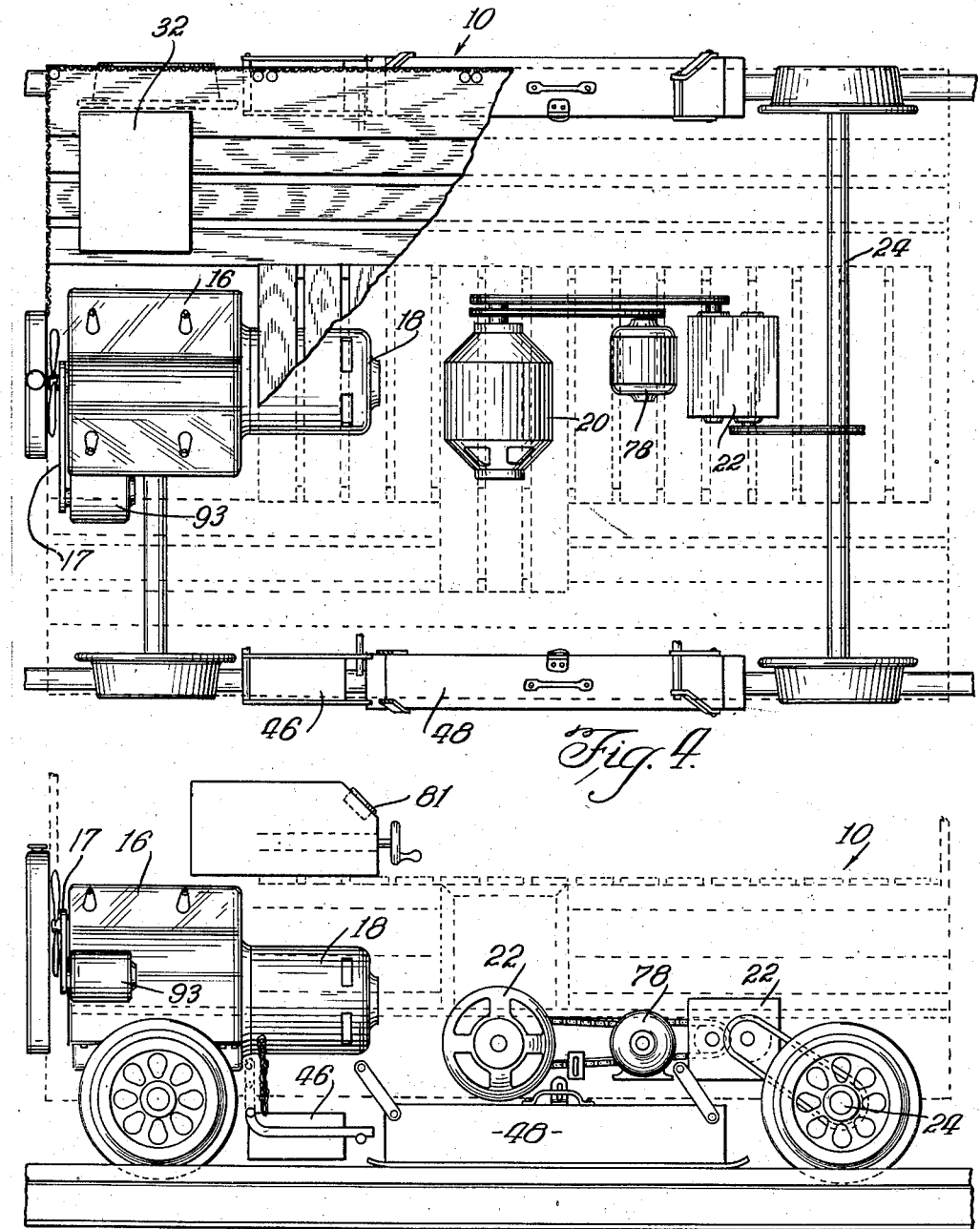

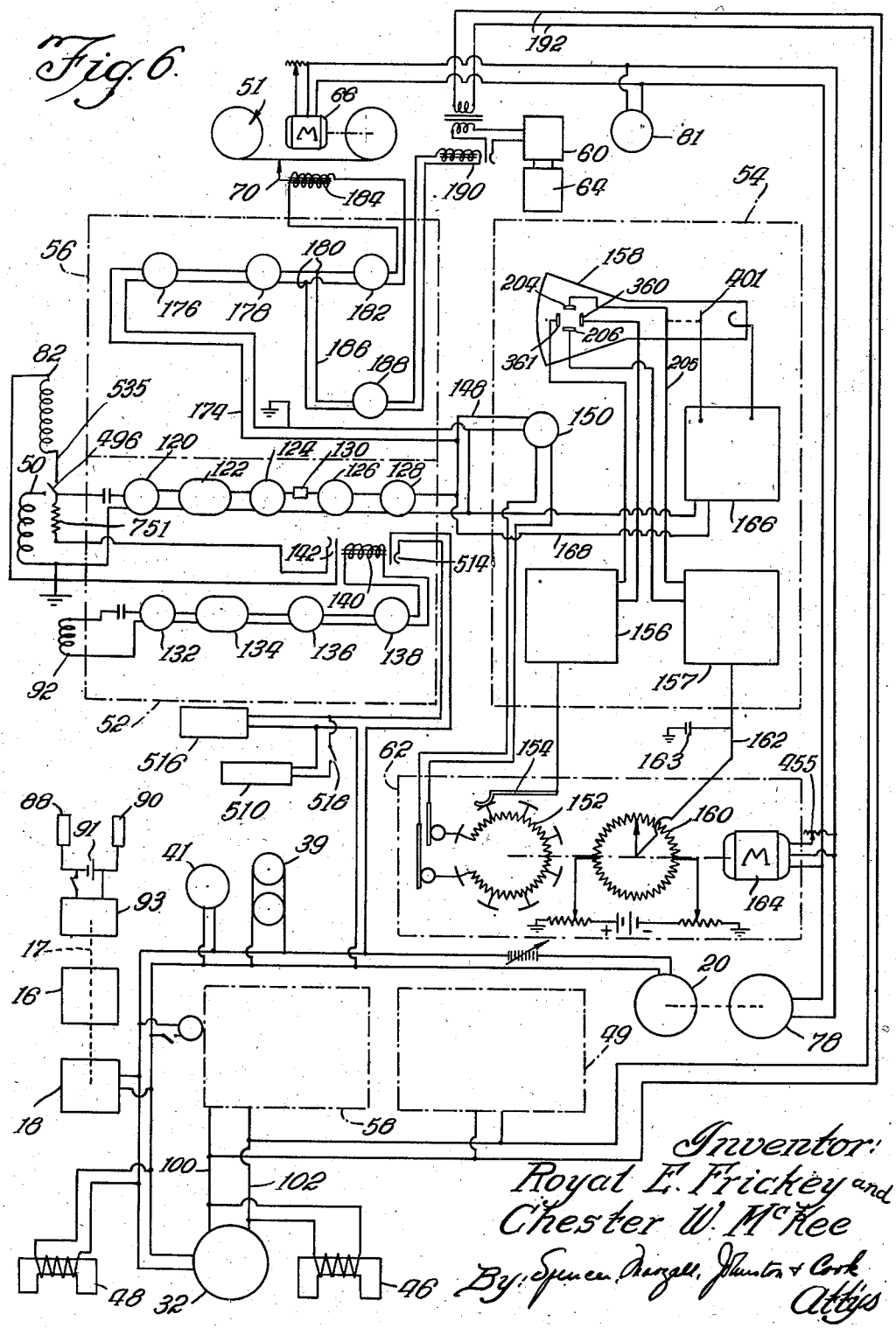

Nov. 13, 1945.  R. E. FRICKEY ET AL  2,388,683
METHOD AND APPARATUS FOR DETECTING FLAWS IN RAILS
Filed March 26, 1941  19 Sheets-Sheet 4
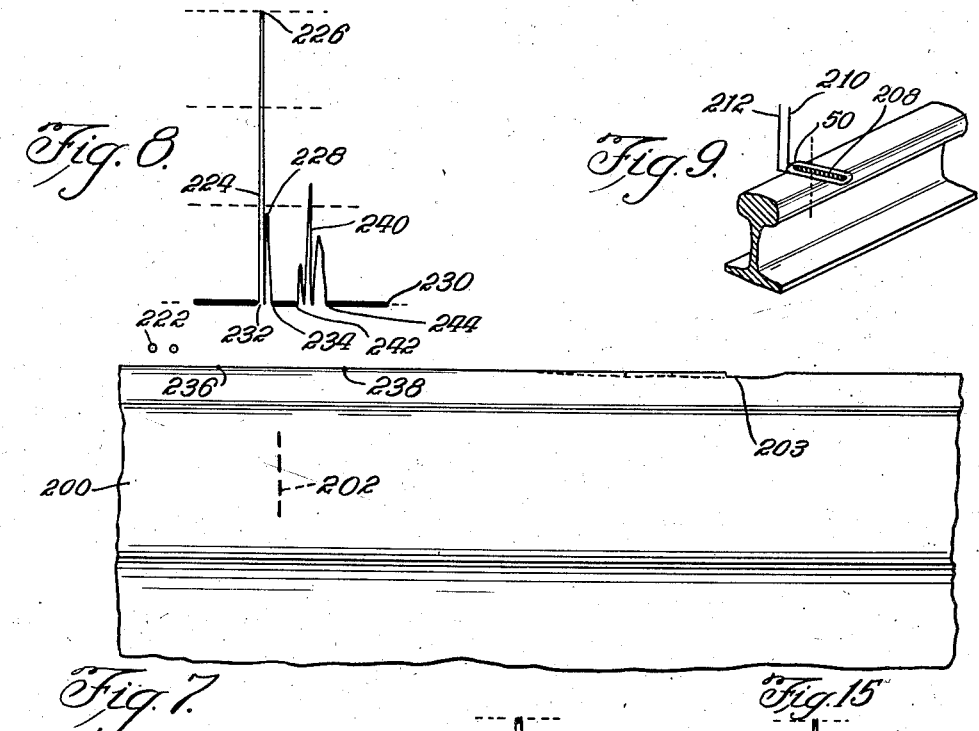
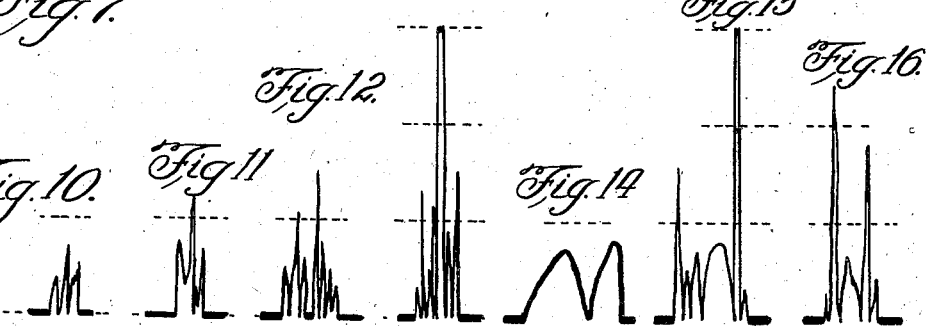
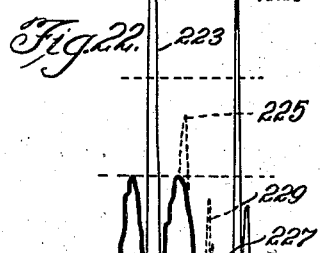

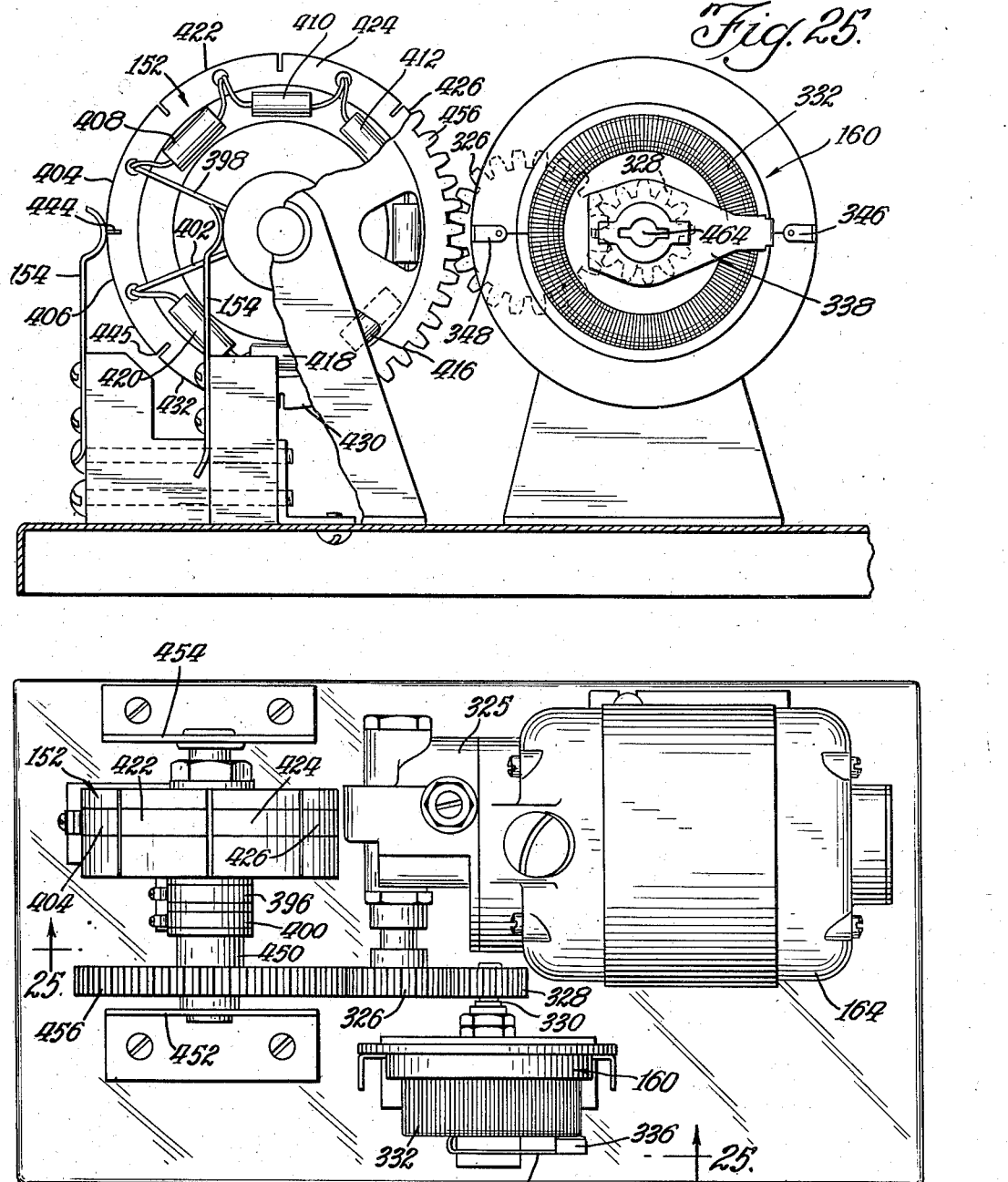

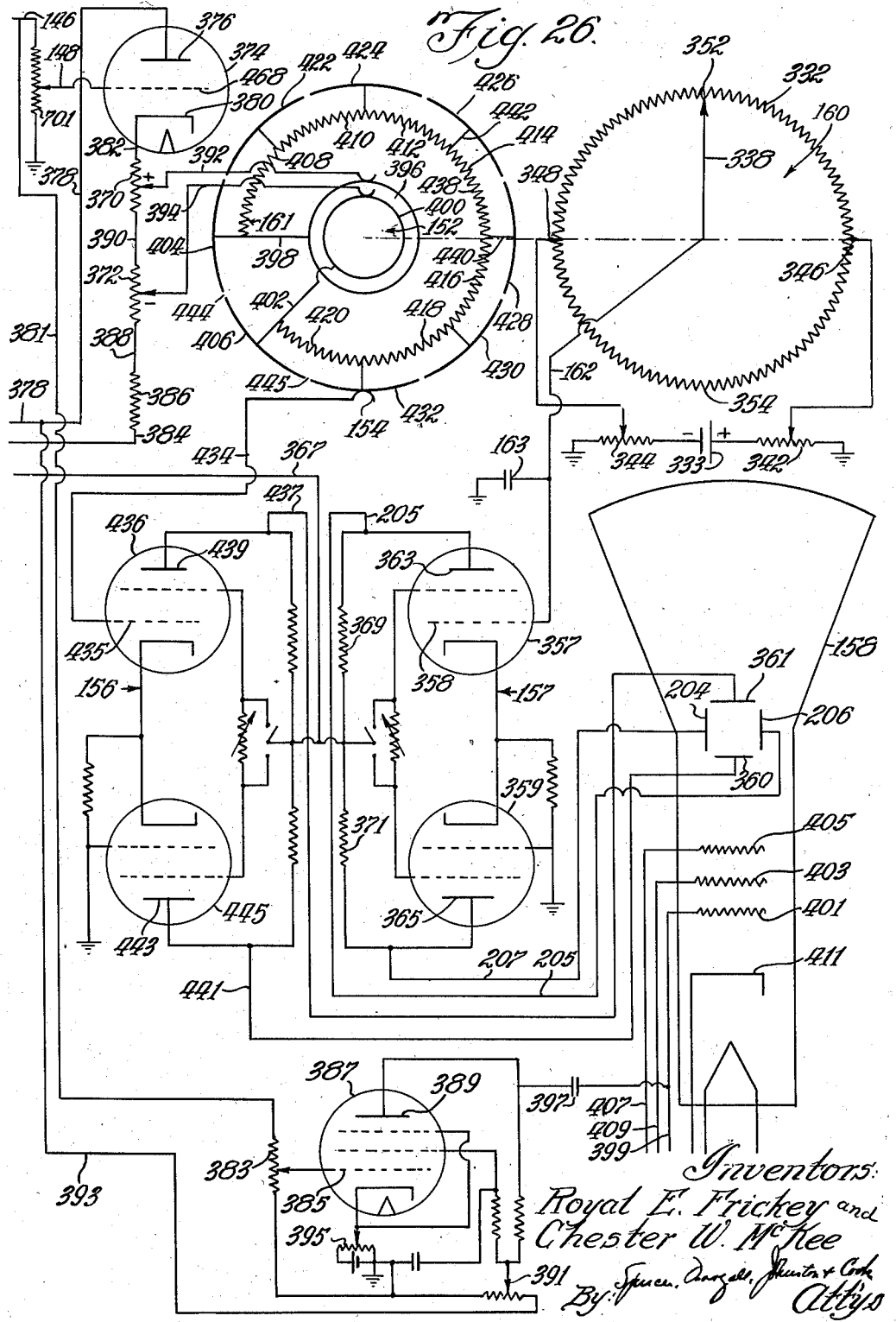

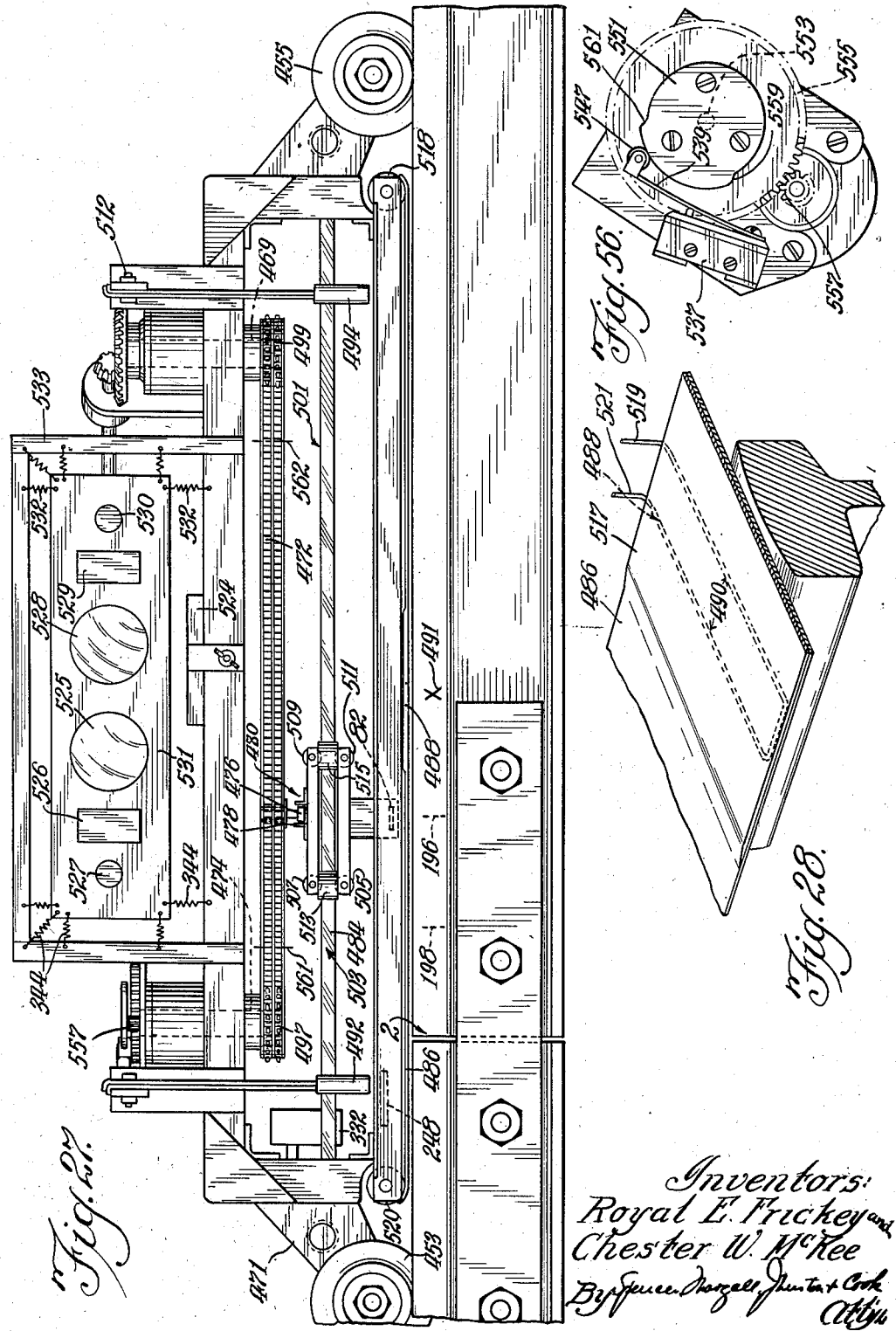

Nov. 13, 1945.　　　R. E. FRICKEY ET AL　　　2,388,683
METHOD AND APPARATUS FOR DETECTING FLAWS IN RAILS
Filed March 26, 1941　　19 Sheets-Sheet 9

Inventors:
Royal E. Frickey and
Chester W. McKee

Nov. 13, 1945.  R. E. FRICKEY ET AL  2,388,683
METHOD AND APPARATUS FOR DETECTING FLAWS IN RAILS
Filed March 26, 1941   19 Sheets-Sheet 10

Inventors:
Royal E. Frickey and
Chester W. McKee
By: Spencer, Hardell, Johnston & Cook
Attys Nov. 13, 1945.   R. E. FRICKEY ET AL   2,388,683
METHOD AND APPARATUS FOR DETECTING FLAWS IN RAILS
Filed March 26, 1941   19 Sheets-Sheet 11

Inventors:
Royal E. Frickey and
Chester W. McKee
By Spencer, Chazall, Munton & Cook
Atty Nov. 13, 1945.   R. E. FRICKEY ET AL   2,388,683
METHOD AND APPARATUS FOR DETECTING FLAWS IN RAILS
Filed March 26, 1941   19 Sheets-Sheet 12

Inventors:
Royal E. Frickey and
Chester W. McKee
By:-
Attys

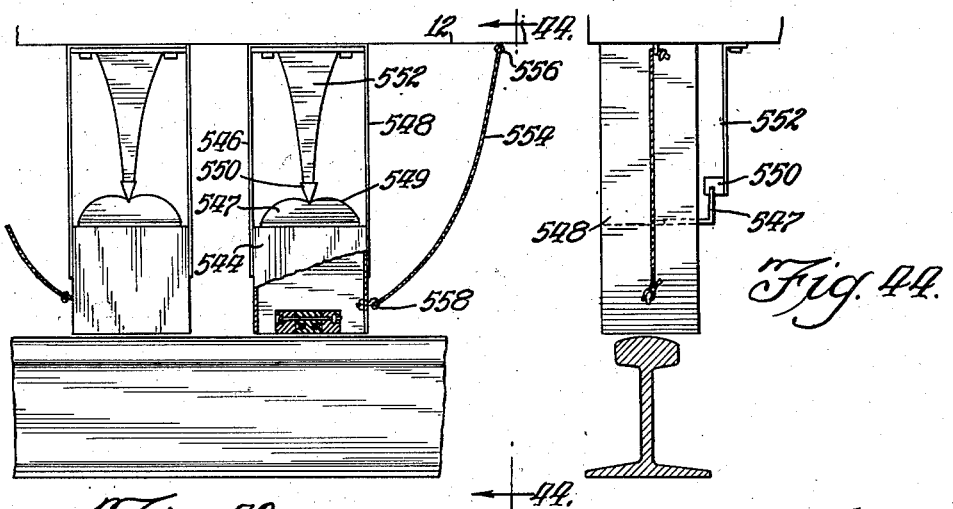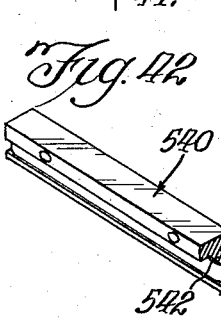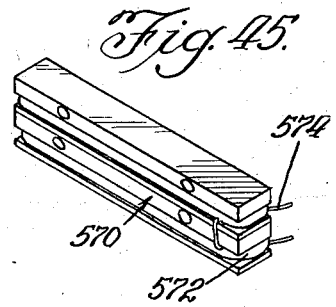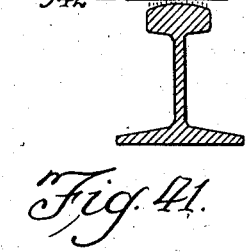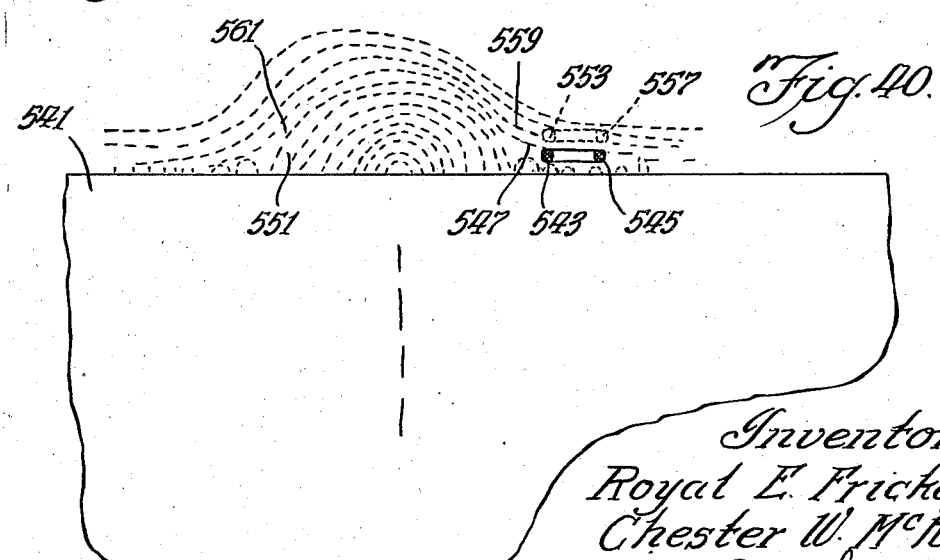

Nov. 13, 1945.   R. E. FRICKEY ET AL   2,388,683
METHOD AND APPARATUS FOR DETECTING FLAWS IN RAILS
Filed March 26, 1941   19 Sheets-Sheet 15

Inventors:
Royal E. Frickey and
Chester W. McKee
By Spencer, Hardgale, Johnston & Cook
Att'ys Inventors:
Royal E. Frickey and
Chester W. McKee Nov. 13, 1945.   R. E. FRICKEY ET AL   2,388,683
METHOD AND APPARATUS FOR DETECTING FLAWS IN RAILS
Filed March 26, 1941   19 Sheets-Sheet 17

Inventors:
Royal E. Frickey and
Chester W. McKee
By: Spencer, Hardell, Johnston & Cook
Atty.

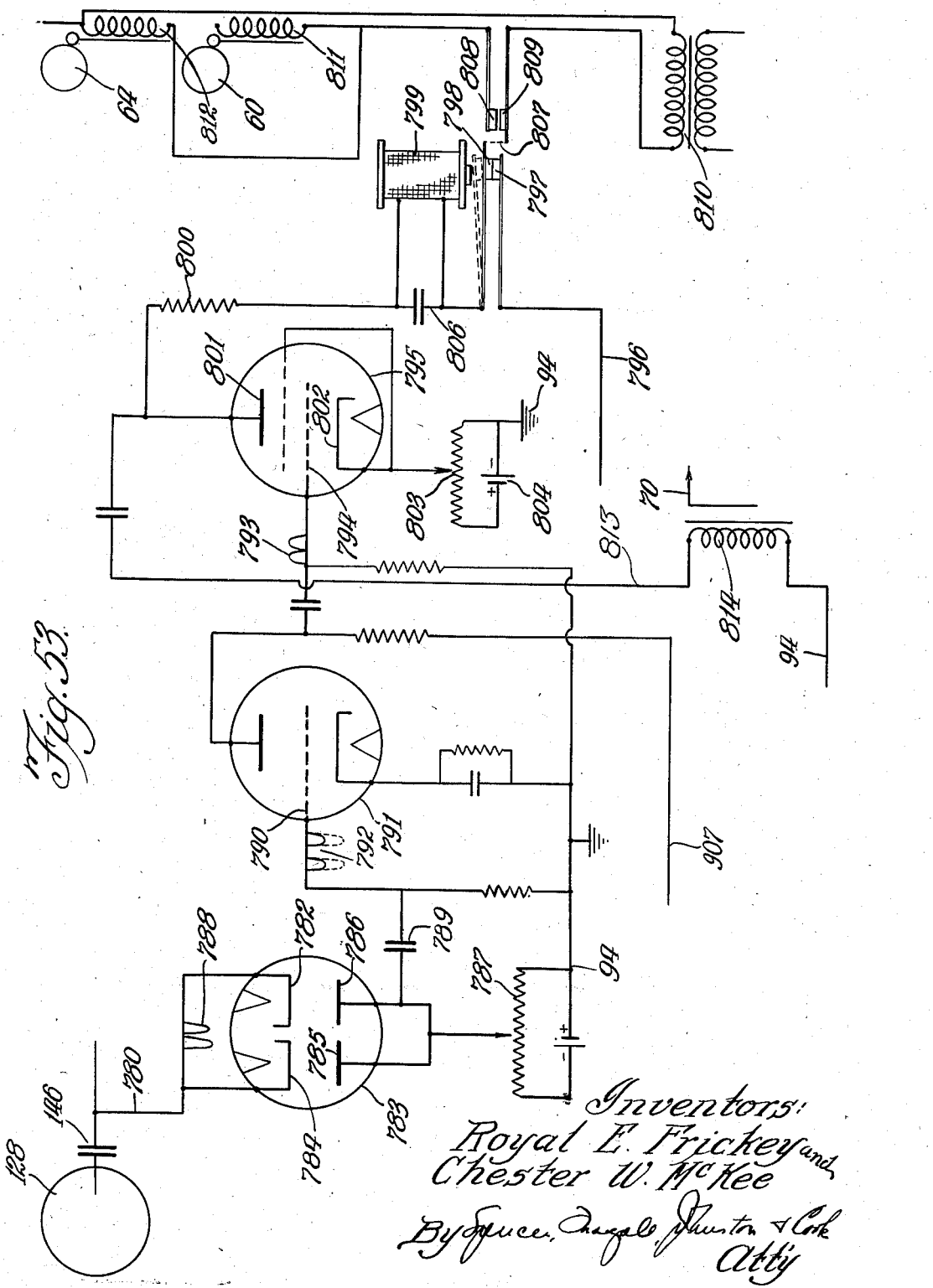

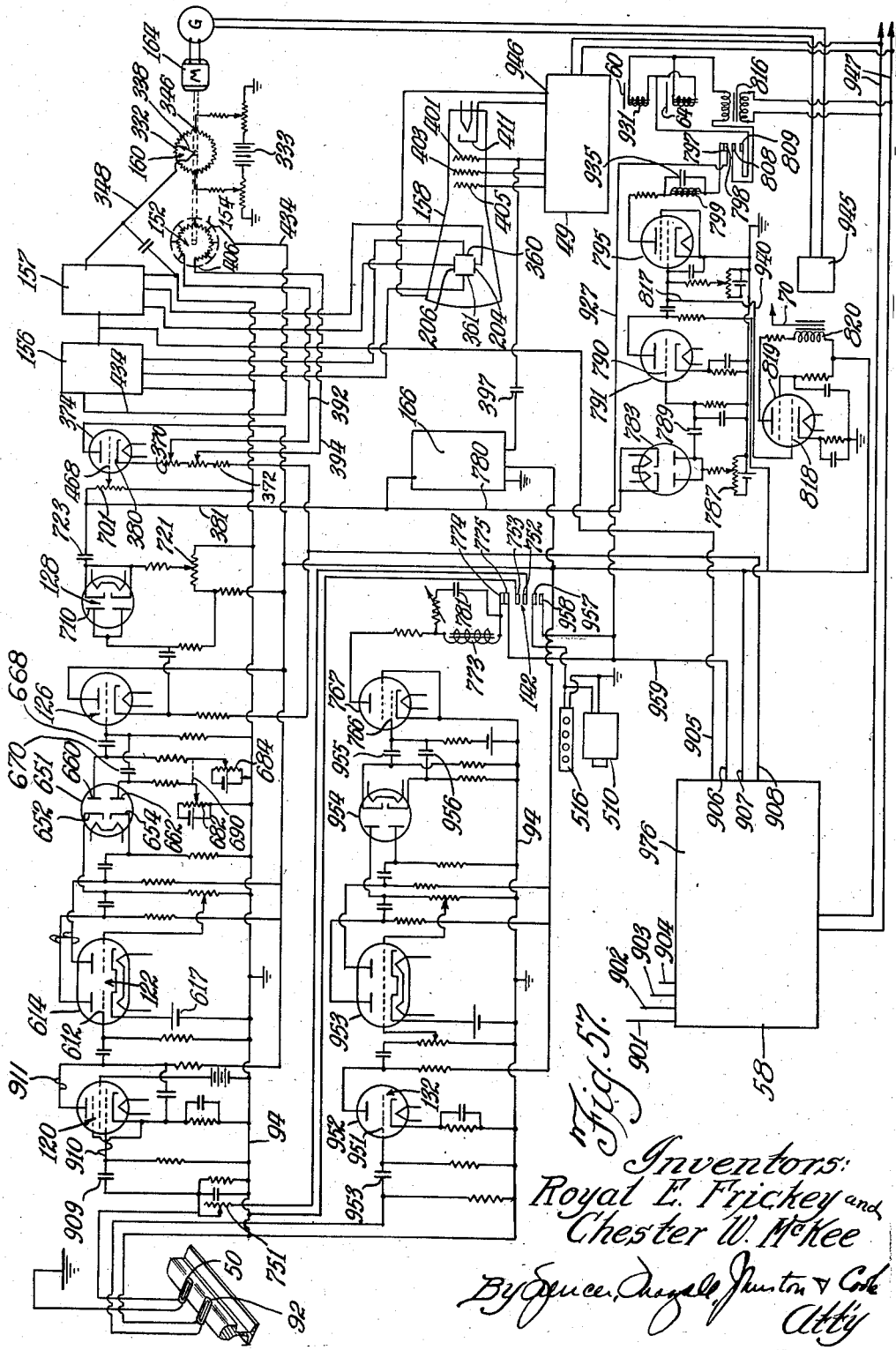

Patented Nov. 13, 1945

2,388,683

UNITED STATES PATENT OFFICE 2,388,683

METHOD AND APPARATUS FOR DETECTING FLAWS IN RAILS

Royal E. Frickey, San Francisco, Calif., and Chester W. McKee, Chicago, Ill., assignors to Welding Service, Inc., Chicago, Ill., a corporation of California Application March 26, 1941, Serial No. 385,264

82 Claims. (Cl. 175—183)

This invention relates to new and improved methods of finding dangerous flaws in rails lying in a roadbed, and to apparatus for practicing such methods.

Generally speaking, contemporary apparatus for finding dangerous flaws in rails lying in a roadbed seeks to perform two functions, namely, to find dangerous flaws so that the rails containing them may be removed from the track, and, secondly, to provide a permanent record of the track's condition so that comparison of permanent records of the same track made at different times will disclose the development of dangerous flaws and will check upon the efficiency of the flaw detecting system.

The first of these functions, the flaw finding function, is performed in three steps, which may be denoted by the terms, "exploratory," "flaw locating" and "hand checking."

The exploratory step is performed by a rail car carrying a magnetic flux pick-up and consists in segregating all important abnormal portions of a rail, as fissures, burns and magnetic spots from all normal portions. This segregation of normal from abnormal portions of a rail is visibly presented by causing a pen writing on a moving tape to describe a straight line so long as the pick-up is moving above normal rail but to deviate from the straight line when the pick-up passes above an abnormal rail condition such as a fissure or magnetic spot. In the present state of the art, these pen deviations constitute "non-discriminatory" signals in that they are not distinctive of their source, that is, no dependable differentiation is made between signals derived from certain types of harmless magnetic spots and one derived from a dangerous fissure. Inasmuch as only rails containing dangerous flaws are to be replaced, the operators must then check the source of all abnormal conditions recorded in order to properly and safely discriminate. But, first the exact spot containing the source of the abnormal signal must be found. This is the function of the flaw locating step.

The flaw locating step is quickly performed in the case of burns which are visible. Indeed, when each non-discriminatory signal is received, the observer on the exploratory car looks at the rail and if a burn is noted, the signal on the tape is so marked and under some practice the car proceeds without stopping. Where there is no visible source upon the rail for a flaw signal, the flaw locating step consists in examining the tape record made during the exploratory step to locate approximately the signal source with reference to a flaw signal from a rail joint, or in finding a paint spot on the rail which was automatically sprayed thereon when the flaw signal was received, or in re-running the rail with the exploratory car and noting visually the approximate spot on the rail when the signal appears on the tape. Having found the approximate location of a flaw, the upper surface of the rail ball is carefully cleaned for a considerable distance in the suspected location and a strong direct current is introduced through that portion of the rail. The exploring contacts of a potentiometer, spaced about three-quarters of an inch apart are then moved lengthwise of the rail until the whole suspected area has been explored, or an abnormal drop in potential between the two contacts indicates the presence of a fissure. When this occurs, the portion of the rail beneath the potentiometer contacts is marked and the flaw locating step is complete.

The final step is the hand check, which under present practice, constitutes a continuation of the flaw locating step just described and consists in estimating the size of the fissure from the potential readings.

The disclosure of the present application relates to a new method and apparatus for finding dangerous flaws in rails, there being a sharp departure between the present invention and existing practice, both broadly and in detail.

In general it is an object of the present invention to provide a method and apparatus which will be more accurate and dependable in locating rail flaws, and which will make possible discrimination between different types of flaws.

Another object of the invention is to provide a flaw detecting method and apparatus which makes possible derivative intelligible signals which exhibit characteristic differences for different types of flaws, thus making it possible to secure a relatively comprehensive analysis of the type of flaws encountered during the exploratory step.

Another object of the invention is to eliminate certain sources of inaccuracy inherent in prior systems most generally in use, and to make it possible to detect flaws near the ends of rail sections, as well as for other portions of the rail. In this connection the present invention preferably avoids use of a current flow applied to the rail from contacting brushes, as has been practiced in the past, because such a procedure is not applicable for detection of flaws near the rail joints, and because a magnetic field formed in this manner is subject to variations due to variations and resistance between the contacting brushes and the rail. In place of such a current flow applicants preferably magnetize the rail by means of an electromagnet which travels over the rail in advance of the pick up means. The residual magnetism affords magnetic fields (or magnetic modulations) of a character dependent upon the type of flaws encountered, and it is such magnetic modulations which are employed to induce electrical potentials in the pick up means.

Reference is made in the foregoing to the fact that applicants' method and apparatus makes possible discrimination between different types of flaws during the exploratory step. Applicants have attained this objective by utilizing a relatively small pick up coil, having reference particularly to the length of the coil longitudinally of the rail. With the preferred method of providing the rail with residual magnetism, as will be presently described, applicants have found that the detectable magnetic modulation produced by a transverse fissure is relatively short and of the order of from 1 to 1½ inches (measured along the length of the rail). With such a magnetic field applicants have secured good results by utilizing a coil having an external length of about ⅜", and a corresponding internal diameter of about ⅛". It has been found that with such an arrangement potential impulses are induced in the pick up coil which can be amplified and translated into derivative visual or permanent records, or both, with the indications or record varying in character depending upon the nature of the impulses induced in the pick up coil, which in turn vary with the nature of the flaw. In other words applicants' method explores the magnetic field of a rail in progressive incremental spaces which are relatively small, whereby various flux fields caused by different types of flaws, are caused to be translated into different types of derivative signal indications or records. With the present method it is impossible to detect and discriminate fissures from less serious flaws, such as burns and magnetic spots.

A further object of the invention is to provide a novel means and method for amplifying and translating potential impulses from the pick up coil, to produce visible signal indications, a permanent record, or both. In this connection the present invention makes possible production of either visible signals or a permanent record commensurate with the character and duration of the magnetic modulations caused by the different flaws being detected, whereby an operator upon observing the indications or record, is immediately apprised of the presence and location of various types of flaws, during the exploratory step. In other words with the present invention a continuous visual indication or record is secured as the pick up coil moves along the rail during the exploratory step, and by an examination of this visual indication or record, an operator can determine the presence and location of fissures, the presence and location of burns and magnetic spots, and non-dangerous flaws such as burns and magnetic spots can be distinguished from fissures.

With respect to the particular means which applicants prefer to employ in connection with translating the potentials from the pick up coil to visible indications or permanent records, it is preferable to make use of a cathode ray tube having a screen of comparatively long persistence, as for example about 3½ seconds. The beam of this tube is then caused to delineate an extended reference line along the screen of the tube, and the length of the reference line is a fixed fraction of the length of the railroad rail, as for example ⅟₁₀ the length of a 39 foot rail. During normal operation the beam is caused to move along its delineated path at a speed proportional to the rate of travel of the apparatus along the rail, whereby the beam will describe its extended path once for each rail length it traverses. The potentials induced in the pick up coil are amplified, and the amplified impulses caused to displace the ray substantially at right angles to its path, thereby producing the desired visual indications. At the end of the first traverse of the beam, the beam drops a predetermined distance and then moves back to delineate a second sweep. This is repeated a number of times before the beam again traverses its first delineated path. To produce a graphic permanent record these visual indications of the cathode tube can be photographed.

The advantages of this new method of examining a rail by small increments and of communicating the resulting signal to the beam of a cathode ray tube, which is independently traversing a long path on the screen, are many. Firstly, the beam is very faithfully reporting changes in flux along the rail and because the path delineated by the beam has a time relationship to the speed of the pick-up through the field of flux, it is possible to present on the screen a visual pattern truly representative of abnormalities occurring in the rail. Study of this highly discriminatory pattern discloses that each type of rail abnormality produces a pattern of flux change generally unique to itself with the result that one visible pattern shown on the screen of the tube from one type of abnormality such as a burn is generally distinguishable from the visible pattern from other types of abnormalities as, for example, a transverse fissure. More significant is the fact that transverse fissures produce a sharp peak of such amplitude that it will appear on the tube screen as a sharp modulation readily distinguishable from modulations produced by burns even though the fissure modulation may be close to or superposed on a burn modulation.

In addition to picking up many dangerous fissures commonly missed by existing systems, applicants' highly discriminatory signal makes the exploratory step much more efficient because it is possible to eliminate the slow and costly flaw locating and hand checking steps for a large number of non-dangerous flaws. At present, the exploratory step produces non-discriminatory signals only one out of many of which is derived from a dangerous flaw. In so far as these signals are derived from burns which may be seen by observing the rail, it is the practice to look at a rail at the approximate point where the source of the strong signal is believed to be and if a burn appears, to place the word "burn" adjacent the signal on the tape. While this practice reduces the number of sources that must be exactly located and their nature determined by the hand checking step, it will miss a fissure beneath a burn or a fissure within less than the over-all longitudinal length of the pick-up distant from a burn. The sources of all other signals will be examined and inasmuch as magnetic spots and harmless surface flaws not visible from the moving exploratory car cause a substantial number of such strong signals, the flaw locating and hand checking steps are needlessly performed many times. By applicants' method and apparatus, on the other hand, it is possible to discriminate between dangerous fissures and non-dangerous flaws in a majority of cases during the exploratory step, with the result that the flaw locating and hand checking steps are practiced only for signals actually derived from a dangerous fissure or from those comparatively rare non-dangerous sources which give a signal somewhat like that given by a dangerous fissure.

A further object of the invention is to provide a novel method and apparatus for exactly locating a flaw indicated during the exploratory step. In practice this is carried out by an apparatus termed "an analyzer," which makes use of a pick up coil similar to that employed in the exploratory step. The analyzer can consist of a separate car which can be moved along a rail independently of the car carrying the main equipment, and the supplemental pick up coil is supported upon the analyzer car for reciprocating movement in a direction longitudinally of the rail. The reciprocating means serves to move the coil at a constant rate, as for example at a speed of ten feet per second over a distance of about two feet. While this auxiliary pick up coil may be connected with additional supplemental amplifying and indicating means, it is preferable, as will be presently explained, to utilize the same amplifying and indicating means as is employed for the main pick up coil. A further feature of the analyzer is that means is provided, making use of a so-called "spotting" coil, to facilitate accurate location of a particular flaw.

A further object of the invention is to provide an improved permanent record, together with an improved method and means for producing the same. In this connection the invention makes use of a camera which photographs the highly discriminatory visual signals. Preferably the camera is synchronized with the indicating and traversing means, whereby each frame of the motion picture film will carry the indications obtained from one complete rail. However, it is also possible to produce a record merely of such rails as contain fissures, and in addition it is also possible to photograph indications obtained from the analyzer.

A further object of the invention is to provide an improved method and apparatus to produce a residual magnetic field of predetermined value and direction in a railroad rail. In this connection the invention is characterized by means serving to de-magnetize the rail prior to application of a magnetic flux, thereby minimizing variations in the residual magnetic field due to magnetic conditions which may exist prior to applying the exciting magnetic flux.

A further object of the invention is to provide a type of electrical pick up which does not modify the flux field through which it is passed. In this connection the invention is characterized by the use of a non-magnetic core for the pick up coil, and by the use of a circuit connected to the coil which has a relatively high electrical impedance. These features make it possible to avoid any distortion of the magnetic field or flux modulation caused by a flaw being detected, thus contributing to the production of the desired derivative signals of a discriminatory character.

Another object of the invention is to provide means for translating potentials induced in the pick up coil into readily readable visible indications which appear upon one side of a base reference line. In practice, this result is accomplished by full wave rectification of potentials received from the pick up coil, irrespective of the direction of flow of current through the coil, and the two rectified components are then translated into out of phase visual indications, on the same side of a given reference line.

An additional object of the invention is to suppress small visual indications which possess no flaw significance. Such signals may rise from harmless rail surface defects, which may produce indications confusing to an operator. In practice we prefer to provide means in conjunction with the amplifier, to suppress such small signals or indications. This means is hereinafter termed the "minor suppressor."

A further object of the invention is to provide means to avoid paralyzing the amplifying and translating means connected to the pick up coil, when this coil passes over a rail joint, and which at the same time will maintain the apparatus effective to detect fissures near the ends of the rail. In this connection it may be explained that the gap between rail ends at a rail joint causes a magnetic field or modulation of relatively high intensity, so that when the pick up coil is passed through this flux field, the induced potentials will cause a highly sensitive amplifier connected to the same to be momentarily paralyzed. Such paralyzing of the amplifier will make the apparatus incapable of detecting flaws for a considerable distance beyond the joint. In practice, we prefer to provide means making use of an additional pick up coil in advance of the main pick up coil. Potentials induced in this additional pick up coil, in passing over a rail joint, serve to introduce an impedance across the input of the amplifier, thus reducing the potential input to the amplifier while the main pick up coil passes over a region adjacent the rail ends. However, while the potential input to the amplifier is thus reduced, the apparatus is still capable of indicating serious flaws, such as a transverse fissure.

A further object of the invention is to provide limiting means whereby all visible indications are limited to a maximum value. Such a limiting means serves to facilitate observation and appraisal of the indications.

Another object of the invention is to provide an amplifier tending to intensify the visual indication for signals which are important, and tending to subdue the horizontal trace of the cathode ray beam for unimportant signals. Such an amplifier is hereinafter referred to as a "Z-axis amplifier."

Another object of the invention is to provide a warning signal whereby the operator is warned when a visual signal is being secured which requires his scrutiny and observation. Because of this provision of this warning signal the operator is required to observe the screen only when important signals are being received, which commonly occurs on an average of a few times per mile of travel. The actuation of the warning signal for signals of less than a predetermined amplitude, is prevented by what is hereinafter referred to as a "major suppressor."

A further object of the invention is to provide a dependable record upon a tape of all flaw signals which exceed a predetermined amplitude.

Further objects and features of the invention will appear from the following description in which the preferred embodiments of the invention have been set forth in detail in conjunction with the accompanying drawings.

Apparatus embodying the above disclosed features and making it possible to practice the detecting methods described is shown in the drawings, wherein:

Figure 1 is a side view in elevation of the power car, exploratory car and the analyzer;

Figure 2 is a lengthwise section of the exploratory car showing the visible signal cab and the rail observing cab;

Figure 3 is a lateral section through the visible signal cab showing the positions and actual appearances of certain elements of applicants' flaw equipment;

Figure 4 is a plan view of the power car;

Figure 5 is a side view in elevation of certain equipment on the power car including the pre-demagnetizing magnet and the principal magnet;

Figure 6 is a schematic view showing the relationship, mechanically and electrically, of the various parts of applicants' apparatus to each other, including one of the two visible signal and amplification systems;

Figure 7 is a full scale view of the ball of a rail in side elevation together with a portion of the web;

Figure 8 is a visible signal as it appears on the screen of applicants' cathode ray tube;

Figure 9 is a schematic showing of applicants' pick up coil above a rail;

Figures 10 through 22 are visible signals derived from various types of flaws as presented on the screen of applicants' cathode ray tube;

Figure 24 is a plan view of the commutator and rotary potentiometer assembly;

Figure 25 is a side view partly in elevation and partly in section of the commutator and rotary potentiometer assembly;

Figure 26 is a wiring diagram of the means for causing the beam of applicants' cathode ray tube to delineate the complete rail signal as shown in Figure 23;

Figure 27 is a side view in elevation of the analyzer;

Figure 28 is a perspective view of the spotting coil positioned above the ball of a rail;

Figure 40 shows a portion of the ball of the rail together with a suggested pattern for a transverse fissure flux field;

Figure 41 is a rail end view of applicants' pick up coil showing the limits to which it extends beyond both sides of the rail ball;

Figure 42 is a perspective view partly in section of applicants' non-magnetic pick up coil;

Figure 43 is a view of the principal pick up and the rail joint pick up housings;

Figure 44 is a view taken on the line 44—44 of Figure 43;

Figure 45 is a preferred form of applicants' pick up;

Figure 53 is a wiring diagram of the means for actuating the warning signal and the pen and tape unit in response to a potential signal from a flaw;

Figure 56 is a plan view of the means for shorting the analyzer pick up to ground during portions of its stroke;

Figure 58:
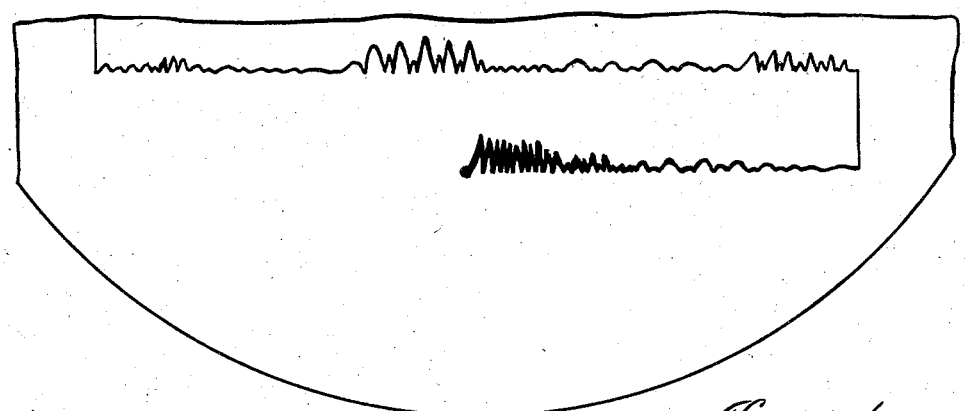

Figure 57 is a wiring diagram of all circuits necessary for presenting the visible signal, the warning signal and the ink signal on the tape with the exception of the two push-pull amplification stages, the Z-axis amplifier, and connections between the power supply and the heating elements of the various tubes; and Figure 58 is a view of the lower two sweeps after rectification but without minor suppression.

*General survey of applicants' equipment*

In order to practice applicants' method of flaw detection, equipment for transporting the apparatus along the rail and for generating electric currents of selected voltages and amperages is provided. Describing this equipment generally, and referring to Figure 1, the transporting equipment comprises a power car 10, an exploratory car 12 and an analyzer 14, which are coupled together by any suitable means. Referring to Figure 4, the power car 10 supports an internal combustion engine 16 which drives a direct current generator 18. An electric motor 20 through a gear box 22 drives the shaft 24 of the power car 10, the amount of current lead to the motor 20 being controlled by any suitable means. The power car is equipped with a suitable brake which with a speed control enables the operator to regulate the car's speed. A rotary converter 32 provides alternating current.

The exploratory car is mounted on a four wheel truck and comprises two cabs, see Figures 1 and 2, one forward which may be termed "the visual signal cab" 36 and the other at the rear of the car is a cab 38 which may be termed "the rail observing cab." The visual signal cab 36 is light proof in order that the cab may be dark when the doors are closed and thereby improve the visibility of signals on the screen of a cathode ray tube utilized by applicants. Ventilating means, such as louvers 40 and a ventilating fan 41, are provided in the cab walls. A door 42 provides access to the cab 36 and a similar door is located on the far side of the car. The rail observing cab 38 is open at the rear in order to permit the rail observer to see the rails.

Describing generally the flaw detecting equipment, referring to Figure 1, there is suspended beneath the power car 10 an alternating current magnet 46 for pre-demagnetizing the rail and a direct current magnet 48 for magnetizing the rail longitudinally. Suspended from the exploratory car 12 is a pick up 50 connected to an amplifier in a case 52, see Figure 3, and to a cathode ray tube unit 54. The numeral 56 identifies a case containing an amplifier for a pen unit assembly 51, see Figure 2, and the numeral 60 identifies a one stroke bell, see Figure 1. The cathode ray tube unit 54 contains a Z-axis amplifier together with other amplification units which will be described in more detail hereinafter. A general power supply for the amplifier assemblies 52 and 56 is contained in the case 58. The power supply for the cathode ray tube unit 54 and for an identical unit 55 for use in conjunction with a pickup on the other rail is contained in a case 49. Referring to Figure 1, a pickup coil 92 for operating a rail joint potential signal attenuator is positioned immediately in advance of the pickup 50.

A commutator and rotary potentiometer assembly for causing the beam of a cathode ray tube in the unit 54 to sweep at a selected rate of speed along a predetermined course is identified by the numeral 62 and is positioned immediately adjacent the cathode ray tube unit power supply 49, and on the other side is a second commutator and rotary potentiometer assembly 63 which serves the cathode ray tube unit 55. Amplifiers in the cases 53 and 57 and a power supply unit 59 perform the same functions as the corresponding units in the cases 52, 56, and 58. The pick up for the second rail is identified in Figure 2, by the numeral 47 while an associated warning signal is identified by a one stroke bell 61. It is desirable that the one stroke bells 60 and 61 be heard by the rail observer in the rail observing cab 38 and toward that end two additional bells 64 and 65 on opposite sides of the rail observing cab are provided. The bell 65 is in parallel with the bell 61 and the bell 64 is in parallel with the bell 60.

The pen unit 51, see Figure 2, is driven by a motor 66 at a speed varying directly with the speed of travel of the exploratory car and causes a tape 68 to move beneath two pens 70 and 72 (only one of which can be seen in Figure 2). The pen 70 is caused to form a signal on the tape in response to a signal received from the pen unit signal amplifier contained in the case 56 while the pen 72 is caused to make a signal in response to a signal received from the pen unit amplifier in the case 57. The two pens 70 and 72 are positioned side by side about one and one-half inches apart and consequently the record of both rails is reproduced on a single tape 68. The pen unit is schematically shown.

Making the visual signal cab 36 light proof renders difficult vocal communication between the visual signal observer in this cab and either the rail observer or the power car operator. As such communication is necessary, a telephone system is provided. This telephone system consists of three stations: one on the power car; a second within the visual signal cab 36; and a third in the rail observing cab 38. Each station is equipped with a pair of earphones or a speaker as 74 and a mouthpiece or microphone as 76, see Figure 2. All three stations are on the same line and a three-way conversation can be conducted. In the telephone circuit is a plug-in socket disposed on the analyzer 14 which permits the rail observer, when performing the flaw locating step with the analyzer uncoupled from the exploratory car, to remain in communication with the other two stations.

Referring to Figure 3, the commutator and rotary potentiometer assemblies 62 and 63 are each driven by a motor turning at a speed varying directly with the speed of the equipment along the rail and the pen equipment 51 is driven by a motor 66 turning at a speed similarly varying. In order to effect this synchronization, the applicants select motors which will vary in speed directly with changes in supply potential within a selected range. A potential varying directly with the speed of the motor is derived from a generator 78, see Figure 4, positively driven by the motor 20 which, as described above, positively drives the shaft 24 through the gear box 22. It is evident that changes in speed of the car will work corresponding changes in speed of the generator 78. The generator 78 is of the tachometer type producing a voltage proportional to speed. A tachometer instrument 81, see Figure 5, for determining speed is also driven by the generator 78.

It will be understood that suitable conductors lead from the analyzer 14 to the exploratory car and that a suitable switch for cutting out the pick up 50 and for cutting in a pick up 52 or the analyzer 14, see Figure 1, is available to the observer inside the visual signal cab 36. Additionally, however, the conductors between the analyzer 14 and the exploratory car 12 have considerable slack so that the coupling 84 may be opened and the analyzer moved by hand relatively to the exploratory car for a distance of perhaps fifteen feet. The need for uncoupling the analyzer from the exploratory car 12 is principally dependent upon the ability of the power car to move the entire assembly at a slow rate of speed. As presently practiced, the analyzer 14 is disconnected from the exploratory car for the purpose of performing the flaw locating step, but it is evident that the power car controls may be sufficiently perfected to allow the power car operator to move the equipment over the track slowly enough to permit the analyzer to perform this function without uncoupling.

Referring to Figure 1, coiled on a support 86 at the rear of the cab 38 are two conductors terminating in the electrodes 88 and 90. These electrodes are connected to a battery 91, switches being provided whereby it is possible to connect the cells of the same in parallel so as to produce a maximum amperage at the electrodes 88 and 90, or in series for charging from a small charger 93, see Figure 4. This direct current is introduced to the rail through the electrodes 86 and 90 when it becomes necessary to perform the hand checking step with a potentiometer. Thus, when a flaw has been exactly located by the analyzer, the equipment is pulled ahead and the rail observer connects the two electrodes 88 and 90 on both sides of that portion of the rail believed to contain a flaw. The rail observer then places a potentiometer over the flaw in the well known manner.

The several motors, magnets, electrodes and the like require various voltages and both types of current, alternating and direct. Figure 5 is a diagrammatic layout of a portion of the equipment used by the applicants and is presented for the purpose of enabling a reader to relate various pieces of equipment, hereinafter separately discussed, to the system as a whole. The internal combustion engine 16 has its fan belt 17 in driving engagement with the charger 93 for charging the battery 91, which battery supplies a current of high amperage and low voltage to the electrodes 88 and 90. The main drive shaft of the motor 16 is connected to the direct current generator 18. The direct current output of the generator 18 is connected to the rotary converter 32 and also to the magnet 48 and the motor 20. The fan 41 and the lights 39 are on the direct current line. The motor 20 which drives the power car along the rail is mechanically connected to the generator 78 and to the wheels of the car so that the speed of the generator 78 will vary directly with the speed of the car. The output of this generator is used to operate the motors of the two commutator and rotary potentiometer assemblies, only one of which, the motor 164, is shown in Figure 6. The output of the generator 78 is also used to run a tachometer 81, which permits an operator to judge the speed of the equipment along the rail, and to run the motor 66 of the pen unit assembly.

As the many inventions involving the amplification system are separately presented, it is deemed wise at this point to present a general picture of this amplification system in order that the relationship between each separate invention and the whole detecting system will be appreciated. Toward this end, Figure 6 discloses in dotted outline the cases for the cathode ray tube unit 54, the pen unit and audible signal amplifier 56, the main amplifier unit 52, the general power supply 58, the commutator and rotary potentiometer assembly 62, and the cathode ray tube power supply 49, all in approximately the same relative positions occupied by these cases in Figure 3. Schematically shown are the pen unit 51 in inverted position, the one stroke bell 60, the pick-up 50, a rail joint attenuator pick-up 92, a pick-up 82 on the analyzer, a rail joint counter 516 and a relay 140 for opening and closing a camera shutter, for operating the joint counter 516 and the rail joint attenuator resistance 751.

The alternating current lines 100 and 102 from the converter 32 supply the general power supply 58. This power supply 58 contains a plurality of transformers, rectifiers, and the like which provide the several voltages required in the operation of the amplifying equipment, the actual voltages and connections not being shown.

The general amplification system in the case 52 is of the vacuum tube type and comprises five stages including a voltage amplifying stage 120, a twin-triode phase inverter stage 122, a twin-diode rectifier stage 124, a coupling stage 126 and a signal limiting stage 128. A minor signal suppressor 130 operates in conjunction with the twin-diode rectifier stage 124. In this amplifier, signals derived from the pick up 50 are full wave rectified; those of a predetermined low amplitude are suppressed; and large signals are limited to a predetermined maximum amplitude. A typical flaw signal produces two amplified signal oscillations in the amplifier output. The coupling of coil 50 to the stage 120 is through a grid condenser to the control grid and cathode of the first tube, whereby the amplifier 120 is excited by potential impulses from coil 50. The high impedance of the circuit connecting to coil 50 necessarily reduces current components to a minimum.

A four-stage amplification system of the vacuum tube type for the rail joint signal attenuator is also housed in case 52 and comprises an amplifying stage 132, a twin-triode phase-inverter stage 134, a twin-diode rectifier stage 136, and a stage 138 having a grid controlled gas tube. A signal from the rail joint pick up 92 is full wave rectified and is sufficiently amplified to cause the gas tube in the stage 138 to conduct current, in response to a potential signal derived from a rail joint, and such current flow energizes the relay 140 to close its contacts 142 and to place a resistance 751 across the pick up coil 50. By positioning the rail joint pick up 92 at a selected distance in advance of the main pick up 50, the rail joint pick up system will cause the potential signals from the main pick up 50 to be attenuated or effectively reduced in intensity by a predetermined degree for a predetermined time and thereby will protect the amplification system, commencing with the voltage amplifying stage 120, from being paralyzed. The attenuated rail joint potential signal is in this way effectively reduced to an amplitude which permits continued amplification of impulses from serious flaws like transverse fissures.

The signal received from the limiting stage 128 is carried by the conductor 148 to a coupling stage 150 where it is superimposed upon a vertical positioning potential. It is this potential which controls the vertical positioning of the beam of the cathode ray tube. The vertical positioning potential from the commutator has the characteristic of changing from a given negative potential to a positive potential in eight steps of equal size and of returning almost instantaneously from the maximum positive voltage to the maximum negative voltage at the completion of the eight steps. In short, by means of the coupling tube 150 and certain circuits, the signal from the pick up 50 is caused to modulate a vertical positioning potential which is changing by steps of equal size from a maximum negative to a maximum positive and returning from the maximum positive to the maximum negative almost instantly. This composite signal taken off the commutator by the arm 154 is coupled through a resistance coupled, direct current push-pull amplification stage 156 to the vertical deflection plates 360 and 361 of a cathode ray tube 158.

In order to cause the beam of the cathode ray tube 158 to scan the screen horizontally, a sweep control circuit is provided in connection with a rotary potentiometer 160 which applies to the conductor 162 in conjunction with a condenser 163 a changing potential varying at a uniform rate from a maximum positive to a maximum negative value, which changing potential is connected to a second resistance coupled, direct current push-pull amplifying stage 157 and the output of this stage is impressed upon the horizontal deflection plates 204 and 206 of the cathode ray tube 158. Both the rotary potentiometer 160 and the commutator 152 are driven by a motor 164 which is turning at a speed proportional to the rate of travel of the car along the track and hence the beam on the tube is caused to describe a path at a rate of speed proportional to the rate of speed of the car along the rail while the signals on the tube will deflect the beam at right angles to this path.

In order that the beam of the tube may produce a visual signal on the screen brighter than the line produced by the beam when it is moving along the sweeps, a Z-axis amplifier 166, operated in response to signals from the limiter stage 128 impressed through conductor 168, increases the potential on the modulating grid of the cathode ray tube so as to increase the number of electrons in the tube beam whenever the beam leaves the sweep levels to delineate a flaw signal.

In order to operate the pen mechanism 51 and the bell 60, the signals from the limiter stage 128 are carried by the conductors 174 to a major suppressor stage 176 and then to the amplifier stage 178. Suppressor stage 176 is adjusted to pass only signals beyond a given intensity such as are desired for operating the pen mechanism. From stage 178 the signal is carried to an amplifying stage 182 and thence to the pen operating coil 184. From the point 180 between stages 178 and 182 the signal is carried by conductors 186 to the stage 188 containing a grid controlled gas tube. A signal such as represents a serious flaw causes the gas tube to conduct thereby closing relay 190 and actuating bell 60.

The cathode ray tube 158 requires several different potentials and these are supplied by equipment in the case 49, the actual voltages and the connections not being shown.

The foregoing description is sufficient to present generally the various equipment utilized by the applicants so that the separate descriptions of the various inventions may be followed without losing perspective as to a particular invention's relationship to applicants' system as a whole.

As previously stated, important objects attained by applicants' system include distinguishing dangerous fissures from harmless flaws such as burns during the exploratory step, distinguishing dangerous fissures which are within or close to harmless flaws, and detecting dangerous fissures within that portion of a rail held by the joint bars. The inability of equipment now in use to distinguish between dangerous and non-dangerous flaws is attributed to the belief that a non-dangerous flaw, such as a burn, affects the magnetic field around the rail in the same manner as does a dangerous internal fissure.

Applicants' system constitutes a complete departure from accepted prior practice because applicants have found that burns do not distort the magnetic field in the same manner as an internal defect, such as transverse fissures. Applicants have found that the non-discriminatory characteristic of signals received from dangerous and non-dangerous flaws by prior art systems is due to the lack of faithfulness of the visible signal or other indicating means, and more particularly to the method and apparatus for deriving the potential signal which ultimately produces the visible signal. Treating the latter first, and referring to Figure 7, there appears a portion of a rail drawn to full size with a transverse fissure 202 (diagrammatically shown) and a two-inch burn 203. The transverse fissure 202 is two inches from the closest portion of the burn 203. Each of these flaws is known to create magnetic flux modulations above a rail. If the two were three feet apart, each would independently produce a signal in the detector pick ups heretofore in use. Such pick ups comprise a plurality of pairs of coils, extending in all as far as six inches or more along the rail ball. It is evident that any pick up extending over more than the distance separating the transverse fissure 202 and the burn spot 203, whatever that distance may be, will receive a composite signal derived from both flux fields above the fissure and the burn and not from one alone during part of its transit over the two. The composite signal cannot be distinguished from the signal produced from a burn by itself, particularly with a pen type of recorder, which has considerable mechanical inertia.

As previously stated, applicants make use of a relatively small pick up coil, having particular reference to the length of the coil longitudinally of the rail.

Referring to Figure 9, the small pick up coil 50 is positioned and centered transversely of the rail, with its magnetic axis vertical to and passing through the ball of the rail. It is preferably of a length, as measured transversely of the rail, somewhat greater than the width of the rail ball, so that small movement sideways of the rail causes no appreciable induced potentials. In practice good results have been obtained by utilizing a coil formed of about 1200 turns of fine wire, with the coil having an inner opening measuring about 3½ inches by ⅛ of an inch, and with the coil having an overall outside dimensioning of three and three quarters inches by ⅜ of an inch by ⅛ of an inch. When this coil is positioned as previously described, it has a length longitudinally of the rail measuring in all about ⅜ of an inch, and averaging about ¼ of an inch. This coil is suspended from the exploratory car in order to pass a fixed distance above the upper surface of the rail ball, as for example a distance of about ¼ of an inch. The core 208 can be any non-magnetic material, and the terminals 210 and 212 connect to the amplification system, as will be presently described.

In practice, this pick up is used in conjunction with an amplification system and a cathode ray tube so as to produce a reference signal some forty-eight inches long for a thirty-nine foot rail. The ratio between the length of the long reference signal and the length of the rail is, therefore, approximately ten to one and this ratio is carried out in Figures 7 to 22. In Figure 7 a rail is shown to actual size, while in the remaining Figures, the signal on the tube's screen is shown in actual size, with the result that any distance along the ball of the rail through which a pick up may travel will be ten times as great as the distance along the reference line which the beam of the tube will delineate during the same period of time. Potentials from the pick up produce line departures from the reference line proportional to amplitude of the signal potential. Utilizing this equipment later to be described, and without theorizing on why certain results are obtained, applicants' method of examining rail flux fields by use of a small pick up coil will produce: first, a visible signal having a base proportional in length to the length of the source in the rail of the visible signal; second, visible signals which follow generally patterns typical of their source, as a visible signal having a pattern such that the observer knows that it was derived from a magnetic spot in the rail; third, visible signals showing a transverse fissure beneath or next to a harmless flaw; and fourth, a visible signal of a transverse fissure inside the rail joint bars.

Figure 23:
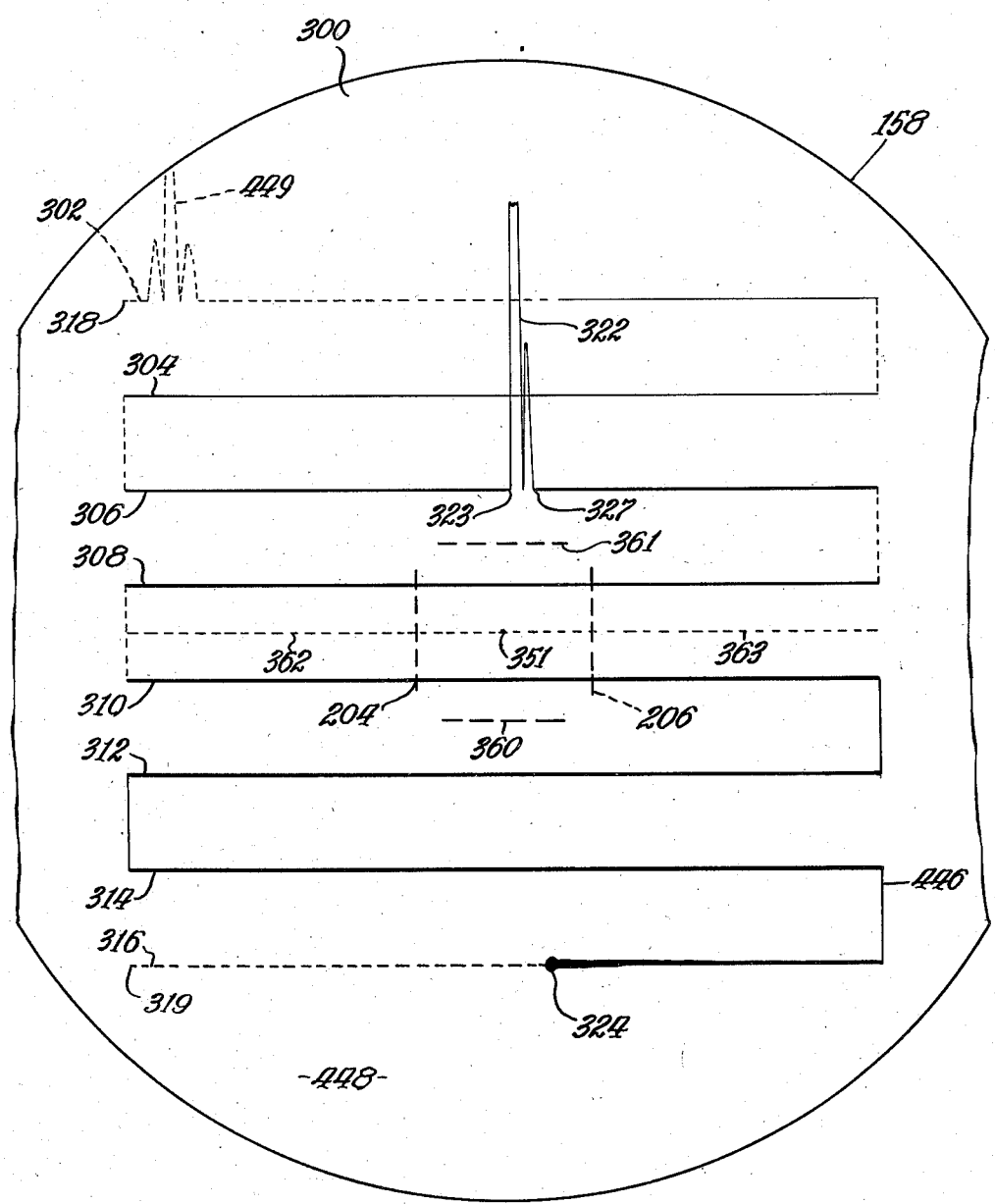
Figure 23 is a full scale presentation of the screen of applicants' cathode ray tube as the beam is delineating a complete rail visible signal.

Referring to Figure 8, a portion of applicants' complete visible signal shown in Figure 23 is shown in actual size. A pick up 222 moving from left to right over the internal transverse fissure 202 in Figure 7 produces a visible signal on the cathode ray tube such as 224 in Figure 8. This signal comprises two peaks 226 and 228, both of which are above the reference line 230. Presentation of two peaks on the same side of the reference line 230 is effected by rectification, which will be described. It will also be noted that the taller peak 226 is cut off, that is to say, possesses a short horizontal portion parallel with the reference line. This is due to the action of a signal limiter, which also will be described. One significant part of the signal lies in the linear distance between the points 232 and 234, which is about one-tenth of an inch. This indicates that the coil 222, see Figure 7, commenced to enter a field typical of the transverse fissure 202 at about the point 236, one-half inch in advance of the fissure, and left the fissure field at about the point 238. The conclusion was drawn that the over-all length of the fissure field was about one inch.

As the pick up 222 continues to the right, it enters the field of the burn spot 203 in Figure 7 and produces the signal 240 in Figure 8. This signal consists of a plurality of peaks, none of great amplitude but forming together a signal of extended length, indicating that the pick up moving along the rail required considerable time to produce the signal. From the point 242 to the point 244, the distance is two-tenths of an inch, and referring to the rail 200 in Figure 7, it is seen that the burn spot 203 is approximately two inches long.

The visible signal produced in Figure 8 provides further significant information in that measurement of the distance between the center of the burn signal to the center of the fissure signal produces a distance of about five-sixteenths of an inch. Multiplying this by the factor 10, which is the scale differential between Figures 7 and 8, one derives the distance three inches as being the actual distance between the fissure 202 in Figure 7 and the center of the burn spot 203 in Figure 8. Measurement in Figure 7 proves this to be the fact. Irrespective of whether applicants' signal exactly portrays the fissure flux field, it does accomplish the two things that are important from a commercial standpoint: namely, it tells the observer the length of the source of the disturbance in the rail, which fact was established in comparing the showings in Figures 7 and 8, and further provides distinct patterns for distinct types of flaws. These distinct patterns will now be treated.

It may be explained at this point that the intensity and length of the detectable magnetic fields produced by various rail flaws, varies somewhat according to the method employed for magnetizing the rail. In practice, we have made use of an electro magnet having a U-shaped core, with its pole pieces spaced about 12 inches apart and measuring about 4 x 6 inches. The magnetizing coil for the core had about 6,000 turns, and was excited with about 0.75 ampere. This core was moved along the rail about $\frac{1}{8}$ of an inch from the upper surface of the rail ball, and at a constant speed of about 7 miles per hour. The residual magnetism produced by this procedure affords magnetic fields (or magnetic modulations) for the rail flaws, with the detectable fields for transverse fissures having a length varying from about 1 to 1½ inches. The fields for different types of flaws also vary in character, particularly in that extended burns produce fields of lesser intensity which generally extend for a greater distance along the rail.

To make clear what is meant by discriminatory types of signals, Figure 10 represents a signal obtained by use of applicants' invention from a burn about 2 inches long, with no transverse fissures or cracks in the surface metal. Figure 11 represents a two-inch burn, with surface cracks in the hardened metal. Figure 12 represents the signal obtained from a 4 inch burn with a few surface cracks, and the height of the peak in this signal indicates a small internal fissure beneath the burn. The signal represented in Figure 13 represents a three inch burn with a progressive fissure, the fissure causing the peak. In Figure 14, the signal shows a pronounced peak, and in this instance upon investigating the rail it was found to be produced by a magnetic spot in the rail, having a length of about 7½ inches.

The signal in Figure 15 came from a horizontal split head. It is characterized by a plurality of signals of considerable amplitude plus at least one high peak. Applicants treat this signal as typical not only of a horizontal split head, but also of a vertical split head and of a shelly spot. The signal in Figure 16 was derived from a compound fissure having two transverse components conected by a horizontal component. This information, together with that relating to Figures 18 to 21, was obtained by breaking the rail. Figure 17 was derived from a large transverse fissure, fifty percent of the ball of the rail or more, while the signal in Figure 18 was obtained from a small transverse fissure.

Inspection of the rail producing the signal in Figure 19 disclosed a two-inch burn. Breaking of the rail in the burn disclosed a small fissure. The signal in Figure 20 was derived from a two-inch burn with a thirty percent internal fissure therebeneath. The signal in Figure 21 was derived from a small fissure two inches distant from a small burn, a condition similar to that set forth in Figures 7 and 8. In Figure 22, there is presented the visible signal of a rail joint with an internal transverse fissure close to the end of the rail, as provided by applicants' system. The peak 221 is derived from an internal transverse fissure, while the three-peak signal 223 is typical of a rail joint. As will appear hereinafter, the rail joint visible signal 223 has been attenuated, that is, reduced while the transverse internal fissure 221 is in its normal condition. A rail joint signal is attenuated because it is from five to ten times as great as the signal received from the largest of internal transverse fissures and unless it were attenuated, it would extend beyond the confines of the tube's screen and because of the rapidity with which it is delineated, would be both difficult to see and difficult to appraise. Moreover, if the amplification value of the system were reduced to a point such that the rail joint signal would be brought within the confines of the tube, signals from ten percent fissures would be so small that an operator could not detect them with any degree of certainty. In consequence, the relative amplitude of the rail joint potential signal to all other signals is reduced to about one-fifth what the value would be if no attenuation of the rail joint signal were practiced.

The three-peak signal in Figure 22 is typical of a rail joint. Measurement of the total length of the signal along the reference line gives a distance of about five-eighths of an inch, which when multiplied by ten gives a flux field having an over-all length of about six inches or about three inches on each side of the joint. A sharp peak 225 is shown on one of the lowermost peaks of this rail joint visible signal and breaking of a rail end which has a field which produces such a peak on the regular rail joint signal disclosed a fissure in the rail. The presence of these peaks on the attenuated rail joint signal, as has been repeatedly demonstrated, are derived from an internal fissure within three or four inches of the end of a rail, and, thus, it is evident that applicants' system of examining a rail flux field in space increments having a length longitudinally of the rail of less than the length similarly measured of a transverse fissure flux field will visibly present during the exploratory and analyzing steps signals from internal transverse fissures close to the end of the rail.

Moreover, the signal 221 has its center approximately eleven-sixteenths of an inch from the center of the rail joint signal which indicates that this internal transverse fissure is approximately seven inches from the end of the rail. This is well within the joint bars. It will be understood, and later exactly described, that the attenuation of the rail joint signal commenced at some point such as 227 between the transverse fissure and the end of the rail. Applicants commence the attenuation of all signals at rail joints commencing at a point five inches from the end of the rail. If a fissure occurred between the points 227 and the beginning of the rail joint visible signal, it would appear as a reduced peak 229 in Figure 22.

From the foregoing it is seen that by applicants' method and apparatus, it is possible to locate, first, fissures inside the joint bars, secondly, fissure signals actually superposed on the strong signal derived from the rail joint, thirdly, internal transverse fissure signals immediately next to harmless flaws such as burn spots and magnetic spots, and, fourthly, internal transverse fissures within magnetic spots or beneath burn spots.

While emphasis has been laid in the foregoing description upon the use of a relatively small pick up coil, further advantages accrue from the use of this coil in conjunction with other parts of applicants' equipment later to be described. Thus, the visible signals presented in Figures 10 to 22 are possible only because of the extended path which the delineating means, namely, the tube beam, must traverse for each rail length. For example, while the pick up 22 in Figure 7 is moving one inch along the rail, the beam of the tube is moving along the reference line one-tenth of an inch, a distance sufficient for the eye to detect readily significant signals.

Additionally, the minor potential signal suppressor, full wave rectification and the signal limiter each assist in producing the results desired. The rail joint signal attenuator makes it possible to utilize this method of rail flaw detection for those portions of rails at the rail joints as well as for other portions of the rail. Because the visible signal must be greatly extended in order for applicants' highly discriminatory signal to be read, the use of a fading signal in conjunction with a warning signal assists in securing proper analysis of each dangerous signal while avoiding accumulation of paper which necessarily would in large quantities if applicants' extended visible signal were placed thereon. Forty-eight inches of tape would be required for each rail.

While certain features of the present invention can be used to advantage with a considerably larger pick up coil, the small coil as described makes possible not only highly discriminatory signals, but also separate signals from flaw positioned relatively close together, and signals making it possible to readily detect a serious fissure superposed or located within a less serious flaw, such as a burn. If one should resort to other types of magnetization, such as the sending of a heavy current through a portion of the rail undergoing observation, then the detectable magnetic fields caused by the different flaws would be considerably greater in extent. With such greater fields, one can make use of a pick up coil of considerably greater length as measured lengthwise of the rail (as for example a coil having an overall length of one inch where the detectable field of a fissure is, say 4 inches lengthwise of the rail), and such a coil will give characteristic signals enabling one to discriminate between different types of flaws. However, such an arrangement sacrifices ability to detect fissures located close to less serious flaws like burns, or to detect fissures located within burns.

Considering the type of magnetic fields which we prefer to employ, namely flaw fields caused by residual magnetism in the rail, the length of the detectable magnetic field for the average transverse fissure is more than twice the length of the coil lengthwise of the rail. Although pick up coils having a length less than 3/8 of an inch may, theoretically, be advantageous, in practice it has been found that such smaller coils have no practical advantage. In fact, too small a coil may not produce sufficient potential for proper operation of a vacuum tube amplifier. When a coil about ½ inch long is used, the discriminatory nature of the signals is noticeably impaired. When a coil one inch long is used, there is a serious impairment of the discriminatory character of the signals, and one impairs ability to detect transverse fissures located close to less serious flaws, such as burns. In general, it may be stated that we prefer to utilize a coil having a length longitudinally of the rail, which is a minor faction of the average length of the detectable magnetic field caused by transverse fissures. By minor faction, we have reference to a length less than one-half the average length of the detectable field.

The visual signal

In order to produce a visual signal which faithfully portrays the changes in potential derived from the pick up, the applicants preferably employ a cathode ray tube. The tube beam, having no appreciable inertia, can exactly follow the highly discriminatory signal provided by applicants' method of flaw detection whereas in pen and tape systems, the pen mechanism has both electrical and mechanical inertias, and has inherent periods of vibration. For example, in one type of pen mechanism, the arm supporting the pen has an inherent vibratory period whereby, when the pen arm is set in motion by a signal from the pick up, a visible marking is produced on the tape which is indicative of its vibratory period and not of that of the field above the ball of the rail. The beam of a cathode ray tube, on the other hand, has no disturbing periods of mechanical or electrical resonance and will alter its course very exactly with changing potentials from the pick up, so that the visible signal produced by the beam on the screen will faithfully indicate the nature of the signal potentials applied to the tube.

Referring to Figure 23, the screen 300 of the cathode ray tube 158 is shown with a path formed of eight horizontal lines or sweeps 302, 304, 306, 308, 310, 312, 314 and 316. This path is not marked on the tube but is the base line delineated by the beam of the tube each time that the pick up completely traverses a thirty-nine foot rail. In practice, the total length of the eight sweeps is forty-eight inches, or four feet, which is related to a thirty-nine foot rail in the ratio of approximately one to ten. A visible signal extending one inch along a sweep is derived, therefore, from a source extending about ten inches along the rail. Similarly, a signal one-eighth of an inch long, such as that in Figure 17, derived from an internal transverse fissure indicates that the fissure flux field extended along the rail for slightly more than one inch.

In delineating the path shown in Figure 23, the beam of the cathode ray tube commences at a point of origin 318 and delineates the sweep 302. At the end of this sweep, it drops downwardly very quickly and delineates the second sweep 304 from right to left. This method of delineation is repeated until the bottom sweep 316 is completed, at which time the beam returns to the point of origin 318 almost instantly. The speed of the beam along the sweeps is proportional to the speed of the exploratory car along the rail. The pick up traverses a rail in approximately four seconds and the beam completes one traverse of all eight sweeps in the same time. In practice, visible signals persist for about three and one-half seconds, with certain adjustments of the controls of the cathode ray tube and with a screen of long persistence. In Figure 23, the beam is at the point 324 where the visible tracing is brightest. Each sweep thereabove is successively dimmer. The connection between the sweeps 308 and 310 cannot be seen and only a portion of the top sweep can still faintly be seen.

The visible signal on the screen of the tube in Figure 23 is a true reproduction of what an observer sees when the beam of the tube is at the point 324. At that moment, a rail joint signal on the upper sweep and a part of that sweep have faded completely from view, as indicated by the dotted lines. A signal 322 derived from a transverse fissure appearing on the third sweep is becoming dim. The observer's attention was directed to this signal by the sounding of a warning bell at the time the beam delineated the signal and at the moment when the beam is at 324, after having observed the clean-cut, sharp peak for approximately two and one-half seconds, he is ready to give the order to stop the exploratory car in order to analyze the source of the flaw. The remainder of the lower sweep is undelineated but shortly will be presented by the sweeping beam moving toward the left.

The means for causing the beam of the tube to traverse this path may generally be described as a horizontal positioning potential applied to the horizontal deflection plates 204 and 206 (Fig. 26) of the cathode ray tube and a vertical positioning potential applied to the vertical deflection plates 361 and 360. The potential signals derived from the rail pick up are superposed or caused to ride the vertical positioning potential. Separate means are utilized for producing the horizontal positioning potential, the vertical positioning potential and the superposing of the potential signals derived from the pick up on the vertical positioning potential, and these three means will now be described in order. These potential signals at the time they are caused to modulate the vertical positioning potential are partly suppressed, partly limited, full wave rectified modifications of the potential signal produced by the pick up. While full wave rectification is desirable and simplifies certain problems in the push-pull amplification stages and in the minor suppression stage 130 and the signal limiting stage 128 (see Figure 6), it is not essential because an unmodified potential signal derived according to applicants' method can be directly indicated by the cathode tube.

The horizontal positioning potential has two characteristics, namely, it causes the beam to move at a speed proportional to the rate of speed of the pick up along the rail, and, secondly, it causes the beam to move back and forth from left to right and back to left from a selected maximum leftward point of deflection to a selected maximum rightward point of deflection. In order for the beam to move horizontally at a speed proportional to the rate of travel of the car, referring to Figure 25, the rotary potentiometer 160 is driven by the motor 164 synchronously with the tachometer generator 72 (see Figure 6). The motor 164 and the generator 78 are selected so that through a reasonably broad range of varying speeds of the generator 78, the motor will turn synchronously with the generator. Through a reduction gear assembly 325 and gears 326 and 328, the motor 164 drives a shaft 330 which is centrally disposed with respect to a circular resistance 332 of the rotary potentiometer 160 having a circular contact surface whereby a contact number 336 on an arm 338 keyed to the shaft 330 may contact successively all points on the circular resistance 332 as the shaft 330 rotates.

The circular resistance 332 is disposed in a circuit deriving current from a battery, indicated in Figure 26 by the numeral 333. For purposes of convenience, the positive and negative poles of the battery are indicated and it will be seen that conductors from the battery connect through potentiometers 342 and 344 to contacts 346 and 348 at diametrically opposite points on the circular resistance 332. In Figure 26 the arm 338, shown in Figure 25, is represented by an arrow. It is evident that points of the circular resistance 332 are at a potential relative to ground potential proportional to their distance from the contacts 346 and 348, that the potential at the midpoints 352 and 354 is zero, and that by moving the arm 338 clockwise around the circular resistance 332, the potential in the conductor 162 will rise from zero to a maximum positive value, drop through zero to a maximum negative value and return to zero. The conductor 162 from the arm member 338 leads to the grid 356 of a tube positioned in a push-pull stage, from which stage a derived potential is conducted to the horizontal control plates 204 and 206 of the cathode ray tube 158.

To describe the operation of this rotary potentiometer in conjunction with the push-pull stage 157 and the cathode ray tube 158, when the arm 338 is in the position shown in Figure 26, the conductor 162 is at zero potential. The grid 358 of a tetrode tube 357 in the push-pull stage 157 is likewise at zero potential. The plate 363 of the tetrode tube 357 and the plate 365 of the tetrode tube 359 are supplied from a single source of potential 367 through equal resistances 369 and 371. The line 205 connects the plate 363 with the horizontal deflection plate 206 and the line 207 connects the plate 365 with the horizontal deflection plate 204. When the potential on the grid 358 is zero, the plates 363 and 365 have an equal potential which is positive with respect to ground, the potential on the conductor 367 being positive with respect to ground. Consequently, the potentials on the two deflection plates 204 and 206 are equal, and referring to Figure 23 the beam of the tube will impinge on screen 300 at point 351, the center of the screen.

As the arm 338 moves clockwise, the resistance between the arm 338 and the contact 346 steadily decreases, with the result that a positive potential in the conductor 162 correspondingly increases until it reaches a maximum when the arm 338 reaches the contact 346. This increasingly positive potential is conducted to the grid 358 and decreases the resistance of the tube, with the result that the potential on the plate 363 will drop in a given amount, which drop will be communicated by the conductor 205 to the horizontal deflection plate 206. It is a characteristic of a push-pull stage that there will be this increase in potential on the plate 365 exactly equal to the decrease in the potential on the plate 363. It is seen, therefore, that by moving the arm 338 from point 352 to the contact 346, the potential on the plate 204 will rise to a predetermined value, depending upon the amplification value of the push-pull stage 157, while the potential on the other horizontal deflection plate 206 will drop in an equal amount.

Referring now to Figure 23, the two plates 204 and 206 are shown by dotted lines. During the process just described, as the potential on the plate 204 increases and the potential on the plate 206 decreases, the beam will move from the center 351 of the screen toward the left to describe a horizontal line indicated by the numeral 362. It will be understood from the foregoing that the potential on the horizontal deflection plate 204 increases in amplitude by the same amount per unit of time as the potential on the plate 206 decreases in amplitude, both potentials being positive at all times with respect to ground. The purpose of this relationship is well understood, it being that while the horizontal deflection plate 204 is drawing the beam toward itself, it is desirable to lessen proportionately the attraction of the other horizontal deflection plate 206 in order to prevent fanning out of the beam as it approaches the plate 204.

Referring to Figure 26, as the arm 338 moves through the lower right hand quadrant of the circular resistance 332, the resistance between the arm and the point 346 steadily increases so that the potential on the conductor 162 correspondingly decreases. During this phase of the operation, the positive potential on the grid 358 is steadily dropping so that the tube 357 is becoming less conductive and the potential on the plate 363 is similarly rising to its normal value. Similarly but oppositely, the potential on the plate 365 is steadily decreasing. The result is, referring to Figure 23, that the beam of the tube is returned from its maximum left hand deflection to the center of the tube.

Returning to Figure 26, as the arm 338 rotating clockwise moves into the lower left hand quadrant, the resistance between itself and the maximum negative potential at the contact 348 is steadily decreasing with the result that the arm 338, the conductor 162 and the grid 358 become steadily more negative with respect to ground. When the grid 358 becomes more negative, the tetrode tube 357 becomes less conductive with the result that the potential on the plate 363 rises, which rising potential is communicated by the conductor 205 to the horizontal deflection plate 206. When the plate 363 becomes more positive, the plate 365 of the tetrode 359 becomes equally less positive. Consequently, the potential on the horizontal deflection plate 206 continues to rise while the potential on the plate 204 continues to drop, with the result, referring to Figure 23, that the beam moves to the right of the center point 351 along the path 363.

Referring to Figure 26, when the arm 338 reaches the contact 348, the beam, referring to Figure 23, will be drawn to its maximum point of deflection to the right. In order to return the beam to the center of the screen, referring to Figure 26, the arm 338 moves clockwise through the upper left hand quadrant, and during the time the negative potential on the arm 338 steadily drops toward zero. As this drop occurs, the two plates 204 and 206 of the cathode ray tube 158 sustain equal but opposite changes in potential until the arm 338 is at the point of zero potential 352 of the circular resistance 332.

It is seen, therefore, that the motor 164, see Figure 24, which is turning synchronously with the generator 78, will cause the beam to move horizontally from left to right and back to left across the screen of the tube at a speed proportional to the rate of travel of the car along the rail. Moreover, the reduction gear assembly 325 and the gears 326 and 328 are so related to each other that four complete revolutions of the arm 338 are completed during the time required for the car to traverse one thirty-nine foot rail. Consequently, the beam is caused to move from left to right and back to left four times while the car is traversing one rail length.

The vertical positioning potential is the means for causing the horizontally sweeping beam to delineate eight distinct sweeps 302 to 316. Referring to Figure 26, this vertical positioning potential as applied to the vertical deflection plates 360 and 361 of the cathode ray tube is of such a character as to cause the potential on one plate such as 361 to drop in seven steps of equal amplitude from a given maximum to a given minimum while the potential on the other vertical deflection plate 360 is increasing in seven steps of equal value. When the potential on the upper vertical deflection plate 361 has reached its lowest value and the potential on the lower vertical deflection plate 360 has reached its highest value, the vertical positioning potential instantly restores the maximum potential to the upper plate 361 and the minimum potential to the lower plate 360. Thus, in Figure 23, when the maximum potential is on the upper vertical deflection plate 361, the beam of the tube will be held at the level of the sweep 302. As the potential on the vertical deflection plate 361 drops by a selected amplitude and the potential on the vertical deflection plate 360 increases by an equal amplitude, the beam of the tube will be caused to occupy the horizontal position occupied by the sweep 304. By this changing of the potential on the two vertical deflection plates 360 and 361 by equal but opposite amounts, the beam will ultimately be drawn to the level of the bottom sweep 316.

It will be appreciated that the change in the potential on the vertical deflection plates 360 and 361 must be synchronized to occur at the time when the beam of the cathode ray tube is at either its furthermost deflection to the right or its furthermost deflection to the left under the influence of the varying potentials on the horizontal deflection plates provided by the horizontal positioning potential. Also, the time interval between each change of potential on the vertical positioning plates must be sufficient to permit the beam to make one horizontal traverse of the screen.

The means for providing the vertical positioning potential consists of, referring to Figure 26, two potentiometers 370 and 372, the commutator diagrammatically shown as 152 and the resistance coupled, direct current push-pull amplification stage 156. The means for synchronizing the action of the commutator with the rotary potentiometer 160 is shown in Figures 24 and 25.

The means for providing the vertical positioning potential will be described first. Referring to Figure 26, a triode tube 374 has a positive voltage on its plate 376 of, for example, 300 volts with respect to ground supplied by the conductor 378. The voltage drop due to the resistance of the triode tube 374 may be of a value as, for example, 270 volts, so that the potential on the cathode 380 and the conductor 382 will be at 30 volts, positive with respect to ground. A second conductor 384 is at a negative potential with respect to gr nd equal in amplitude to the positive potenti. I on the conductor 378, and a resistance 386 eq..  l to the resistance of the triode tube 374, when the grid 468 is at zero potential with reference to ground, consequently reduces the voltage at the point 388 to, for example, minus 30 volts with respect to ground. The resistances of potentiometers 370 and 372 are equal so that the point 390 will be at ground or zero potential.

The potentiometers 370 and 372 are so adjusted as to impress on the conductors 392 and 394 equal but opposite potentials, the potential on the conductor 392 being positive and that on the conductor 394 being negative with respect to ground. The conductor 392 is in contact with a slip ring 396 on the commutator 152 which is connected by the conductor 398 to one end of the resistance 161. The conductor 394 contacts a second slip ring 400 which is connected by the conductor 402 to the other end of the resistance 161. The conductor 398 is also connected to the contact segment 404 and the conductor 402 is connected to a contact segment 406. The resistance 161 is divided into seven equal portions, which, as will appear in the physical embodiment, comprises seven identical resistors 408, 410, 412, 414, 416, 418, and 420. At the point of connection between adjacent resistors, a conductor leads to a contact segment, there being six of such segments 422, 424, 426, 428, 430, and 432. The contact arm 154 is positioned to engage all of the contact segments successively and to communicate the potential of any contact segment by means of the conductor 434 to a tetrode tube 436, which forms part of the resistance coupled, direct current push-pull amplifying stage 156.

It is evident that when the contact arm 154 is in contact with the contact segment 406, the arm 154 and the conductor 434 will be at the same potential as the conductor 394, namely, a maximum negative potential with respect to ground permitted by the system. As the commutator 152 is rotated clockwise, the contact arm 154 engages the contact segment 432. When this occurs, the potential on the contact arm 154 is equal to the potential on the conductor 394, less the potential drop in the resistor 420. By passing from the contact segment 406 to the contact segment 432, therefore, the negative potential on the contact arm 154 has decreased with respect to ground by the potential drop in the resistor 420.

Further clockwise rotation of the commutator 152 causes the contact arm 154 to engage successively the contact segments 430 and 428 with resulting equal reductions in potential in the conductor 434, the resistors 416, 418, and 420 being identical.

In passing from the contact segment 428 to the contact segment 426, the negative potential on the conductor 434 changes to a positive potential of equal amplitude with respect to ground. The reason for this is that the potentials on the conductors 392 and 394 are equal but opposite and consequently the midpoint of the resistance 161 will be at zero potential. This point, indicated by the numeral 438, is at the midpoint of the resistor 414. Inasmuch as the conductors 440 and 442 are equi-distant from this midpoint 438, it is evident that the contact segment 428 will have a given negative value which is equal to, with respect to ground, a positive potential on the contact segment 426. As the commutator 152 further rotates clockwise, it will engage successively contact segments 424, 422 and 404, and the conductor 434 will show an increase in positive potential as the resistors 412, 410 and 408 between the contact arm 154 and the conductor 392 are successively removed.

In passing from the contact segment 404 to the contact segment 406, the contact arm 154 changes in potential from a maximum positive to a maximum negative. The time required for the contact arm 154 to cross the gap 444 between the contact segments 404 and 406 is short. This gap is small, as may be seen in Figure 25, and is identical to the gaps between the remainder of the contact segments. Upon the size of this gap depends the interval of time required for the beam to pass from sweep to sweep. Referring to Figure 23, the line 446 was delineated by the beam of the tube as the contact arm 154, see Figure 26, passed over the gap between the contact segments 422 and 404. It is desirable that very little time be consumed by the beam in passing from sweep to sweep for a potential signal may be coming in at the time the contact member passes over a gap between contact segments with the result that the visible signal derived from the potential signal will be modified by the vertical line delineated by the beam in dropping from sweep to sweep. The commutator 152 rotates once in approximately four seconds so that the contact arm 154 is in engagement with a contact segment for approximately one-half of one second. The time required to cross a gap such as 444 is for practical purposes negligible. It will be noted, referring to Figure 25, that the gap between the contact segments 404 and 406 is of the same size as the gaps between any two other contact segments, but the vertical distance on the tube, referring to Figure 23, through which the beam must travel in moving from the sweep 316 to the sweep 302 is seven times as great as the beam must travel between any two adjacent sweeps.

Returning to Figure 26, the vertical positioning potential changing as described is communicated by the conductor 434 to the grid 435 of a tetrode tube 436 in the resistance coupled, direct current push-pull amplifier 156. Assuming that the contact 154 is in engagement with the contact segment 406 so that a maximum negative potential is on the grid 435, the conductor 437 from the plate 439 of the tetrode tube 436 will show a maximum increase in potential while the conductor 441 from the plate 443 of a second tetrode tube 445 will show a maximum decrease in potential. As a consequence, the upper vertical deflection plate 361 will have a maximum potential and the lower vertical deflection plate 360 will have a minimum potential. Referring now to Figure 23, under such circumstances, the beam will be drawn to the level of the top sweep 302.

Referring again to Figure 26, as the arm 154 moves from the contact segment 406 to the contact segment 432, the maximum negative potential with respect to ground on the grid 435 will drop in accordance with the resistance of the resistor 420 now disposed between the potentiometer 372 and the contact arm 154. The push-pull stage 156 will cause the potential on the vertical deflection plate 361 to drop by an amount equal to the increase in potential on the plate 360, and, referring to Figure 23, the beam will drop to the level of the second sweep 304. This process is repeated until the contact 154 is about to move from the contact segment 404, which has a maximum positive potential with respect to ground, to the contact segment 406, which has a maximum negative potential with respect to ground. When the arm 154 crosses the gap between these contact segments 404 and 406, the potential on the grid 435 changes from a maximum positive to a maximum negative, whereupon the potential on the conductor 437 and the upper vertical deflection plate 361 changes from a minimum positive to a maximum positive. Simultaneously, the potential on the plate 443, the conductor 441, and the vertical deflection plate 360 changes from a maximum positive to a minimum positive with the result, referring to Figure 23, that the beam is drawn almost instantly from the level of the bottom sweep 316 to the level of the top sweep 302.

Means for providing the vertical positioning potential and the horizontal positioning potential have now been described. Referring to Figure 23, it will be noted that in practice, applicants' complete rail flaw reference line is described within an area which is approximately square. As shown in its present form, each sweep is six inches long and the total height of the space enclosed is five and one-quarter inches. It will be appreciated, however, that the length of the horizontal sweep of the beam can be controlled by the potentiometers 342 and 344, see Figure 26, and that the distance between either the top sweep or the bottom sweep and the center of the screen 300 may be controlled by the potentiometers 370 and 372. In the latter case, the spacing between the sweeps will be varied as the distance between the sweeps is always one-seventh of the distance between the top and bottom sweeps. It follows, therefore, that the general position of applicants' rail signal with respect to the screen 300 as a whole, in Figure 23, may be readily adjusted. This is desirable because, in applicants' preferred arrangement, the signal appears on the upper side of the reference line with the result that the portion of the screen 300 below the lowermost sweep 316 is never used while the portion above the uppermost sweep, at its two ends, is cut off by the edges of the screen so that for such portions, a signal three sweeps high (the maximum size of any signal permitted by applicants' system) will not appear entirely on the screen. By moving the entire rail flaw reference line downwardly until the ends of the lowermost sweeps are close to the lower edge 448 of the tube's screen, the space above the upper sweep 302 is increased to permit large signals to be seen sufficiently to determine their character.

The means for synchronizing the commutator 152 with the rotary potentiometer 160 is shown in Figures 24 and 25. The numbers given to the various members in the diagrammatic showing in Figure 26 are repeated in these two figures. Referring to Figure 24, the commutator 152 is mounted on a shaft 450 rotatable in supports 452 and 454 and is driven through a gear 456 in engagement with the gear 326. The ratio between the gear 456 and the gear 328 is four to one so that the commutator 152 will complete one rotation as the arm 338 of the rotary potentiometer completes four rotations.

In order to cause the beam of the tube to drop from sweep to sweep at the moment when the beam reaches the end of a sweep and commences its return, it is necessary to position the arm 338, referring to Figure 26, at the points 346 or 348 at the moment when the contact arm 154 is crossing a gap such as 444 between any two contact segments. As shown in this figure, the contact arm 154 is at the midpoint of the contact segment 432 and the arm 338 is at the zero potential point 352 between the two points 346 and 348. It follows that the beam of the tube, referring to Figure 23, is at the midpoint of the second sweep 304.

In order that the beam will commence its course at the point of origin 318 in Figure 23, it is necessary, referring to Figure 24, to rotate the commutator 152 until the arm 154 is at the gap 444. The arm 338 is then turned on the shaft 330 to the position in which it is shown in Figure 25, where it contacts the resistance 332 at the point 346 which is at maximum positive voltage. Under such circumstances, as the system is placed in operation, the contact arm 154, see Figure 25, engages the contact segment 406 as the positive potential in the arm 338 commences to drop. The beam, therefore, starts at the point 318, see Figure 23, and moves to the right. As the arm 338 moves through the lower right hand and the lower left hand quadrants of the circular resistance 332 from the contact 346 to the contact 348, the beam completes the delineation of the top sweep 302 in Figure 23. When the arm 338 reaches the contact 348, referring to Figure 25, the commutator 152 will have completed one-eighth of a rotation and the gap 445 between the contact segments 406 and 432 will be positioned at the arm 154, with the result that as the arm 338 commences its movement through the upper left hand and the upper right hand quadrants of the circular resistance 332, the potential on the upper vertical deflection plate 361, see Figure 23, will drop in the same amount as the potential on the vertical deflection plate 360 increases so that the beam of the tube will make its return movement from right to left, not on the uppermost sweep but on the second sweep 304. This step by step process is repeated until the visible signal of the entire rail flux field is completed.

Having described the means for producing the complete rail flaw reference line which consists of an extended path on the screen of a cathode ray tube, the means for superposing the potential signal derived from the pick up moving along the rail will now be described. Referring to Figure 26, the conductor 146 carrying the potential signals from the pick up 50, see Figure 6, feeds the potentiometer 701 which is connected to the grid 468 of the triode tube 374 by means of the conductor 148. As will later be explained, the potential signal on the conductor 148 has been full wave rectified and is negative with respect to ground. In consequence, the conductivity of the tube 374 decreases directly with variations in the amplitude of the negative potentials received on the grid 468 with the result that the resistance of the tube is increased. Inasmuch as the two potentiometers 370 and 372 and the resistance 386 are all in a single circuit, it is apparent that the point of zero potential 390 will be shifted toward the potentiometer 370 and that in consequence thereof, the potential in the line 392 will become proportionately less positive and in the line 394 proportionately more negative. As explained heretofore, when the maximum negative positioning potential is on the conductor 434, the beam will be held at the level of the uppermost sweep 302, see Figure 23. If at this time a negative potential signal is received by the grid 468 of the tube 374, the conductor 394 will become proportionately more negative, with the result that the conductor 437 and the plate 361 will become proportionately more positive and will further deflect the beam to delineate a signal 449 above the sweep 302 indicated in dotted outline in Figure 23. It follows, therefore, that all potential signals received on the grid 468 of the coupling tube 374 while the conductor 434 is receiving a positioning potential negative with respect to ground through the contact segments 406, 432, 430, or 428, at which times the beam of the tube, referring to Figure 23, is delineating one of the upper four sweeps, will make the conductor 434 increasingly negative with the result that potential signals will always cause the beam to be drawn closer to the upper vertical deflection plate 361 so as to produce a visible signal above these sweeps. It further follows, therefore, that when the conductor 434 through the contact segments 426, 424, 422, or 404 is at a positive positioning potential with respect to ground, the negative potential signals reaching the grid 468 of the coupling tube 374 cause the conductor 434 to become less positive, and in so doing, the conductor 437 and the upper vertical deflection plate 361 becomes more positive and the lower vertical deflection plate 360 less positive, thereby again drawing the beam of the tube toward the upper deflection plate 361 so as to delineate the potential signal above the respective four lower sweeps, see Figure 23. In short, the potential signals are always negative with respect to the vertical positioning potential, thereby always causing the upper vertical deflection plate 361 to become more positive and the lower vertical deflection plate 360 to become less positive.

While the apparatus thus far described for causing the beam to delineate the complete rail signal shown in Figure 23 will cause the beam to move in the manner described, the visible signals derived from the potential signals, as, for example, signal 322 in Figure 23, would have practically no persistence. The reason for this is that if the intensity of the beam while moving along one of the sweeps is adjusted to a readily visible point, the beam in delineating a signal such as 322 must move so much more rapidly per unit of time than it moves along a sweep that it does not impinge on any point of the screen sufficiently long to leave a persistent trace. Thus, if the intensity of the beam is adjusted so that it will delineate one-tenth of an inch of the base line, this intensity is wholly inadequate when the beam is required to move a distance of two or three sweeps in the same time, as is necessary to delineate the three sweep signal 322. In order to overcome this difficulty, applicants employ a "Z" axis amplifier which has the characteristic of intensifying the beam of the cathode ray tube quickly in response to the lower amplitude portion of a potential signal and of sustaining this intensity of the beam despite further amplitude increases of the potential signal. The result is that the persistence of the tracings delineated by the tube beam above the sweeps will be sufficiently long to be readily readable.

Without describing the "Z" axis amplifier in detail, referring to Figure 26, a conductor 381 from the conductor 146 is connected to a potentiometer 383 which connects with the grid 385 of a pentode tube 387. A plate 389 of the pentode tube 387 is supplied with current from a potentiometer 391 deriving current by the conductor 393 from the line 378 which is at a potential such as 300 volts positive with respect to ground. A potentiometer 395 provides an adjustable fixed bias for the pentode tube 387. The amplified impulses derived from the potentials included in the pick up coil 50 are transmitted by a condenser 397 and a conductor 399 to the modulating or control grid 401 of the cathode ray tube 158. Potentials for the modulating grid 401, a focusing grid 403 and an accelerating grid 405 are supplied by the conductors 399, 409, and 407 from the cathode ray tube power supply contained in the case 49, see Figure 6.

The "Z" axis amplifier functions in the following manner. A potential signal derived from the pick up 50 when it reaches the conductor 146 has only negative components, that is, negative with respect to ground. While these potential signals from the pick up 50 are causing the beam to move along a course on the screen such, for example, as the visible signal 322 in Figure 23, they are also affecting the plate current of the pentode tube 387. Inasmuch as the pentode tube 387 is coupled to the modulating grid 401 of the cathode ray tube 158, and inasmuch as the modulating grid 401 is negative with respect to the cathode 411, it follows that the negative potential signals derived from the conductor 146 make the modulating grid 401 less negative with respect to the cathode 411 of the cathode ray tube 158. As a result, the number of electrons in the beam is increased. Voltages, control circuits for the tube electrodes, and the like will not be described because those skilled in electronics well understand how to effect the desired result.

It is highly desirable that the rail joint signal always appear on the upper sweep 302 and close the point of origin 318, see Figure 23. Short rail lengths are not infrequent and it is, therefore, necessary to speed up or slow down the horizontal and vertical positioning potentials in order to cause the beam to return to its proper position. Thus, assuming that the exploratory car after having run along standard length rails for some time which produce joint signals on the uppermost sweep, encounters a short rail with the result that the rail signal appears on, for example, the fifth sweep, referring to Figure 6, a rheostat 455 in the line from the tachometer generator 78 may be used either to increase or to decrease the speed of the motor 164. Inasmuch as the speed of the motor 164 varies directly within a limited range with changes in potential, the motor may be caused to speed up or slow down. If the rail joint signal appears on the fifth sweep, therefore, the visible signal observer will by means of the rheostat 455 increase the speed of the motor 164. In consequence, the beam will delineate the rail signal more rapidly and in traversing thereafter standard length rails, the rail joint signal may successively appear on the sixth, seventh, and eighth sweeps and finally on the top sweep. If on the other hand the rail joint signal should appear on one of the four upper sweeps, the visible signal observer by means of the rheostat 455 will slow down the motor 164 and as a result the rail joint signal will back up to its proper position on the top sweep. This adjustment means is, of course, of great importance after each stop for analyzing because the joint signals must again be caused to appear on the uppermost sweep.

Referring to the signal 322 in Figure 23 derived from a fissure, the desirable feature of the signal resides in the fact that the distance between points of zero potential 323 and 327 may be used to determine the length of a disturbance on the rail. Assuming, for example, that the distance between the points 323 and 327 in Figure 23 is one-tenth of an inch, by multiplying one-tenth of an inch by ten, which is approximately the ratio between the forty-eight inch beam path from the point of origin 318 to the terminus point 319 and a thirty-nine foot rail, the length of the source of the disturbance in the rail is found to be approximately one inch. The significance of the distance between the points of zero potential is not dependent upon the particular multiplication factor. While applicants prefer in practice to synchronize the speed of the beam in delineating the complete rail reference signal with the speed of the car, it would be quite possible to select an arbitrary constant speed for the beam and utilize a multiplication factor determined by the known speed of the car. For example, instead of synchronizing the speed of the beam with the speed of the car, the motor 164 may be operated at a known constant speed and a table showing the ratio between the speed of the beam and the speed of the car at various speeds may be prepared. The operator knowing the speed of the car at the moment that a signal is received could measure the length of the base of the visible signal and multiply it by the appropriate factor on the chart and thereby obtain the longitudinal length of the source of the signal in the rail.

In actual practice, the tube screen observer does not measure the base of a signal. With a little practice, one becomes skilled in estimating the length of the base of the visible signal and hence the length of the source of the signal. Moreover, a signal from a burn or magnetic spot is generally of longer duration and hence the signal tracing from a burn or magnetic spot is generally sloping with reference to the sweep and not at right angles thereto as in the case of fissure signals.

The configuration of the forty-eight inch path shown in Figure 23 is a desirable embodiment of applicants' complete rail signal. Other paths could be devised for securing the desired results. The long path is desirable in that the substantially vertical lines forming a visible signal derived from a transverse fissure should be separated at their base by a visible distance and one-sixteenth to one-eighth of an inch is about a minimum. If the forty-eight inch path were reduced by half, that is, to twenty-four inches, the ratio between rail length and beam travel would be approximately one to twenty so that a transverse fissure altering a flux field in an overall longitudinal length of one inch in the rail would be represented on the screen by two vertical peaks confined to a distance along the sweep of one-twentieth of one inch. Under such circumstances, when the intensity of the beam of the tube is at an amplitude sufficiently great to delineate a signal, these two peaks would be fused into one, and hence the character of each peak would not be discerned.

Applicants have experimented with long sinuous paths and with spiral paths. One desirable attribute of the preferred path shown in Figure 23 lies in the fact that the beam starts at the upper left hand corner and works downwardly much as one would read a book, although on sweeps 304, 308, 312, and 316, the beam moves from right to left. Considerable consideration was given to the desirability of causing the beam to move from left to right on all of the sweeps for when the beam is moving from right to left as on sweeps 304, 308, 312, and 316, the signals received are the reverse of the signals on the sweeps 302, 306, 310, and 314. It was believed, however, that these disadvantages were offset by the desirability of not requiring the eyes of the observer to make the long jump from the right hand side to the left hand side of the screen eight times in four seconds. It seems to be easier on the eye to follow the beam to the end of the line and drop one sweep than to cause the eye to sweep across the screen at so rapid a rate.

A sinuous path has the advantage of eliminating the quick drop at the end of each sweep which confuses a flaw signal when the signal occurs at the end of the sweep. A sinuous line, however, has the disadvantage of producing signals which, while at right angles to the path at the particular point where they occur, are not vertical at all times.

Method of exactly locating flaws in rails

As previously stated, another object of the invention is to provide a novel method and apparatus for locating a flaw indicated during the exploratory step. This is carried out by use of a pick up coil preferably of the same type as that used in the exploratory step. Instead of moving the coil continuously in one direction as in the exploratory step, it is reciprocated back and forth over the rail ball in a region where a flaw has been indicated by the exploratory step. In practice, the speed of movement of the coil can be the same as the normal speed of movement of the main pick up coil on the exploratory car, which in the previous given example was 10 feet per second. In conjunction with the pick up coil, a spotting coil is employed to facilitate exact location of a particular flaw. The apparatus utilized in carrying out this exact locating operation is termed an analyzer and is shown in detail in Figures 27, 28, and 29.

Figure 29:
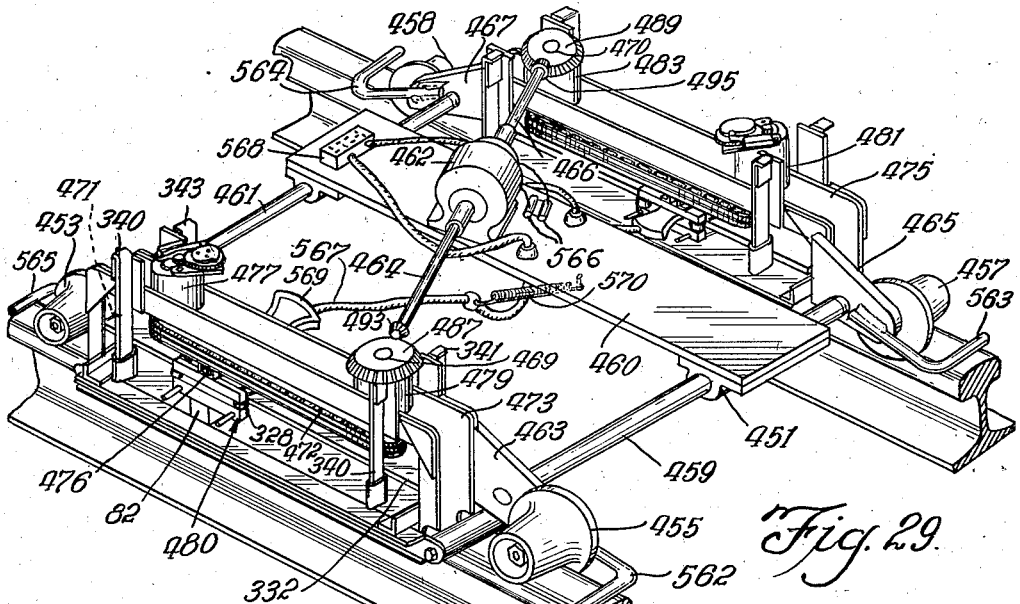
Figure 29 is a perspective view of the analyzer.

Referring to Figure 29, the analyzer comprises a four-wheeled carriage consisting of a frame 451 supported on the track by four flanged rollers 453, 455, 457, and 458. Centrally of the frame 451 is a platform 460 upon which is disposed a source of power, being an electric motor 462. Shafts 464 and 466 are coupled to the opposite ends of the motor shaft and drive by beveled gears two vertically disposed shafts 469 and 470. These vertically disposed shafts 469 and 470 are mounted in the opposite sides of the frame 451 and each drive one pick up assembly, there being a pick up for each rail.

Without describing in detail the elements of the analyzer, it is sufficient to say at this point that the entire analyzer frame is built of non-magnetic material in order to avoid adverse effects upon either the magnetic field around the rail to be examined or upon the pick up examining the field. Referring to Figure 27, the shaft 469 drives a double chain 472 by suitable sprockets on the shafts 469 and a second shaft 474. Depending from the chain 472 is a drive roller 476 which rides in a transverse track 478 of a pick up carriage 480. Suspended from the pick up carriage 480 is a pick up 82 identical to the pick up 50 shown in Figure 1 carried beneath the exploratory car. The pick up carriage 480, returning to Figure 27, is guided along a path parallel to the rail by a guide bar 484. The pick up 82 is disposed above the rail at the same height as the pick up 50 on the exploratory car, but there is disposed between the pick up and the top of the ball of the rail a non-conducting supporting resilient sheet 486. Referring to Figure 28, centrally of said supporting sheet is the spotting coil comprising a wire loop 488 having, for example, a one-inch opening 490 longitudinal of the rail. The terminals 519 and 521 connect to a source of direct current.

Referring to Figure 27, in order that the pick up 82 of the analyzer may produce a signal exactly like the signal produced by the pick up 50 during the exploratory step, it is necessary to move the pick up 82 above the ball of the rail at the same height and at the same rate of speed as that during normal operation of the exploratory car. The gears and the motor 462 are selected, therefore, so that the chain 472 moves approximately ten feet per second when the analyzer is stationary.

Assume that the equipment shown as a three-car unit in Figure 1 is advancing along a track at a speed of ten feet per second when a signal such as 322 in Figure 23 appears on the screen of the tube. The three-car unit is stopped, a matter of two or three rail lengths, and is backed up until the analyzer 14 approaches that portion of the rail where the signal was received. The coupling 84 is opened and a conductor from the pick up 82, assuming that the flaw is in the near rail, is connected to the principal amplification system, see Figure 6, by throwing a switch 496 which concurrently breaks the connection between the principal pick up 50 and said amplification system. The motor 462 is now started and it causes the pick up 82 to reciprocate above the ball of the rail at approximately ten feet per second.

Figure 30:
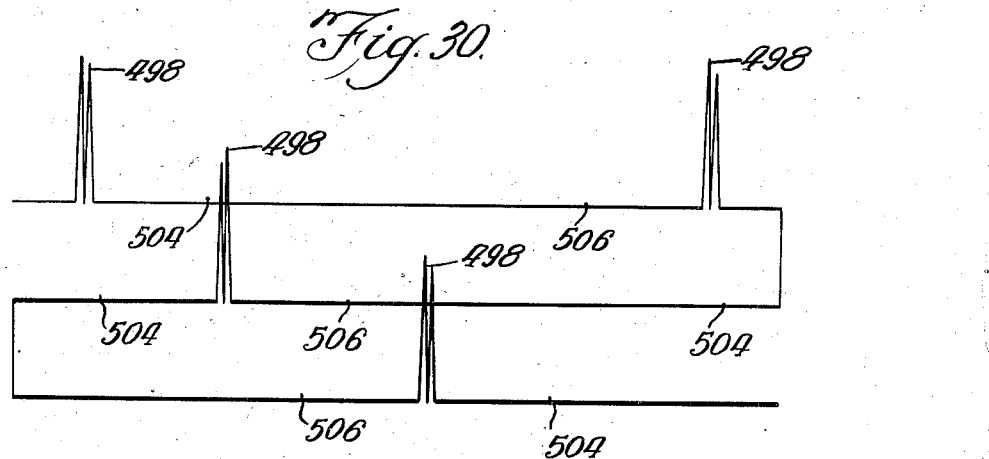
Figure 30 is a view of three sweeps delineated by the beam of the cathode ray tube as modified by a potential signal received from the spotting coil.
Figure 31:
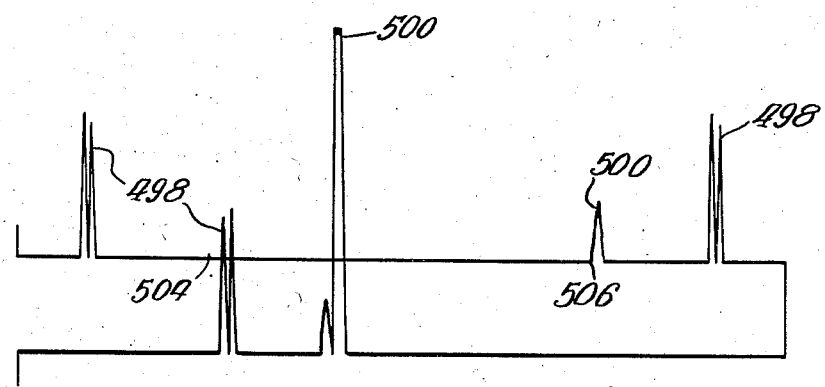
Figure 31 is a view similar to Figure 30 excepting that the beam of the tube is modulated by a potential signal derived from a transverse fissure flux field.

When the pick up 82 crosses the spotting coil 488, there appears on the screen of the tube, see Figure 30, a two-peak signal 498, which signal is repeated on the screen at intervals exactly proportional to the length of travel of the pick up 82 along the rail. Inasmuch as the distance between the shafts 469 and 474 is approximately two feet, and inasmuch as the pick up 82 passes over the spotting coil 488 once in each direction, the pick up crosses the spotting coil once for each two feet or twenty-four inches of rail length traversed. Since the distance that the pick up travels is related to the distance that the beam travels as ten to one, it follows that the spotting coil visible signals presented on the tube's screen should be 2.4 inches apart. Actually, however, in Figure 30 they are 4.8 inches apart. The reason for this is that the pick up is rendered ineffective when it is moving on the back stroke and for small portions at each end of the fore stroke. Only those potential signals induced in the pick up 82 while the pick up is moving from right to left, see Figure 27, through the eighteen inches between the points 501 and 503 on the slide 484, are permitted to deflect the beam of the tube. It follows, therefore, that the beam of the tube will not be deflected by potential signals received by the pick up 82 excepting for a distance of nine-tenths of an inch on each side of a spotting coil signal. Referring to Figures 30 and 31, the beam will always delineate a stright line between the points 504 and 506.

The operator continues to move the analyzer slowly along the track until there appears on the tube screen a second signal such as that shown in Figure 31 and marked 500. It will be appreciated that a visible signal derived from a potential signal will first appear at either point 504 or point 506, depending upon the direction of movement of the pick up coil 82 on the analyzer 14 and also upon the direction in which the analyzer is being moved slowly along the rail. In Figure 31, the visible signal 500 is shown incomplete on the first sweep and complete on the second sweep, indicating that in the time required for the beam to move from the visible signal 500 on the first sweep to the visible signal 500 on the second sweep, the operator had pushed the analyzer along the rail for at least an inch.

Figure 33:
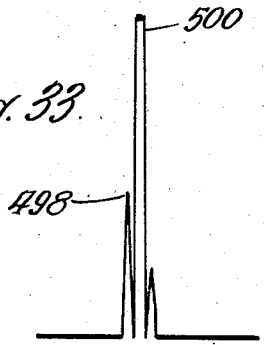
Figure 33 shows a visible signal derived from a fissure flux field potential signal as modified by a portion of the potential signal derived from the spotting coil.

In order to locate exactly the source of the signal 500 in the rail, all that is necessary is to move the analyzer along the rail until the fissure signal 500 and signal 498 from the spotting coil 488 become a single composite signal as shown in Figure 33. It will be observed in this figure that one component of the visible signal from the spotting coil has disappeared in the principal peak of the visible signal 500 from the fissure, the reason being that the field of flux above the rail created by the fissure was modified by the field of flux created by the spotting coil, and hence the induced potential was a derivative of the modified field. If the spotting coil is exactly centered over the fissure field, it will modify the fissure field and only one visible signal will appear. Because a strong fissure makes a visible signal much larger than the visible signal from the spotting coil, and because the tube observer does not know the exact way in which the spotting coil modifies any particular fissure field, it is possible for the tall peak of the fissure 500 to be larger or smaller than normally, although, the difference in amplitude would not be visibly discernable. The observer knows that the spotting coil is above the fissure because he sees the spotting coil signal modify the fissure signal as the analyzer is moved along the rail.

The exact position of the spotting coil over the rail being known, it follows that the fissure must be immediately beneath the spotting coil when the two signals register with each other on the tube screen. Having located the flaw in the rail, a cross as 491 in Figure 27 is placed on the rail at the exact spot. The analyzer is then moved forward, a strong direct current is passed through the marked portion of the rail by means of the electrodes 88 and 90, see Figure 1, and the two electrodes of the potentiometer, which are only three-quarters of an inch apart, are placed squarely across the fault to show the voltage drop between the two points.

Figure 32:
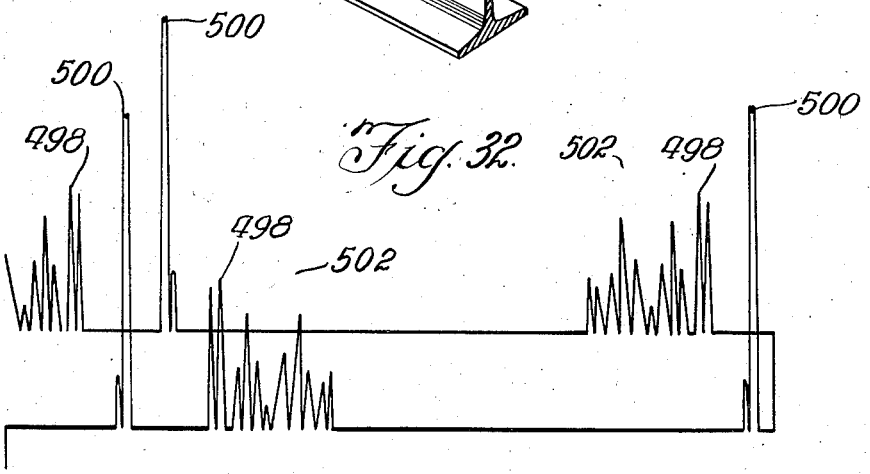
Figure 32 is a view of two sweeps of the cathode ray tube's screen showing the spotting coil visible signal between visible signals derived from a magnetic spot and an internal transverse fissure.

This method of utilizing a pick up and spotting coil for exactly locating the flaw, makes it possible for the hand check operator to know that he has examined the correct source of the danger. Contrasting this result with existing systems, and referring to Figure 32, a hand check operator attempting to locate a flaw by means of a potentiometer might first observe a surface defect capable of producing a signal 502, whereupon he would conclude that this signal from a harmless source was the cause of a non-discriminatory signal obtained in the exploratory step and he might not explore further to locate the dangerous fissure 500.

While in the present preferred form applicants have positioned the spotting coil at a fixed point on the analyzer whereby it is necessary to move the analyzer along the track until the spotting coil is above the flaw, an alternate form is contemplated wherein the spotting coil is mounted on a bracket movable along a slide parallel with the reciprocating motion of the analyzer-pick up. By this arrangement, when the analyzer has been moved along the rail to a point where the pick up passes above a flaw in the rail, it is not necessary to move the analyzer further. All that need be done is to slide the spotting coil along the rail. In the event that the reciprocatable pick up is suspended beneath the exploratory car itself, a movable spotting coil, such as that described, will be helpful as the power car operator need not move the exploratory car itself and a fixed position spotting coil exactly above the flaw, but need merely position the analyzer so that any portion of the slide will be over the flaw. Once the slide is over the flaw, the power car need be moved no farther. The spotting coil may be moved. Additional details of the analyzer will be presently described.

*Improved permanent record and rail counter*

At least in the case of visual signals derived from dangerous fissures, a permanent record of the visible signal on the cathode ray tube screen is desirable. While it is possible to photograph the complete rail visible signal, a photograph of the screen of the tube when the latter is connected to the pick up on the analyzer which is examining a suspected portion of rail, will suffice for commercial requirements. Toward this end, referring to Figure 2, a camera 510 is so suspended from the ceiling of the visual signal cab 36 that it may be moved toward or away from the screen 300 of the tube. The camera has a control 512 for controlling the opening and closing of the shutter. In use, when the operators have concluded that the analyzer pick up is portraying on the screen a signal from a dangerous flaw, the lens of the camera 510 is focused upon the screen 300 and the shutter opened for a sufficient period of time to permit the beam to repeat the signal from the dangerous fissure many times on the long path of the screen, without, of course, rerunning the path.

In some instances, the expense of photographing the visible signal from each entire rail may be warranted. The advantages of such a practice are clear in that a complete record of the visual signals obtained during operation of the exploratory car, affords the best possible means of checking the progressive development of flaws in rails over a period of time. Moreover, making such a record on a film which can be projected on a screen and enlarged to any size, serves to simplify greatly study of the record.

Where it is desired to photograph the screen of the tube for each successive rail traversed, we employ a special type of camera which possesses a control, which not only opens the shutter, but positions a new film frame behind the lens.

Figure 34:
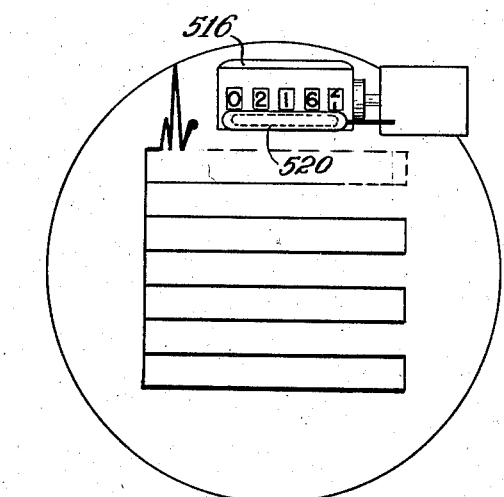
Figure 34 is a view of the screen of the cathode ray tube with a rail joint counter positioned in front of the upper portion.

Referring to Figure 6, the relay 140 when actuated, not only closes a switch 142 which causes attenuation of rail joint signals, but also closes switch 514 in a direct current circuit so as to actuate a mechanical rail joint counter 516 and the plunger control of the camera 510. A switch 518 manually controlled makes it possible to disconnect the camera 510 from this circuit when it is not desired to photograph the complete rail signal for each rail traversed. The rail counter 516 may be positioned at any point readily visible to the observer, but in conjunction with a system of photographing the visible signal on the tube's screen for each rail during the exploratory step, it has been found desirable to position the counter in front of the tube's screen, see Figure 34, and to provide a light source 520 for illuminating the numbers on the counter but nevertheless closely shielding the light away from the screen of the tube and from the lens of the camera.

In operation, therefore, when the exploratory car crosses a rail joint, the counter 516 is actuated and concurrently the shutter of the camera is closed and a new film frame is moved into position behind the lens. When the relay 140 opens after a selected interval of time, the shutter of the camera opens and immediately the number shown by the counter is photographed by the film. Meanwhile, the shutter remaining open, the room itself being dark, the beam of the cathode ray tube traces the path as shown in Figure 23. The result is that each film frame by proper positioning and focusing the camera may be caused to show the number of the rail which the pick up is traversing together with the complete rail visible signal.

*Method and means for magnetizing the rail*

With respect to the means employed for producing a desired magnetization of the rail, whereby the flaws will be represented by characteristic flux modulations or fields, it has previously been stated that we make use of an electromagnet which is progressed over the rail ball in advance of the pick up coil. Such an arrangement whereby the pick up coil is operated by residual magnetism of the rail, is disclosed and claimed in our co-pending application Serial No. 311,606. It has been found that some rails already possess a certain amount of magnetization, which may be in the form of magnetic spots, or in the form of transverse magnetization. Such magnetic conditions, together with the fact that rails vary in hardness and in capacity to hold residual magnetism, makes for lack of uniformity of the desired residual magnetic field, thus introducing variable factors which may influence accuracy of the results desired.

In order to produce a longitudinal magnetic field of fairly constant value throughout the length of the rail, applicants have resorted to the step of neutralizing any strong magnetic fields around the rail and of thereafter longitudinally magnetizing the rail. This two-step method of magnetization produces a residual magnetic field which has a desirably constant value. It is possible for applicants' equipment to move at its regulation speed from rail which has been transversely magnetized by the employment of existing flaw detecting apparatus to a new rail which lacks magnetic spots and has never been transversely magnetized and to perform a satisfactory flaw detection exploratory step upon either rail.

Figure 35:
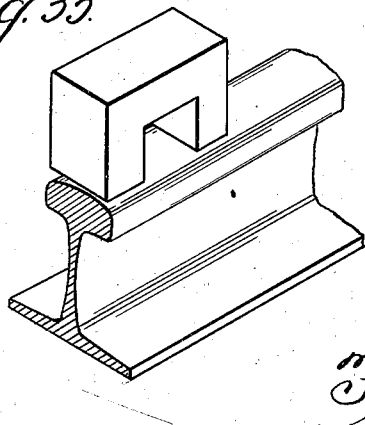
Figure 35 is a view of a pre-demagnetizing magnet with its poles parallel to the length of the rail.

The preferred means employed is an alternating current electromagnet with its two pole pieces aligned with the ball of the rail as shown in Figure 35. This de-magnetizing magnet is positioned, referring to Figure 1, in advance of the principal magnet 48. The changing direction of the flux caused by this magnet tends to produce the heterogeneous positioning of the molecules in the rail which result in a neutral flux field around the rail.

Figure 36:
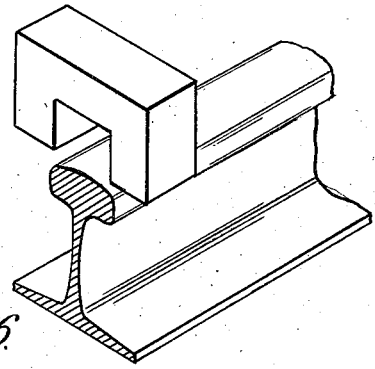
Figure 36 is a view of a pre-demagnetizing magnet with its poles transversely of the rail.
Figure 37:
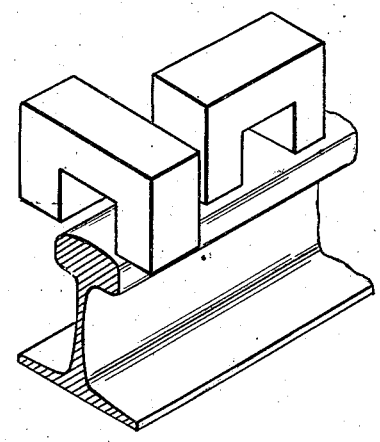
Figure 37 is a view of two pre-demagnetizing magnets.

In Figure 36, the predemagnetizing magnet has been positioned with its pole pieces transversely of the ball of the rail, while in Figure 37, two magnets, one with its pole pieces transversely of the rail, and the other with its pole pieces parallel of the rail, are shown.

As for the frequency used for the alternating current magnet 46, referring to Figure 6, it will be noted that the coil of the magnet 46 is directly connected to the rotary converter 32 which supplies alternating current at sixty cycles per second. This frequency has been found satisfactory but it is believed that lower frequencies may produce undesirable modulations in the rail. Thus, when the rotary converter is turned off so that the frequency of its output drops from sixty to zero as its speed decreases from normal speed to zero, while the exploratory step is being performed, there has been observed occasionally an undulating or low sine wave movement of the beam of the tube (in the absence of minor suppression to be described). This indicates that when the polarity of the alternating current magnet 46 is changing infrequently while the magnet nevertheless is covering approximately 120 inches of rail per second, its effect is to create restricted reverse fields in the rail, which reversed fields produce an undulating potential in the pick up. These short reversed fields have never possessed an amplitude sufficiently great that they could not be completely isolated from the beam of the tube by the minor suppressor, but if it should become desirable to use an alternating current magnet of increased magnetizing capacity, excessively low frequency may be definitely undesirable.

The analyzer

One of the major features of applicants' system is the analyzer. This device and the spotting coil have been briefly described for the purpose of demonstrating how applicants' new and improved method of locating a flaw can be practiced. The analyzer itself, however, is a major element in applicants' system. It is a flaw detector in itself.

Having seen during the exploratory step a highly discriminatory visible signal from what may be an internal transverse fissure, which visible signal faded from view in three and one-half seconds, one may desire to see the signal again. In prior practice, it is customary to re-run the rail. This, however, is time consuming and in applicants' system would reproduce the visible signal for only three and one-half seconds. However, applicants may study the highly discriminatory, transient, visible signal for as long a time as may be desired by use of the analyzer which reproduces the signal while the exploratory equipment is not in motion.

The major advantage of the analyzer lies not alone in reproducing strong potential signals which sound the warning bell and actuate the pen on the tape, but also in reproducing all of the potential signals derived from the flux fields on both sides of the field that produced the strong signal. When the center of the analyzer is squarely over a fissure, the spotting coil which was energized to assist location of the fissure flux field, is de-energized. The analyzer pick up then reproduces potential signals derived from all flux fields positioned within nine inches on each side of the fissure. The potential signals from these eighteen inches of rail are presented visually on the screen of the cathode ray tube approximately ten times in eight sweeps. When the strong fissure is immediately next to a burn spot, this relationship will be immediately established. For example, see Figure 21, where the tall peak from a fissure field is close to peaks derived from a burn. Or, if the fissure is beneath a burn, this factor will be clearly and unmistakably established as shown in Figure 20.

Figure 54:
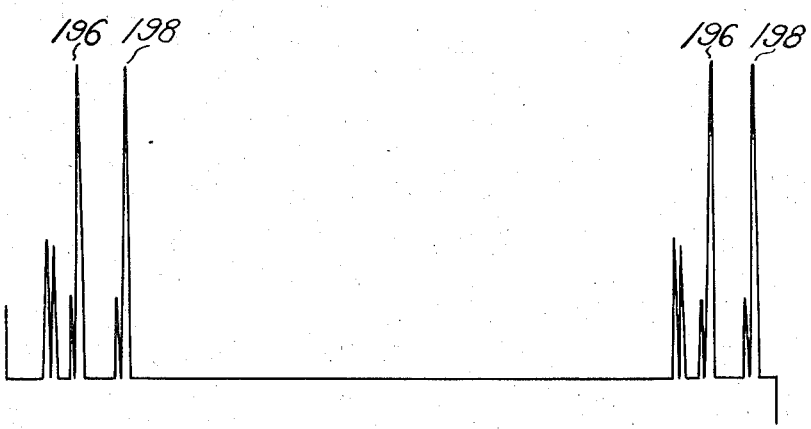
Figure 54 is a view of the screen of the cathode ray tube when deriving potential signals from the analyzer when it is positioned immediately next to a rail joint over a rail containing internal fissures four inches and eight inches from the rail end.

Another great advantage of the analyzer is its ability to permit study of flux fields immediately next to rail ends and adjacent to frog points. As mentioned heretofore, referring to Figure 22, the small peak such as 225 derived from a fissure and superposed upon part of the rail joint visible signal is so small that its meaning can not be determined with certainty. When such a signal is received during the exploratory step, the applicants stop and position the analyzer at the rail joint with the cut out point at about three inches from the end of the rail, that is, as shown in Figure 27, the point 503 on the slide being approximately three inches from the end of the rail. When the analyzer pick up 82 reaches the point 503, it is shorted to ground in a manner hereafter to be described so that the strong field at the rail end will not produce a potential signal which would temporarily paralyze the main amplifier. This makes it possible to present in full size potential signals from fissures, such as that which produced the small peak 229 in Figure 22. A reproduction of the visible signals produced by two internal fissures such as 198 and 196, one of which is only four inches from the end of the rail and both of which are within the joint bars, is shown in Figure 54.

Another advantage of the analyzer is its ability, in conjunction with the spotting coil, to evaluate the comparative strength of a given field and to check and calibrate the entire detecting system. The spotting coil, as has been described, consists of a single turn having two wires spaced a distance along the rail such as one inch and suitably excited, as, for example, by one quarter ampere. This spotting coil will produce a magnetic flux field around itself of an invariable intensity and conformation so long as the current remains the same. For example, potentiometer 701 in Figure 57 may be so adjusted that the potential signal picked up by the analyzer coil passing over the spotting coil energized with one-quarter ampere will produce a visual signal on the cathode ray tube having an amplitude of say, one and a half sweeps. With this calibration, any other signals picked up from flaws may be compared in amplitude with this reference amplitude. The spotting coil is used frequently for locating flaws, so that the sensitivity of the detecting system may conveniently be checked by observing the amplitude of signals derived therefrom during such flaw-locating use.

Describing now the analyzer in detail and referring to Figure 29, its framework comprises two shafts 459 and 461 having welded at each end arms 463, 465, 471 and 467 in the outer ends of which are positioned shafts for supporting the flange rollers 453, 455, 457 and 458. The two shafts are held in assembled relationship with each other by means of two channel members 473 and 475 which are U-shaped and inverted so that the ends terminate immediately above the ball of the rail. Mounted near either end of the channel members 473 and 475 on approximately 24-inch centers are heavy journal boxes 477, 479, 481 and 483 in which are mounted the vertical shafts such as 469 and 474 in Figure 27. These mountings are heavy because the pick up carriage 480 has considerable inertia with the result that there is a whipping tendency in the chain 472 each time that the pick up carriage reverses its direction of travel. Beveled gears 487 and 489 are rigidly disposed on the upper ends of two of the shafts such as 469 so that engaging gears 493 and 495 on the ends of the shafts 464 and 466 turned by the motor 462 will rotate the shafts such as 469. The analyzer motor 462 is driven by the direct current generator and the gear ratios are such that at normal speed the chain 472 will move approximately ten feet a second, the normal speed of the exploratory car 12.

Continuing to describe just one side of the analyzer, both sides being identical, and referring to Figure 27, double sprockets 497 and 499 are disposed on the bottom of the shafts 474 and 469 and in driving engagement therewith is the double chain 472. Depending from the chain is a drive roller 476 which depends sufficiently far to seat in the transverse track 478 of the pick up carriage 480. The pick up carriage rides the guide bar 484 by means of four broad rollers 505, 507, 509 and 511 disposed above and below the guide rail 484, and four narrow rollers, only two of which may be seen, 513 and 515. The pick up coil with the non-magnetic core 82 is mounted on the bottom of the carriage 480 by any suitable means.

Referring to Figure 28, the spotting coil 488 is disposed between the resilient sheet 486 and a similar short sheet of material, such as reinforced rubber 517. The sheeting 486 is drawn tightly over two drums 518 and 520 and is held to them by any suitable means. The ends 519 and 521 of the coil 488 are connected to a battery 524 through various means for controlling the amperage in the spotting coil 488, the circuit not being shown. An ammeter 528 may be positioned in the spotting coil circuit by the switch 529 and a rheostat control 530 controls the amperage in the spotting coil circuit. In order to make certain that the motor 462 of the analyzer is turning at the desired speed, a voltmeter 525, switch 526 and voltage control means 527, are positioned in the circuit of the motor 462. These various controls are mounted on a panel 531 which is resiliently supported by springs 532 from a special frame member 533.

As previously indicated, the pick up coil 82 is permitted to transmit induced potential signals to the main amplification system only on a portion of its fore stroke and on no portion of its back stroke. This is accomplished by shorting the pick up coil 82 to ground excepting during that time during which the pick up coil 82 is in the selected portion of its fore stroke. This is diagrammatically illustrated in Figure 55 where the pick up coil 82 is connected to ground 94 and by the conductor 535 to the main amplification system when the switch 496 (see also Figure 6) is in proper position. A conductor 536 connects to a switch 537 which in closed position shorts the coil 82 to ground 94. This switch is shown in Figure 56 where its control arm 539 has a roller member 547 in engagement with the periphery of a cam 551. The cam 551 is affixed to a shaft 553 which is driven by a gear 555 in driving engagement with a pinion 557 mounted on the upper end of the shaft 474, see Figure 27. The circumferential distance from the point 559 along the enlarged portion of the cam surface to the point 561 bears the same relationship to the peripheral distance around the reduced portion of the cam between the same two points as the distance between the points 561 and 562 on the chain 472, see Figure 27, bear to the distance between these two points around both sprockets and along the rear side of the chain. The chain is approximately 48 inches long and the distance between the points 561 and 562 is approximately eighteen inches which is a ratio of three to eight. This ratio is carried out in the design of the cam 551. Referring to Figure 56, the switch 537 is of the type which is open when the arm 539 is in the position shown. In the position of the pick up carriage 480, shown in Figure 27, the slide 476 is on the fore side of the chain and is moved from right to left which is the fore stroke. Under such circumstances, the pick up 82 should not be grounded and consequently, referring to Figure 56, the switch 537 is in open position because the roller 547 is engaging the enlarged diameter of the cam 551. In Figure 56, the pinion 557 is moving clockwise so that the cam 551 is moving counter-clockwise and when the pick up 82, referring to Figure 27, reaches the point 503 above the guide rail, the reduced portion of the cam 551, see Figure 56, will permit the roller 547 to close the switch 537 and to short the pick up 82 to ground. The drive roller 476, referring to Figure 27, now passes around the sprocket 487, crossing to the rear end of the transverse track 478 in so doing, so as to return the pick up 82 from left to right and around the right hand sprocket. When the pick up is again moving from right to left and reaches the point 501, the roller 547, see Figure 56, will have reached the point 561 on the cam, thereby opening the switch 537 so that the pick up 82 no longer will be shorted to ground but may transmit induced potential signals to the main amplifier.

The analyzer possesses several other features. Referring to Figure 29, there extends beyond each roller supporting arms 562, 563, 564 and 565. These arms are fastened to the frame by any suitable means and clear the rail by one-sixteenth to one-eighth of an inch. Their function is to protect the analyzer, and particularly the resilient sheets 486, from scraping along the rail when the rollers drop into low rail joints. The arms as 566 extend beyond the axis of the rollers such as 455 by as much as four or five inches and consequently when a low joint is encountered and the rollers commence to drop into the joint, the arm 562 will be four or five inches from the joint and will support the roller and the analyzer until the joint is passed.

Another feature is shown in Figure 29 and consists of one or more condensors 566 connected to the commutators of the motor 466 for the purpose of eliminating any arcing effects which might produce potential signals in the pick up.

Continuing to refer to Figure 29, a satisfactory connection between the pick up coil 82 and a plug-in panel board 568 is established by anchoring the conductor 567 at approximately the midpoint of the platform 460 and guiding its movement through a flattened funnel cage 569, mounted on the rear of the pick up carriage 480. Springs, such as 570, hold the conductor 567 taut.

The buffers 492 and 494, see Figure 27, have been mentioned. They are mounted on angle irons attached to the channel members 473 and 475 and there are two adjacent to each end of the guide rail.

Broadly viewed, the analyzer bridges the gap between applicants' highly discriminatory but transient visible signal and non-discriminatory signals obtained by the pen and tape unit. This is particularly true where the visible signal presented on the screen of the cathode ray tube for each rail flux field is not photographed. It may be considered as a means for practicing a new method for detecting flaws in that the applicants present in transitory visible form a highly discriminatory signal, then repeatedly present in transitory visible form significant flaw flux fields while making in permanent form by the pen and tape unit non-discriminatory signals produced by all fields having the ability to produce a potential signal of a given amplitude in the pick up.

In one modification, the principal pick up 50 and the rail joint attenuator pick up 92 is removed from the exploratory car. The pick up 50 is eliminated from the system entirely and replaced by the pick up 82 which is permanently connected to the main amplifier. This renders unnecessary the switch 496 shown in Figure 6 and in other figures. In order to employ the analyzer pick up during the exploratory step, all that is necessary is to move it to a selected point on the guide rail 484 and maintain it at this point during the practice of the exploratory step. The actual position of the pick up carriage 48 and the pick up 82 during the practice of the exploratory step is immediately to the right, referring to Figure 27, of the point 503 on the guide rail 484. This point is chosen because it is necessary to mount the rail joint attenuator pick up a suitable distance such as approximately four to five inches in advance of the principal pick up 82, as indicated in dotted outline by the numeral 248. The rail attenuator pick up is positioned at the point 248 by being suspended in the frame of the analyzer by any suitable means. By this arrangement, at the completion of any analyzing stage, the operator manually moves the pick up carriage 480 to the point immediately to the right of the point 503 on the guide rail 484. The motor 462 is disconnected from its source of power and the inertia of the carriage 480 and other parts of the analyzing system will maintain its position during the exploratory step. This arrangement considerably simplifies the wiring layout.

A further modification involves mounting the analyzer from beneath the power car. If such is done, the analyzer is made retractable, that is, so that it can be moved a limited distance relative to the main car. The rollers for supporting the analyzer can be omitted.

The pick up

In practice, applicants' small pick up coil can consist of a core 540 of non-magnetic material, such as Bakelite, see Figure 42, with a channel 542 for holding the strands of the coil in position. The potentials induced in this coil are not seriously affected by lateral or vertical movements of the pick up provided such movements are not large. The exploratory car has a wheel base of some five feet and in practice is equipped with rubber tires. Due to curves or unusually canted rail, there may be considerable lateral and vertical movement of the pick up with respect to the ball of the rail. This has been found to produce no serious effects in obtaining applicants' highly discriminatory signal. Referring to Figure 41, it will be observed that applicants' coil extends on both sides of the rail as much as one-half to three-quarters of an inch. This extension of the coil beyond both sides of the ball of the rail assists in eliminating adverse effects due to lateral movements of the coil with respect to the rail.

It will be understood that employment of a coil having a non-magnetic core necessitates the employment of a potential signal amplification system having an amplification value much greater than is necessary when a magnetic core is employed. The success of the non-magnetic core coil, therefore, is dependent upon the provision of a very sensitive potential signal amplification system of high amplification value.

The non-magnetic core does not modify the flux field above the ball of the rail which it is examining. Referring to Figure 40, as applicants' coil moves through a flux field, the distribution of the flux lines is substantially unaltered. On the other hand, a magnetic core provides a path of high permeability for flux, or if such core were moved into the flux field of a flaw, the field and the signal produced from a pick up coil would be greatly altered.

In addition, the current flow induced in the pick up coil is at a minimum because of the high impedance of the circuit which couples the coil to the amplifier and therefore the field of that coil itself is negligible. This likewise avoids distortion of the field of a flaw.

Referring now to Figure 42, a particular pick up used by the applicants in actual practice comprises a core 540 of non-magnetic material having a cross-sectional dimension of four to four and one-half inches by three eighths of an inch. A channel 542 is cut in the lower portion of the core of non-magnetic material at a distance of about one eighth of an inch above the bottom and has a cross-sectional area of approximately one-sixty fourth square inch. The pick up is mounted in a housing 544, see Figure 43, which is made of non-magnetic material, such as aluminum, and is suspended from the bottom of the exploratory car 12 by means of flexible leaves 546 and 548. Attached at the back of the housing 544 is a flange 547 having in the central portion thereof a notch 549. When the pick up is in normal position, the notch 549 is engaged by a vertical positioning member 550 suspended by an arm 552 from the exploratory car 12. A small cable 554 anchored to the bottom of the car at 556 and to the lower rear end of the pick up housing at 558 makes it possible, in conjunction with the flexible leaves 546 and 548, to draw the pick up upwardly to a height where it will not be damaged by certain types of rail guards, crossing planks and the like. The positioning member 550 and the notch 549 coact to hold the pick up 50 in fixed position during operation while permitting the pick up 50 to be quickly raised above the rail when desired, it being apparent in Figure 44 that these members are out of alignment laterally with the leaves 546 and 548.

As for the number of windings on applicants' coil, the strength of the signal induced varies with the number of turns. It follows, therefore, that the greater the number of turns, the stronger the signal derived from the pickup and the less amplification needed in the amplifier. In practice, applicants have used some 1200 turns of fine wire, the cross-sectional area of the 1200 turns being less than one sixty-fourth of a square inch.

It is not essential to have the axis of the coil perpendicular to the rail ball. In fact, good results have been secured by having the axis disposed horizontally or parallel to the surface of the ball.

While a single small pick up coil does not produce potential signals of great amplitude due to undesirable movements laterally and vertically of the pick up coil with respect to the rail, in Figure 45 there is shown a double coil pick up which seems to eliminate or minimize these undesirable induced potentials. In this figure, the non-magnetic core 570 has two identical channels around its lower portion indicated by the numerals 572 and 574. Two identical coils of wire are positioned in these channels and are connected in series opposition so that induced potentials induced in the coils by movements of the pick up will oppose or buck out each other. In practice, the upper coil can be about three-eighths to one-half inch above a rail and consequently is passing through a field which is not quite as strong as the field through which the lower coil passes. This accounts for the fact that the two coils do not buck out the potential signal derived from a fissure or some other flaw in the rail while nevertheless performing a function which further reduces the ill effects of vibratory movements.

*Full wave rectification and the minor signal compressor*

The complete rail flaw signal shown in Figure 23 is not only produced by amplification of induced potentials, but is also the product of a full wave rectifier, a minor signal suppressor, a signal limiter, and a rail joint attenuator. These four devices all modify the whole or portions of the complete rail potential signal as derived from the pick up. To make this clear, in Figure 46, there is shown a complete rail signal such as would be derived from the same flux field as produced the visible signal in Figure 23, excepting that the complete rail potential signal from the pick up has not been modified by a full wave rectifier, a minor signal suppressor, a signal limiter, and a rail joint attenuator. (Figure 46 is a constructed figure wherein a negative component 605 of the fissure signal 602 in Figure 46 is exactly equal to the small peak of the same signal in Figure 23, although this may not be exactly the case.)

Figure 46:
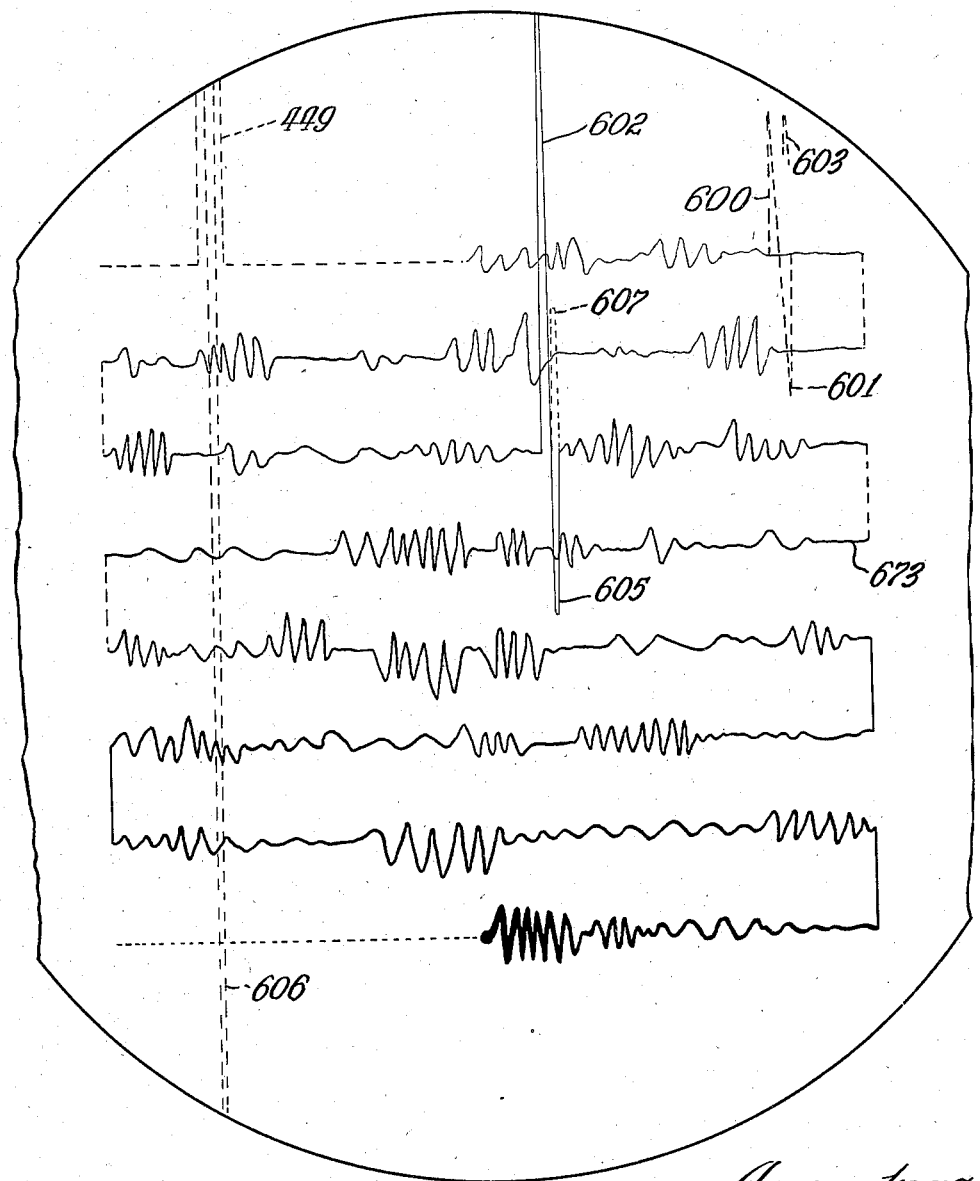
Figure 46 is a hypothetical presentation of the screen of the cathode ray tube as it would appear if the beam subject to the same forces as caused it to present the signal in Figure 23 were not protected from insignificant small potential signals and from excessively large potential signals and if all potential signals were not full wave rectified.

Examining now the visible signal in Figure 46, one's first impression is one of confusion. By referring to Figure 23, one sees that only two things occurred in the complete rail flaw signal which were of any consequence, namely, the high peak 322 indicating a fissure and the triple peak indicating the rail joint. In Figure 46, however, the fissure signal is so dim that it can scarcely be seen and both it and the rail joint signal extend beyond the tube screen. Moreover, the two significant visible signals are rendered insignificant by the brightness and confusing character of a multitude of small signals which form the base line. Moreover, the dotted line signal 600 which has been arbitrarily introduced in Figure 46 to show the configuration of the signal from the spotting coil is seen to have lost its major attribute, namely, the two sides of the spotting coil being exactly one inch apart and producing equal but opposite fields around themselves, create a two peak signal (when rectified) in which the peaks are separated by a distance bearing the same relationship to the one inch spacing of the sides of the spotting coil as the complete rail signal path bears to a full rail length, that is, ten to one. In Figure 46, it would be necessary to project one peak to the other side of the reference line as the peak 601 to the point 603 in order to make this measurement, an inconvenient step when dealing with a transient signal which disappears in three and one-half seconds. Another objection to the complete rail signal in Figure 46 is found in the fact that the base line is only rarely a straight line. For the most part, it comprises a plurality of visual signals derived from small potential changes having both negative and positive components induced in the pick up.

Examination of the rail which produced the complete rail signal shown in Figure 46 discloses the fissure and, of course, the rail joint. All of the other markings on the sweeps were derived from insignificant surface defects.

With the foregoing in mind, applicants have improved upon the signal shown in Figure 46 by doing several things: firstly, suppressing all potential signals not attaining a possible flaw significant amplitude so that such potential signals will not modulate the vertical positioning potential and consequently will not cause the tube beam to delineate small signals; secondly, full wave rectifying the potential signals so that all potential signals having a given amplitude will be negative with respect to the vertical positioning potential and consequently all visible signals produced by the pick up potential signals will be on the same side, the upper side, of the sweeps; thirdly, limiting all potential signals to a given maximum value so that a potential signal, regardless of how great its amplitude, cannot deflect the beam above the sweep along which it is moving by more than a predetermined distance, such as three sweeps; and fourthly, attenuating all rail joint potential signals to an amplitude such that they may be safely introduced to the amplification system and visibly presented on the tube's screen.

The relative positioning of these four means for modifying potential signals in the principal amplifier is shown in Figure 6 where it will be noted that the rail joint attenuator resistance 751 is cut into the pick up circuit in advance of the first amplification stage 120. The potential signals derived from the pick up are full wave rectified in the second and third stages 122 and 124 and the minor signal suppressor functions in connection with the third stage. Signal limiting is effected in the fifth stage 128. Several factors contribute to this order of modifying the potential signals. The rail joint attenuator resistance is positioned in advance of all amplification stages in order that the minimum and maximum limits of potential signals that the amplification system must be capable of handling may be much closer together than would be possible if the rail joint signals were not attenuated. A rail joint signal may be as much as five times as great as the maximum internal transverse fissure potential signal and as it is easier to build a highly sensitive amplifier for a comparatively narrow amplitude range of potential signals than it is to build an equally sensitive amplifier for a much broader range, applicants attenuate the rail joint signal in advance of the first amplification stage. Full wave rectification occurs in advance of minor suppression and signal limiting because it is easier to lop off the upper and lower portions of rectified potential signals than unrectified potential signals. The minor suppressor is positioned in advance of the signal limiter because it utilizes the diode tube acting as a rectifier, which is in advance of the signal limiter.

Of these four devices for modulating the potential signals derived from the pick up, the full wave rectifier, the minor signal suppressor, and the signal limiter modify all potential signals that reach the cathode ray tube 158, while the rail joint attenuator modifies only potential signals of an exceptionally high amplitude such as those derived from rail joints or broken rails. Consequently, full wave rectification, minor signal suppression, signal limiting, and rail joint attenuating will be described in the order named and not in the order of their position in the amplification system. Moreover, inasmuch as full wave rectification is effected in the second and third stages 122 and 124 of the amplifier and the minor signal suppression in the third stage, full wave rectification and minor signal suppression will be described together.

As for full wave rectification, this is described in detail because the solution here presented is particularly adapted to applicants' problem. This problem involved full wave rectification of potential signals which are not only of low frequency but of irregular frequency so that the unrectified negative and positive components are non-symmetric. Applicants' potential signals are transients. This problem is to be contrasted with that generally presented in electronics where high frequency symmetrical potentials commonly derived from transformers require rectification.

Figure 47:
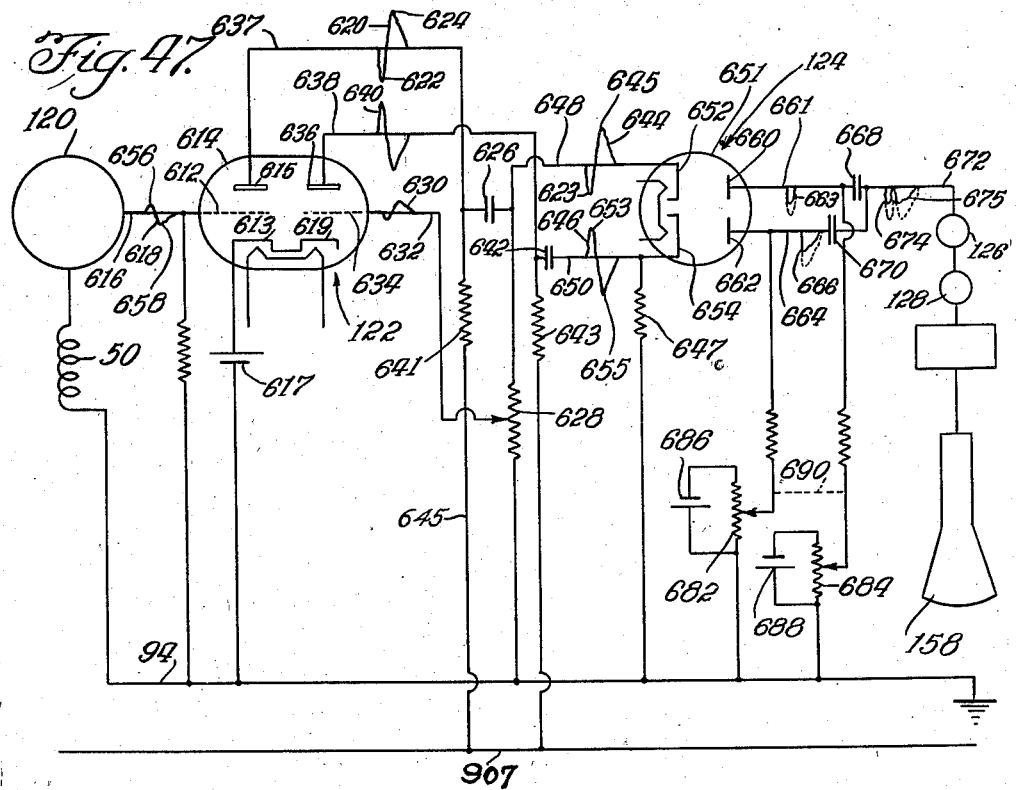
Figure 47 is a wiring diagram of the full wave rectification circuits employed by applicants together with the means for suppressing small potential signals lacking flaw significance.

The particular means which we employ in practice for full wave rectifying the potential signals derived from the pick up is shown diagrammatically in Figure 47. The pick up 50 is grounded at 94 and connected to the amplifying stage 120, which is resistance coupled to the first grid 612 of a twin triode tube 614 comprising a part of the phase inverter rectifying stage 122, see Figure 6. On certain horizontal portions of the conductor, shown in Figure 47, there are plotted graphs of a complete potential signal, that is, one having non-symmetric positive and negative components, derived from the pick up, in order to assist in understanding full-wave rectification as applied to these transient potential signals. On the horizontal portions of the conductors mentioned, time is plotted from left to right. The amplitude of positive potentials is plotted above the conductor and the amplitude of the negative potentials is plotted below the conductor. The graphs are not actual representations of any potential signal, and more particularly where a graph shows that the potential signal is amplified or reduced, the graph does not show the actual amplification or actual reduction.

The voltage amplifying stage 120 is plate coupled by the conductor 616 to the first grid 612 of a twin triode phase inverter tube 614. A graph 618 of a typical potential signal is delineated on the conductor 616. This graph has a positive component represented by the peak 656 which reached the conductor first and a negative component represented by the peak 658 which followed. The duration of the negative component of the potential signal is approximately three times as long as the duration of the positive component. The two plates 615 and 636 of the twin triode tube 614 are connected by conductors 637 and 638 respectively, through equal resistances 641 and 643 to a source of positive potential 907. The twin triode tube has two cathodes 613 and 619 which are connected to ground through the biasing battery 617.

When the positive component 656 of the potential signal 618 reaches the grid 612, the conductivity of the tube between the cathode 613 and the plate 615 is increased, or expressed differently, the resistance of the tube between the plate 615 and the cathode 613 is decreased so that the potential on the plate 615 with respect to ground drops. It will be observed that the conductor 637 is coupled through a condenser 626 to the cathode 652 of a twin diode tube 651 and that the conductor 648 is connected to ground through a potentiometer 628. It follows that the potential of the plate 615 is equal to the potential on the conductor 645 less the drop in the resistance 641 and that the potential on the plate 652 is zero or ground potential. It further follows that when the potential indicated by the peak 656 causes a drop in the potential of the plate 615, the condenser 626 causes a like drop on the cathode 652. By virtue of the amplification characteristics of the twin triode tube 614, the drop in potential on the conductor 637, the plate 615 and the cathode 652 may be twenty times as great as the amplitude of the positive component indicated by the peak 656. There is shown on the conductor 637 and the conductor 648, therefore, an enlarged peak 622 beneath these conductors. These two peaks 622 and 623 were produced by the positive component indicated by the peak 656.

When the negative component 658 reaches the grid 612, the conductivity of the tube between the plate 615 and the cathode 613 is decreased so that the resistance between these two elements is increased. Inasmuch as less current flows between the cathode 613 and the plate 615 under these circumstances, the potential on the conductor 637, the plate 615 and the cathode 652 becomes proportionately more positive and this positive potential is represented by the peaks 624 and 644 above the conductors 637 and 648, respectively.

The variation in potential in the conductor 637 is transmitted through the coupling condenser 626 to the potentiometer 628 which is tapped by a conductor 632 in such a way that the amplitude of this changing potential represented by the graph 620 is reduced to the amplitude of the potential 618 before it reached the grid 612. A graph 630 of this potential signal is shown on the conductor 632 and it will be seen that this potential signal is inverted with respect to the signal 618. This reduced potential signal is impressed on the second grid 634 of the twin triode phase inverter tube 614 where the two components modulate the potential on the plate 636 and the conductor 638, which potential normally is identical in amplitude to the potential on the conductor 637 and plate 615 in exactly the same way as the first potential signal 618 acted on the grid 612. The result of this action is to again phase invert and amplify the reduced potential signal depicted by the graph 630 so as to produce the amplified potential signal on the conductor 638 as depicted by the graph 640.

The three graphs 620, 640, and 630 are presented in vertical alignment and in point of time any potential on the conductor 637 is identically reflected in a potential on the conductor 638 or 632, that is to say, corresponding points on the graphs 620, 640, and 630 occurred at the same instant. The conductor 638 is coupled through a condenser 642 to the second cathode 654 of the twin diode tube 651 which is connected to ground through resistance 643. The graph 646 on the conductor 650 is a duplicate of the graph 640, and being positioned immediately beneath the graph 644 it indicates the time relationship of the two potential signals as they reach the two cathodes 652 and 654. It is evident that the negative peak 623 reaches the cathode 652 concurrently with the positive peak 653 reaching the cathode 654 and similarly that the positive peak 645 reaches the cathode 652 concurrently with the negative peak 655 reaching the cathode 654.

In Figure 47, the two plate circuits of the twin diode tube 651 are shown to be supplied with a potential from two potentiometers 682 and 684. As will appear hereinafter, this arrangement provides the minor signal suppressor. Assuming for the present discussion that these connections are not made and that the potentials on the plates 660 and 662 and on the cathodes 652 and 654 are at ground, it is apparent that when the potential signal indicated by the peak 623 reaches the cathode 652, the cathode 652 will become negative with respect to ground and negative with respect to the plate 660. The tube 651 will consequently become conductive and a potential negative with respect to ground will appear on the conductor 661. When the positive potential represented by the peak 645 reaches the cathode 652, the cathode becomes more positive with respect to the plate and hence the tube remains non-conductive so that no potential is impressed in the conductor 661.

Similarly, when the positive potential 648 reaches the cathode 654, there is no conductivity between the cathodes 654 and 652 and hence the positive potential is not reflected by any derivative in the conductor 664. When the negative potential represented by the peak 655 reaches the cathode 654, the cathode becomes negative with respect to the plate 662, conductivity is established therebetween and a derived potential indicated by the peak 666 is produced in the conductor 664. The conductors 661 and 664 are coupled through condensers 668 and 670 to a single conductor 672. The peaks 663 and 666 are time related and in the absence of any suppression the dotted line showing may be considered to indicate the true amplitude of the two negative potentials derived from the plate side of the tube 651. It will be observed that in the conductor 672 the two negative potentials represented by the peaks 674 and 675 follow one another in point of time, 674 occurring first. These two negative potentials were derived from the transient signal represented by the graph 618 and are passed through the coupling and signal limiting stages 126 and 128 and then to other equipment heretofore described to the cathode ray tube 158.

Figure 48:
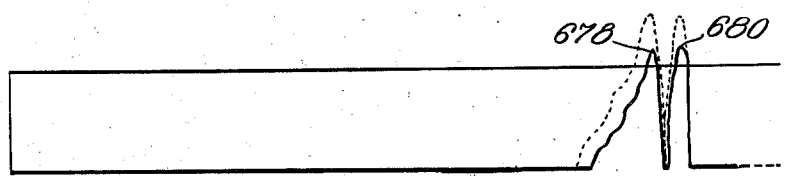
Figure 48 is a view of two sweeps on the cathode ray tube illustrating the effect of small potential signal suppression upon the duration of a visible signal.

This negative potential signal is caused to modulate the vertical positioning potential in the manner indicated above so as to cause the beam of the cathode ray tube to be drawn upwardly, see Figure 23, by the upper vertical deflection plate 361. Referring to Figure 48, the potential signal represented by the graph 618 in Figure 47 would appear on one sweep of the tube as a signal having two peaks 678 and 680, both above the reference line.

In the above described manner, referring to Figure 46, all of the signals, including the small signals, will be positioned above whatever sweep the beam is delineating. By this means, specifically, the lower dotted peak 601 of the signal from the spotting coil will be turned over so that its peak occupies the position 603 and its important functions as developed above may now be realized. Similarly, the visible signal 605 from an internal transverse fissure will have the peak moved above the line into the dotted position 607 and the lower peak 606 of the rail joint signal will be similarly moved above the first sweep so as to disappear off the top of the screen.

Figure 55:
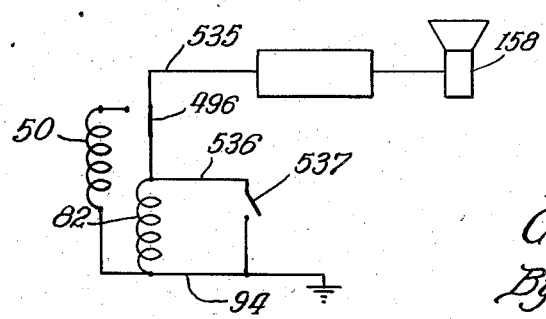
Figure 55 is a wiring diagram of the means for shorting the analyzer pick up to ground during a portion of its stroke.

Again referring to Figure 46, full wave rectification has improved the signal by more clearly defining the reference line from which the amplitude of every signal is to be measured. However, the small signals from non-dangerous sources are relatively prominent and make it difficult to evaluate the signals from dangerous sources. This difficulty is due to the fact that in order to have the beam delineate a horizontal portion of a sweep such as 673 when there is no potential signal arriving from the pick up at a reasonable brightness, the accelerating grid of the cathode ray tube 158 must be adjusted to limit the beam to a point where a visible signal caused by an internal transverse fissure, such as 602, will not be seen at all. This, despite the Z-axis amplifier. Consequently, without further means for limiting potentials from non-dangerous flaws, it is necessary to adjust the accelerating grid so as to increase the number of electrons on the tube beam to a point such that the visible signals from the unimportant potential signals are exceedingly brilliant in order to bring out even faintly a signal from a transverse fissure. In Figure 55, the lower two sweeps of Figure 46 are shown after rectification only.

The provision of means for completely eliminating those potential signals derived from non-dangerous flaw sources will not only eliminate their visual reproduction from the screen of the tube, but makes it possible to increase the relative brilliance of signals derived from transverse fissures as compared to the brilliance of the reference line or sweep. The minor signal suppressor functions in a very simple way. Briefly, it consists in rendering the plates 660 and 662 more negative in a predetermined amount with respect to the cathodes 652 and 654 so that the twin diode tube will become conductive only when the negative components represented by the graphs 623 and 625 have a sufficient amplitude to overcome this potential difference opposed to conductivity. It will be recalled that in the description of the full wave rectification, the potential difference between the cathodes 652 and 654 on the one hand and their respective plates 660 and 662, was at zero when no potential signal was being received from the first stage 120—all of the elements being at ground potential. It is evident that by increasing the potential difference between the cathodes and the plates toward non-conductivity, that is, by making the plates negative with respect to the cathodes, the size of a negative potential signal reaching the cathodes must be sufficiently great to exceed this potential difference opposing conductivity of the tube, in order to make the tube conductive.

Referring to Figure 47, two potentiometers 682 and 684 in circuits from batteries 686 and 688 are tapped so as to impress a negative potential upon the plates 662 and 660 respectively. These potentiometers are variable potentiometers controlled simultaneously by mechanical means represented by the dotted line 690. So long as the potentials on the plates 660 and 662 are not affected by potentials derived through the potentiometers 682 and 684, all negative potential signals represented by the graphs 644 and 646 will produce derivatives in the conductor 672. Where, however, the potentiometers are caused to increase the negative potential on the plates 660 and 662, the tube 651 becomes proportionately less conductive with the result that the cathodes must attain a certain negative amplitude before affecting the plate potential at all. By the structure shown, applicants may eliminate all small potential signals such as those that produce the jagged characteristics of the sweeps in Figure 46. Referring to Figure 47, it will be noted that the minor signal suppressor cuts off the bottoms of potential signals having an amplitude sufficiently great to overcome the potential difference of non-conductivity in the twin diode tube 651 and this is indicated by the graphs of reduced sizes 663, 666, 674, and 675. In the case of the sharp peak 674, the time duration of the signal is not appreciably affected by this cutting off of the lower portion of the potential signal, but in the case of the potential signal represented by the graph 675, its duration is somewhat shorter than the potential signal from which it was derived and which is represented by the peak 655.

Figure 49:
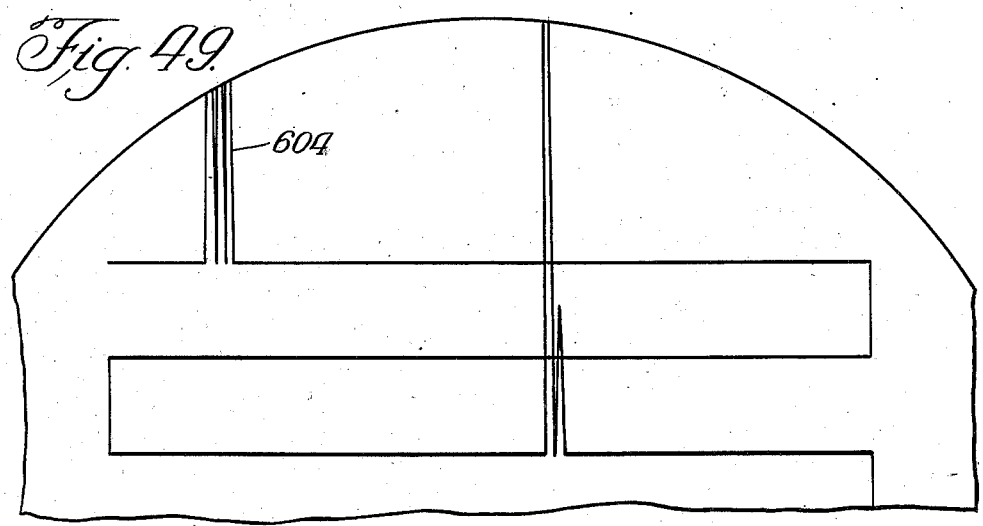
Figure 49 is a view of the upper three sweeps after rectification and minor suppression.

Referring now to Figure 49, the upper three sweeps of the same signal presented in Figure 46 is shown. The original potential signal has been full-wave rectified and minor potential signals have been compressed. It will be observed that the sweeps are now comparatively clean; that all signal components are on the same side of the sweeps, and that the tracings which form the potential signal 602 are much brighter in respect to the brilliance of the sweeps than they were in Figure 46.

The foregoing presentation of full-wave rectification of irregular, low-frequency signals is not to be construed as the only method of obtaining this rectification. Moreover, the coupling of the minor signal suppressor potentiometers to the plates of the twin diode tube 651 is not to be construed as the only means of providing a potential difference in favor of nonconductivity of the twin diode tube 651. The arrangements shown are comparatively simple and are to be evaluated, not only standing alone, but in conjunction with the new and desirable results which they produce in converting a highly-discriminatory but difficulty-read complete visible rail signal shown in Figure 46 to the highly readable and equally discriminatory (from the standpoint of flaw significance) signal in Figure 23.

*The signal limiter*

That portion of the complete rail signal shown in Figure 49 is defective in that the rail joint signal 604 and the fissure signal 602 extend beyond the screen and as a result, their amplitude cannot be determined. The reason that they extend beyond the screen is due to the fact that the potentiometer 701, see Figure 26, which feeds the potential signal into the coupling tube 374 by means of which the potential signal is caused to ride or modulate the vertical positioning potential, to such an extent that the vertical deflection plates cause the beam to leave the screen of the cathode ray tube. This potentiometer could readily be adjusted so that the fissure signal 602 would not extend beyond any desired height, as for example, two or three sweeps, but in so doing a visible signal from a small internal transverse fissure would be proportionately reduced to a size which would be visibly difficult to appraise. Visible signals produced by magnetic spots and burns would be still smaller.

Referring to Figure 18, the signal there shown was derived from a small fissure and the applicants concluded that it was desirable to have such a signal reach a peak some place between the first and second sweeps above the sweep which the beam is delineating. When the potentiometer 701 is adjusted so that the potential signal from a small fissure will cause the beam to leave the sweep by a maximum distance of one to two sweeps, signals from magnetic spots and burns are visibly portrayed in a size which is readily readable. On the other hand, potential signals derived from large fissures cause the beam to leave the screen of the tube. In practice, applicants have observed that the largest internal transverse fissures will produce potential signals some nine or ten times as strong as the signal produced by a ten per cent internal transverse fissure.

In order to properly present visible signals derived from burns, magnetic spots and small internal fissures, while nevertheless reducing the large signals, applicants selected as a ceiling the distance of three sweeps above whatever sweep the beam was delineating as the limit to which the beam of the tube should be permitted to rise. Having selected this distance, the applicants proposed not to reduce proportionately strong signals, for this the potentiometer 701 already can do, but to cut off potential signals at a predetermined point. This is accomplished by the signal limiter which has been referred to heretofore as the fifth stage 128 in Figure 6.

Figure 51:
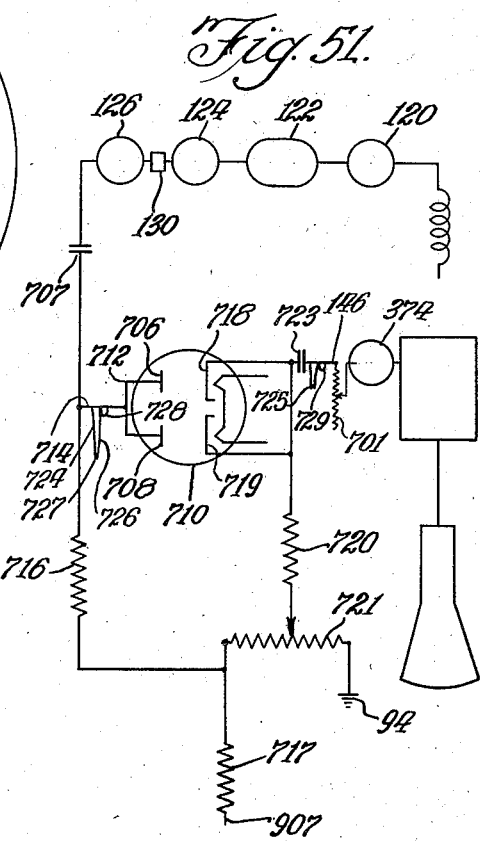
Figure 51 is a wiring diagram of the signal limiter stage in the amplifier.

Referring to Figure 51, potential signals, from the twin diode tube 124 which forms part of the full wave rectification stage, produce in the output of the coupling stage 126 potential signal derivatives which are transmitted by the condenser 707 to the plates 706 and 708 of a twin diode tube 710. These potential signal derivatives are negative with respect to ground as were the potential signals from the rectifying stage 124 because, as may be seen in Figure 57, the coupling stage 126 is cathode loaded. Returning to Figure 51, the twin diode tube 710 is employed instead of a single diode tube because no single diode tube suitable for properly handling the transient potential signals obtained by applicants' system is commercially available. The plates 706 and 708 are connected through a resistance 716 and a resistance 717 to the source of positive potential 907. The tube 710 has two cathodes 718 and 719 which, through a resistance 720, a potentiometer 721, and the resistance 717, are also coupled to the source of positive potential 907. The system is grounded at 94.

The principle of operation of the signal limiter is quite simple. It consists in providing a potential difference in favor of tube conductivity between the cathodes and the plates, a potential difference which may be adjusted to a point such that when a negative potential signal received from the condenser 707 has attained a certain amplitude, it will nullify the potential difference with the result that the tube 710 will cease to conduct whereby the charge on a condenser 723 will be held at a fixed value until a potential difference in favor conductivity again exists between the respective plates and cathodes of the tube 710. Thus, assuming that the potential difference between the cathode 718 and the plate 706 is X volts in favor of conductivity, that is to say, the potential on the plate 706 is X volts more positive than the potential on the cathode 718, in the absence of a potential signal received from the condenser 707, there will be a continual flow of current through the tube, and the condenser 723 will have a given charge which will remain substantially constant. When a potential signal, which is negative with respect to the potential in the conductor 714, is impressed on the conductor 714 the potential on the conductor and the plates 706 and 708 will drop in accordance with the amplitude of the potential signal. If the amplitude of the potential signal is sufficiently great to equal the potential difference in favor of conductivity between the two cathodes 718 and 719 and the two plates 706 and 708, the condenser 723 will transmit a signal to the coupling stage tube 374 in response only to the small amplitude portion of the potential signal received from the condenser 707. In the case of a potential signal represented by the double hump graph 724, if the point 726 represents a negative potential sufficiently large to equal exactly the potential difference in favor of conductivity between the cathodes and the plates, the signal transmitted by the condenser 723 will have the configuration indicated by the graph 725. The higher amplitude portion of the potential signal indicated by the peak 727 will have no other effect than to render the plates of the tube 710 more negative with respect to the cathodes 718 and 719, and the moment that the plates become more negative than the cathodes, a twin diode tube ceases to conduct. The moment the tube ceases to conduct, the potential on the cathodes remains constant as does the charge on the condenser 723. It follows, therefore, that that portion of the potential signal represented by the upper part of the peak 727 was simply cut off. The second part of the potential signal represented by the peak 728 was unaffected by the signal limiter and therefore produced a derivative such as that represented by the peak 729 on the conductor 146.

It is evident that the amplitude of the potential signal transmitted by the condenser 723 is entirely dependent upon the potential difference between the plates 706 and the cathodes 718 in favor of conductivity. If the potentiometer 721 is so adjusted that the plates and cathodes are all at equal potentials, the potential signal represented by the peaks 726 and 728 would produce no derivative on the cathode side of the tube, for the reason that this potential signal from the condenser 707, being negative, would only render the tube more non-conductive with the result that the charge on the condenser 723 would remain constant. There being no change in potential, no potential signal would be transmitted to the coupling tube 374.

As a matter of practice, at this particular stage the potential difference in favor of conductivity of the tube 710 is about two volts. This potential difference is derived from the positive power source at 300 volts. The resistance 717 reduces this potential to approximately 200 volts, and the resistance 716 by 180 volts, and the resistance 720 by 18 volts. The resistance of the tube and of the potentiometer 721 provides the additional means for creating a potential difference between the plates and the cathodes of approximately two volts in favor of conductivity, that is, the plates are approximately two volts positive with respect to the cathodes.

Figure 50:
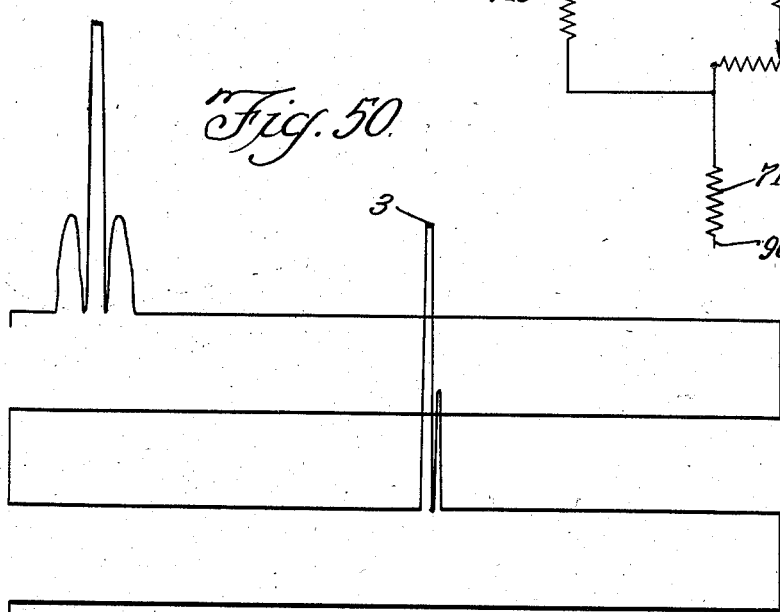
Figure 50 is a view of four sweeps on the cathode ray tube showing the effect of potential signal limitation upon visible signals.

The advantage of the signal limiter is seen in Figure 50 where both the visible signal from the rail joint and that from the internal fissure are shown restricted to three sweeps. It will be noted that the effect of the limiter is to truncate the peak, and that the horizontal line delineated by the beam is exceptionally bright. The reason for this is, referring to Figure 26, that the Z-axis amplifier containing the tube 387, increases the number of electrons in the beam of the cathode ray tube when the beam is deflected rapidly by a potential signal. When the potential signal represented by the graph 725 in Figure 51 reaches the vertical control plates 361 and 360, see Figure 26, of the cathode ray tube 158, the beam moves vertically, see Figure 50, to its maximum upward point of deflection 3, a matter of three sweeps, in a short period of time, and during this movement, the number of electrons in the beam is being increased by the Z-axis amplifier. When the potential signal, referring to Figure 50, represented by the graph 725 in Figure 51, reaches its greatest amplitude, it remains therefor a period of time, with the result that the potential on the vertical deflection plates 361 and 360, see Figure 26, remains constant and holds the beam at the maximum point. While the beam is held at this point, it is moving horizontally across the screen at sweep speed and not at the high rate of speed which caused it to rise from the sweep it was delineating to a point three sweeps above. On the other hand, the potential signal to the Z-axis amplifier is also at a constant value, with the result that the modulating grid 401 of the cathode ray tube continues to maintain the increased number of electrons in the beam. The result is that the truncated portion of each peak is exceptionally bright.

The complete rail visible signal represented in

Figure 23 has now been fully accounted for with the exception of the attenuation of the rail joint visible signal. The means for causing the beam to sweep backwards and forwards at eight distinct levels, for causing the rail joint signal to appear on the uppermost sweep, for causing all visible signals to be on the same side of the sweep lines, for eliminating all visible signals lacking flaw significance, and for limiting the amplitude to which any signal may attain, have all been described.

The rail joint attenuator

An important feature of applicants' system is the rail joint attenuator which makes it possible to detect fissures right up to the end of the rail without the employment of a separate amplification system and cathode ray tube.

Figure 38:
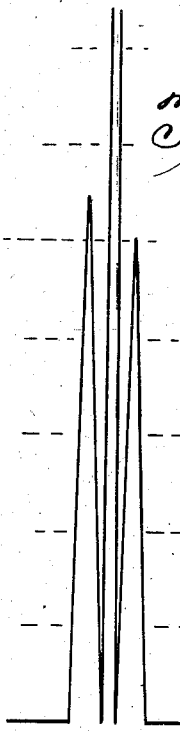
Figure 38 is a view of an unattenuated rail joint signal.

Certain prior art systems do not detect fissures in three to four feet of each rail, one and one-half to two feet at each end, and it is well known that dangerous transverse fissures are more likely to occur at rail ends than in any other equal length of rail. For an unattenuated rail joint signal, see Figure 38.

Referring back to Figure 20, there appears a signal derived from a two-inch burn spot with a thirty percent fissure beneath the burn. While the tall peak of this signal may be caused entirely by the fissure flux field, it is more probable that a composite flux field created by the fissure and part of the burn produced the tall peak. However the potential signal or the flux field may be considered, the visible signal indicates that a fissure signal retains its distinctive quality when comingled with a burn signal. This, of course, is one of the salient features of applicants' method of examining rails in small increments or space sections.

Applicants' attenuate, that is, reduce the potential signal derived from a rail joint to an amplitude which will not injure the main amplification system, while at the same time leaving the system in such condition that dangerous fissures are detected.

In Figure 22, there is seen a rail joint visible signal produced with applicants' system. This rail joint visible signal has been full wave rectified and has passed through the minor suppressor and signal limiter stages of applicants' amplification system. The applicants' offer no explanation of the three peaks. Theoretically it would seem that there should be four. Suffice it to say, the visible signal shown in Figure 22 is typical of the visible signals derived from all rail joints by applicants' system. This visible signal was derived from a potential signal and amplified in the same way by the same apparatus as all other potential signals received by applicants' pick-up, with, however, this notable difference, that a resistance of a selected value was placed across the main pick-up coil while the pick-up was passing over the rail joint. The value of this resistance is sufficiently great to reduce the potential signal derived from a rail joint to approximately the same size of the potential signal derived from a very large fissure. This reduced or attenuated potential signal may be safely introduced to the amplification system.

The similarity of the rail joint visible signals is probably due to the fact that the characteristics of all rail joints are primarily controlled by the break in the rail and that variations in the distance between the ends of the rail in various joints do not appreciably alter the amplitude of applicants' visible signal although they may slightly alter the length of time duration thereof. The regularity of contour of the signals from the rail joint closely assists in detecting fissures, as will shortly be appreciated, and it may be that longitudinal magnetizing of the rail assists in the regularity of the contour of the rail joint visible signals obtained by the applicants.

Continuing to refer to Figure 22, a small peak 225 alters the regular configuration of the smaller rail joint peak. Breaking the rail end disclosed a fissure of substantial size in the joint that produced the visible signal having a peak 225 in Figure 22. Many experiments have demonstrated that deep surface cracks and internal fissures do modify the rail joint visible signal. In actual practice, when a rail joint visible signal does not produce a visible signal having the typical pattern with smoothly rounded lower peaks, but shows any kind of an aberration, the exploratory car is stopped and the analyzer is positioned on that side of the joint from which the small peak on the rail joint visible signal was derived and the analyzer quickly obtains potential signals from the complete flux field adjacent the rail end.

Various means might be employed for reducing or attenuating the rail joint potential signal to the degree wanted, that is, to about one-fifth or one-sixth of its normal value as derived by applicants' pick-up. Thus, it might be possible to cut out one amplification stage or it might be possible to decrease the sensitivity of the pick-up coil by reducing the number of windings in the pick-up coil while the coil is moving over a rail joint. Applicants place a resistance to ground across the principal pick up coil when the latter is moving over a rail joint. To accomplish this end, applicants employ magnetic flux pick up in conjunction with an amplification system, which system actuates a relay which, in turn, throws the resistance across the main pick up coil. Whatever devices may be used, they must attain the major objective of proportionately reducing the potential signal derived from a rail joint while permitting the potential signal to remain at such a value that the visible signal derived therefrom will be able to show slight modifications, such as peaks derived from a fissure field which modifies the flux field around a rail joint.

Figure 52:
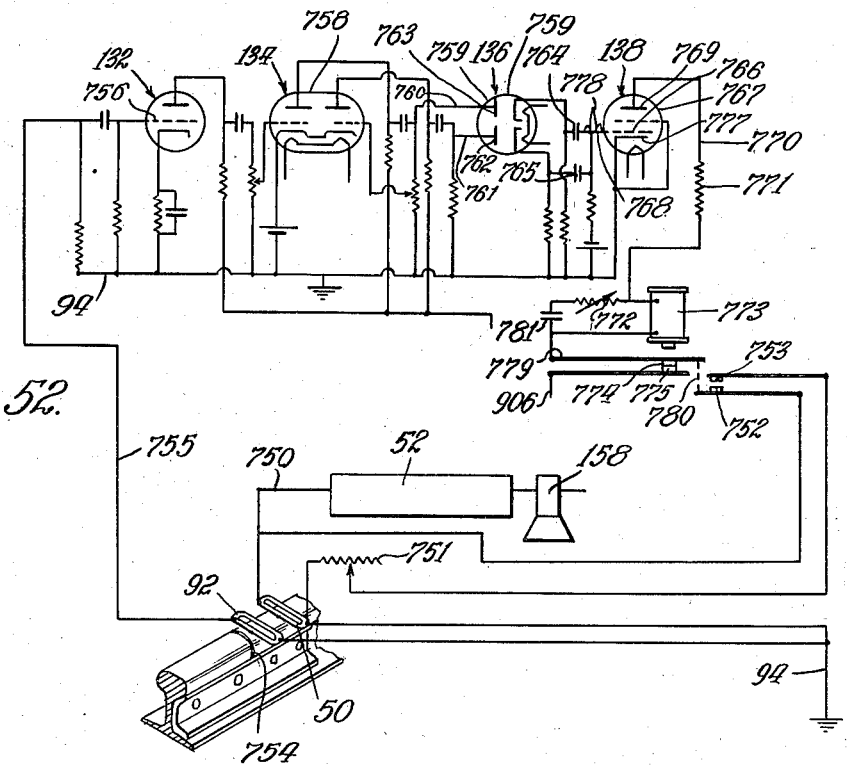
Figure 52 is a wiring diagram of the means for attenuating rail joint signals.

The means actually employed in practice by applicants for attenuating a rail joint signal is schematically set forth in Figure 52. In this figure the principal pick-up coil 50 is positioned to the right of the rail joint pick-up coil 92, so as to occupy the same position shown in Figure 1, that is to say, the schematic showing proceeds on the assumption that the equipment is moving from right to left. Both pick-ups are connected to ground 94 and the output conductor 750 from the main pick-up 50 leads to the case 52 containing the principal amplifier and then through other stages to the cathode ray tube 158 as elsewhere described. The resistance which will reduce a potential signal received by the main pick-up 50 to approximately one-fifth of its normal value is identified by the numeral 751 and is seen to be in a circuit terminating in two contacts 752 and 753 so that the closing of the contacts 752 and 753 will shunt the principal pick-up coil 50 through the resistance 751 to ground 94.

In order to close the contacts 752 and 753 at the moment when the main pick-up coil is approximately five inches from the rail end indicated by the numeral 754 and to hold the resistance 751 across the main pick-up 50 until the main pick-up is approximately five inches beyond the rail joint 754, there is provided means connected with the rail joint pick-up 92 which does two things, namely, closes the two contacts when the pick-up 50 is five inches away from the rail joint and holds the two contacts closed until the pick-up 50 is five inches beyond the rail joint.

The means for closing the contacts at the selected moment in response to the rail joint potential signal received by the pick-up 92 consists of a four stage amplifier identified in Figure 6 in the general discussion by the numerals 132, 134, 136 and 138. The fourth of these stages is a gas tube which is adjusted so that it becomes conductive only when a potential signal from the rail joint pick-up 92 has an amplitude in excess of the amplitude of the strongest potential signal derived from the largest of internal transverse fissures. As indicated heretofore, such a potential signal must have a minimum amplitude not less than eleven or twelve sweeps when the main amplification system has an amplification value such that the largest of internal fissures will produce a potential signal of about nine sweeps. Because the gas tube in the fourth stage of this rail joint pick-up amplifier will not become conductive unless a signal in excess of about eleven sweeps is received it is evident that the rail joint pick-up and amplification system will not interfere with the normal functioning of the main pick-up 50 and the amplification system when traversing the rail. The interference occurs only at the rail joint and at those comparatively rare places where a rail is completely broken. In the latter case the rail joint attenuator will attenuate the strong potential signal from the break in the rail. This, however, is not a weakness because the attenuation of the unusually powerful potential signal from a broken rail nevertheless produces a potential signal of an amplitude such that it reaches three sweeps and the applicants will investigate the cause. On the other hand, the attenuation of the large potential signal derived from a broken rail is very desirable because it protects the main amplifier.

Continuing to refer to Figure 52, the output of the pick-up coil 92 is led by the conductor 755 to the grid 756 of a low gain amplification stage 132 where the signal is phase inverted in the well known manner. The rail joint potential signal is transmitted through a twin triode phase inverting stage 134 comprising the twin triode tube 758 and a rectification stage 136 comprising a twin diode tube 759, which stages are identical with the rectification stages 122 and 124 in the principal amplifier, heretofore described, exception for the fact that the twin diode tube 759 is reversed with respect to the twin triode tube 758. That is to say, the two output conductors 760 and 761 from the twin triode 758 are connected to the plates 762 and 763 of the twin diode tube 759 instead of to the cathodes as in the principal amplifier. The cathodes of the twin diode 759 are coupled through condensers 764 and 765 to the grid 766 of a gas tube 767. This difference in coupling is important in that the output of the twin diode tube 759 produces signals positive with respect to ground instead of negative with respect to ground as in the case of the twin diode tube 651 in the main amplification system. In short, stage 136 is cathode loaded while the stage 124 is plate loaded. In the first instance, signals negative with respect to ground produce derivatives in the coupling stage 126 whereas in the second instance only the positive components of the original potential signal produces derivatives on the grid 766 of the gas tube. The two positive components are indicated by a graph 778 on the conductor 768 and it is apparent that on reaching the grid these positive components will cause the tube to become conductive.

Examining now the circuit of the gas tube 767, the plate 769 is supplied with current by a conductor 770, having a resistance 771, a solenoid 773, two contacts 774 and 775, normally in closed position as shown, disposed therein from a source of power such as 110 volts direct current line 906. The cathode 777 of the gas tube 767 is connected to ground. The potential on the plate 769 is fixed at a point such that in order for the tube 767 to become conductive it is necessary for the incoming positive potential signal on the grid 766 to attain any selected value before causing the tube to conduct.

Bearing in mind that the conductive characteristics of the gas tube 767 are conventional, that is, that once it is rendered conductive it will remain conductive until the potential on the plate 769 is removed, it is evident that when a potential signal such as that indicated by the graph 778 renders the tube conductive, the solenoid 773 will be energized and this immediately opens the circuit and removes the potential from the plate 769. The dotted line 780 identifies any mechanical insulated means for causing the contacts 752 and 753 to close when the armature 779 opens the contacts 774 and 775. It is evident, therefore, that when a potential signal from the rail joint pick-up 92 having an amplitude sufficient to render the gas tube 767 conductive is received, the contacts 774 and 775 will be opened and the contacts 753 and 752 will be closed. When this occurs, the gas tube will again be non-conductive ready to receive the next potential signal from the rail joint pick-up 92. Moreover, the resistance 751 will have attenuated any potential signal received by the main pick-up 50.

It is evident that the action described would take place in a very short period of time, and the principal objective of attenuating all potential signals received by the main pick-up while traversing some ten inches of rail, five inches on each side of the rail joint 754, would not be attained unless provision is made for holding the contacts 753 and 752 closed for the requisite period of time. This period of time is approximately one-twelfth of a second, for during normal operation, the main pick-up 50 covers ten inches of rail in approximately that time. In order to hold the contacts 753 and 752 closed, a condenser 781 across the solenoid 773 is provided. The controlling factor in selecting this particular condenser is its capacity to discharge slowly so as to hold the solenoid 773 in energized condition for the requisite period of time. The variable resistor 772 is provided to control very accurately the time during which the contacts 752 and 753 will be held closed. The principles controlling the selection of such a condenser are well known in the art and need not be described.

The reason for full wave rectification in the rail joint pick-up amplifier lies in the fact that the applicants wish to transmit both positive and negative components of a rail joint signal to the gas tube 767 and not rely upon only one component. The exact nature of these flux fields is not clear and it is not wise to rely upon either component alone.

From the foregoing it is evident that the rail joint attenuator makes it possible to detect fissures right up to the end of the rail while utilizing the screen of the same tube that is being used to prevent the complete visible rail signal and further it is possible to protect the principal amplification system from potential signals of undesirable amplitude.

Figure 39:
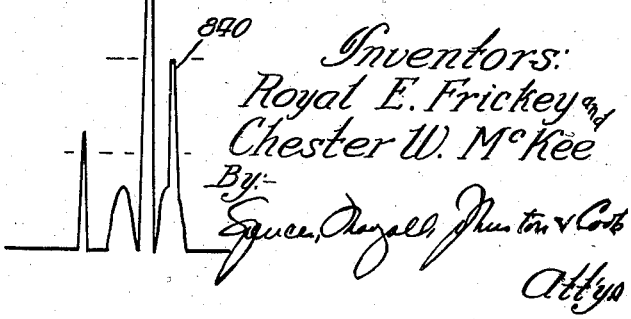
Figure 39 is a view of an attenuated rail joint signal.

In Figure 39 an attenuated rail joint signal is shown. The peak 840 was derived from a large internal transverse fissure. If the potential signal which produced the peak 840 were not attenuated, it would have reached a height of several sweeps and would have been limited to three sweeps by the action of the signal limiter. The peak 840 occurred at the point where the resistance 751, see Figure 52, no longer shunted the pick-up 50 to ground, that is to say, it occurred when the pick-up 50 had reached a point five inches beyond the rail joint (assuming that the beam is delineating from right to left in Figure 39). The applicants are very careful of signals delineated at this point because a fissure strong enough to produce a signal five sweeps high will be attenuated to one-fifth of this normal height and consequently if attenuated the visible signal will be less than one sweep high. Such a signal, if attenuated, is very important and if not attenuated is not important. Consequently, any signal occurring at the points where the rail joint attenuator commences to function or ceases to function renders necessary the stopping of the equipment for the purpose of analyzing.

*The warning signal and pen and tape unit*

One of the features of this invention is the provision of a warning signal which calls the attention of the cathode ray tube screen observer to the screen when a signal of dangerous flaw significance is presented and the attention of the rail observer in the rail observing cab 36 to the proper rail of the track. Such a warning signal is desirable in the case of the screen observer because the complete rail signal, see Figure 23, is delineated by the beam very rapidly, some four seconds for the complete rail signal, and to follow the beam requires movements of the eye back and forth across the screen at the rate of about twelve inches a second. Intent observation of the screen is consequently impossible for more than a short period of time. Inasmuch as it is desirable for an observer to continue at his post for at least an hour at a stretch, the applicants provide a warning signal which will direct the screen observer's attention to the screen for a significant signal so that he may only casually observe the movements of the beam along the screen when nothing of flaw significance is being delineated.

Thus, in traversing comparatively clean rail, it is quite common to encounter only a half dozen signals of dangerous fissure significance in a mile of rail. While there may be many burn spots, magnetic spots and corrugations, potential signals from these sources do not reach amplitudes such as to produce a peak greatly exceeding in height the distance between two sweeps, or expressed in applicants' terminology, do not produce peaks more than one sweep high, all of which is demonstrated in Figures 10 through 22. Consequently, applicants provide a warning signal which puts the screen observer and the rail observer on the alert when a potential signal of a given amplitude occurs. Because the applicants have found by experiment that visible signals on the screen of the tube not attaining a height of one sweep do not have dangerous flaw significance, the applicants actuate the warning signal only when a potential signal has an amplitude sufficiently great to create a visible signal in excess of one sweep high. Moreover, control means are provided so that the amplitude of the potential signal necessary to actuate the warning signal may be varied through a considerable range.

The warning signal actually used is an audible signal, that is, a bell. The selection of an audible signal in preference to another visible signal such as a light, resulted from the desire of utilizing the hearing sense in order to lessen the burden on an observer's vision. Any type of warning signal could be used provided it permits the observer to observe casually the screen of the cathode ray tube without removing the eyes from that screen in order to apprehend the warning signal.

As indicated in the general description of applicants' equipment, two one stroke bells 60 and 64, see Figure 1, the first in the visual signal cab 36 and the second in the rail observing cab 38 are located on the left-hand side of the cab when looking forward and are actuated by the equipment for detecting flaws in the left-hand rail. The two bells are connected in parallel. Similarly, the one stroke bells 61 and 65 are disposed on the right-hand upper walls of the cabs 36 and 38 respectively and are connected in parallel. These two bells are sounded by an amplification system now to be described.

Referring to Figure 53, the conductor 146 leading from the signal limiter stage 128 of the main amplifier is tapped by the conductor 780 leading to the cathodes 784 and 782 of a twin diode tube 783. The two plates 785 and 786 of the twin diode tube 783 are supplied with positive potential from a potentiometer 787. If the potential difference between the cathodes 784 and 782 on the one hand and the plates 785 and 786 is zero, a potential signal represented by the graph 788 will render the twin diode tube 783 conductive to a degree exactly proportional to the amplitude of this potential signal indicated by the graph 788, with the result that a derivative of this potential signal will be transmitted through the condenser 789 to the grid 790 of the triode tube 791 of an amplifying stage and this derived potential signal will have an amplitude approximately equal to the amplitude of the potential signal as impressed on the cathodes 784 and 782. Moreover, the potential signal will reach the grid 790 as two negative components because the twin diode tube 783 does not phase invert. It is evident that by impressing a negative potential from a potentiometer 787 upon the plates 785 and 786 that the potential difference between the cathodes and the plates favoring non-conductivity will be increased and it, therefore, follows that any negative potential reaching the cathodes will have to attain an amplitude equal to this potential difference before the tube will be rendered conductive. Inasmuch as the condenser 789 is not affected until current flows through the tube, the only signals that the condenser will transmit under these circumstances will be the upper portions of the potential signals received on the cathode 784 and 782.

The tube 783, the potentiometer 787 and the circuits described constitute the major suppressor and function in exactly the same way as the minor suppressor heretofore described. It will be understood that a twin diode tube 783 is used instead of a single diode tube because the tube characteristics required in this circuit are not commercially available in a single diode tube. It follows from the foregoing that only a single potentiometer 787 need be used in conjunction with this major suppressor, whereas two potentiometers are used in conjunction with the minor suppressor.

The double peak potential signal indicated by the two peaks 792, being negative, is phase inverted and amplified by the triode tube 791 so that the graph 793 may represent this potential signal as it is communicated to the grid 794 of a gas tube 795. The gas tube 795 is in a circuit comprising a conductor 796 furnishing positive potential, contacts 797 and 798 in closed position, a solenoid 799, a resistance 800, a plate 801, a cathode 802, a potentiometer 803, a battery supply 804 and a ground 94. When the gas tube 795 is in normal condition it is non-conductive and hence there is no flow of current from the conductor 796 to the ground 94. When the signal 793 reaches the grid 794, being positive, it causes the gas tube 795 to conduct, which closes the circuit from the conductor 796 to the ground 94 and this circuit will remain closed after the grid 794 has ceased to be affected by the potential signal indicated by the graph 793 until potential is removed from the plate of the gas tube. When, however, current commences to flow in this circuit due to the fact that the tube 795 has been rendered conductive, a solenoid 799 is energized thereby immediately opening the contacts 797 and 798. This removes the potential from the plate 801 and restores the tube 795 to non-conductive condition.

The de-energization of the solenoid 799 is controlled by a condenser 806 and in this respect the gas tube circuit is similar to that employed in the last stage of the rail joint potential signal amplifier. However, it is necessary here to retard the reclosing of the contacts 797 and 798 only for sufficient time for the mechanical connection 807 which closes the contacts 808 and 809 in a power circuit deriving power from the transformer 810 to energize the two solenoids 811 and 812 which actuate the one stroke bells 60 and 64 diagrammatically shown in this drawing.

It will be observed that the ringing of the bell system may be controlled either by the potentiometer 803 which, by controlling the bias of the tube 795, determines the amplitude which a potential signal, such as 783, must attain in order to render the gas tube conductive, or by the potentiometer 787, which reduces the amplitude of the potential signal derived from the signal limiter stage 128. When applicants' system is working perfectly, it is desired that the bell ring when a visible signal peak just exceeds a given height as, for example, one sweep and the difference between the visible signal derived from a small fissure and that from certain of the peaks of burn spots is not great. The double control is of assistance in sounding the bell for a signal of a given amplitude.

The pen unit control will be described at this point. It is operated by a connection from the bell amplification system. Referring to Figure 53, the conductor 813 from the amplification stage 791 is connected directly to a coil 814 positioned to control a pen arm 70. The physical structure of the pen unit is not described. Suffice it to say that a potential signal which renders the tube 795 conductive will sufficiently energize the coil 814 to move the pen arm 815, which is suspended over a moving tape in the well known fashion. The showing of this pen unit circuit in Figure 53 is to be compared with the showing in Figure 57, where it will be observed that an amplification stage is positioned intermediate the tube 791 and the coil 814. In actual use the applicants are using the amplification stage shown in Figure 57, although the stage has been omitted successfully in the case of a pen employing a very slight mechanical bias.

*Producing motor speeds proportional to the speed of travel along the rail*

Referring to Figure 6, the tachometer generator 78 is driven mechanically by the motor 20 which is positively coupled to the drive axle of the power car. The voltage output of tachometer generator 78 varies directly with the speed of its armature within a limited range and applicants selected the motors such as 164 for the commutator and rotary potentiometer assembly and the motor 66 for the pen and tape unit so that they would vary in speed very accurately with changes in the potential output of the tachometer generator 78. While switches are not shown in Figure 6, each one of these motors, such as 164 and 66, can be energized or de-energized by a switch and in fact applicants have devised a switch for throwing on various equipment for the performance of various steps.

Continuing to refer to Figure 6, a current control means may be positioned between the direct current generator 18 and the drive motor 20 which will cause the drive motor 20 to turn at a constant speed, when the drive motor 20 is disconnected from the drive axle of the car. By this arrangement, when it is desired to perform the analyzing step, the pen and tape unit motor 66 are disconnected. The drive axle of the power car is disconnected and the gear box from the drive motor 20 is now free to run in response to a control means which produces a constant speed in that motor. The tachometer generator 78, therefore, continues to produce a voltage equal to that produced when the exploratory car is moving along the rail at normal speeds and consequently the commutator and rotary potentiometer assembly motor 164 will cause normal functioning of the beam in delineating the sweeps on the cathode ray tube.

*The amplification system*

Various portions of the amplifier and other electronic equipment provided for the purpose of producing applicants' new and improved visible signal of dangerous flaws in rails lying in a roadbed have been separately presented. In order that operability of the system as a whole may be clearly perceived, reference is now made to Figure 57 wherein all equipment necessary for producing visible flaw signals on one of the cathode ray tubes as 158 is shown diagrammatically in detail with the following exceptions. The transformers, rectifiers and the like in the cathode ray power supply case 49 are not shown nor are the connections between the terminals 901, 902, 903 and 904 to the heater elements of the various vacuum tubes in the system shown. The push-pull amplifiers 156 and 157 and the Z-axis amplifier 166 are shown in block form as space does not permit their being shown in detail and the actual circuits are shown in Figure 26.

The power supply provides four different direct current potentials for operating various portions of the system: the conductor 905 is at positive 600 volts, 906 at positive 110 volts, 907 at positive 300 volts, and 908 at negative 300 volts, these voltages being positive or negative with respect to ground. The need for any particular voltage in any particular circuit will not be described, nor will be the capacity of condensers, the voltage and amperage output of batteries, tube resistances including certain specific characteristics and the impedances of certain resistances. The selection of any of these elements of applicants' circuits may be correctly made by one skilled in the electronic art, it being remembered that the applicants are amplifying transient potential signals of low frequency and that in handling such potential signals it is desirable to employ long time constants for all circuits, as is well known.

Assuming that the pick-up 50 is moving along the rail at some point where the resistance 751 has not shorted the pick-up 50 to ground through action by the rail joint attenuator, and further assuming that the pick-up 50 is connected by the switch 496 to the principal amplifier, a potential signal induced in the pick-up 50 will reach the first stage 120 through a condenser 909. This stage 120 is a high gain stage and the potential signal which may be represented by the graph 910 produces a phase inverted derivative represented by the graph 911 in the plate circuit of this stage.

This phase inverted potential signal is transmitted to the grid 612 of the twin triode 614, being in the second stage 122 of the amplification system. The first half of the twin triode tube produces an inverted, amplified derivative of the potential signal and the second half produces an inverted, amplified derivative of the potential signal and the second half produces an inverted, amplified derivative of the derived potential signal from the first half of the twin triode tube 614. These two derived potential signals are 180 degrees out of phase with respect to each other and are separately transmitted to the cathodes 652 and 654 of the diode tube 651. The negative components of these two potential signals render their respective halves of the twin diode tube 651 successively conductive and consequently produce derivatives on the associated plate circuits varying directly with the amplitude of the negative components of the two signals as they reach the two cathodes 652 and 654. The positive components of these two derived potential signals change the potential difference between the plates and the cathodes of the twin diode tube 651 further in the direction of non-conductivity and hence the plate circuits of the diode tube 651 are not affected by the positive components of the two derived potential signals received on the two cathodes 652 and 654. The twin triode tube 614 and the twin diode tube 651 together function as a full wave rectifier so that all components of a potential signal derived by the pick-up 50, whether the components be positive or negative, produce a derived potential signal which through the condensers 668 and 670 are re-combined as a single potential signal on the grid of the tube in the coupling stage 126.

The minor signal suppressor functions in connection with the twin diode tube 651, and consists of means for increasing the potential difference between the cathodes 652 and 654 and the plates 660 and 662 in the direction of non-conductivity. This is effected by impressing a negative potential of any desired amplitude upon the two plate circuits of the twin diode tube 651, the negative potential being supplied by the potentiometers 682 and 684. By this arrangement the negative components of potential signals received on the cathodes 652 and 654 will not affect the plate circuits (and hence the condensers 668 and 670) until these negative components have reached an amplitude sufficiently great to overcome the potential difference against non-conductivity furnished by the potentiometers 682 and 684. When these negative components are of an amplitude sufficient to overcome this potential difference, only that portion of the negative components of an amplitude exceeding the potential difference will produce signal derivatives in the plate circuits of the twin diode 651. It follows that a graph of the derived signal potentials produced on the plate circuits will appear as the upper truncated portion of the negative components of the potential signals received by either of the cathodes 652 and 654.

The coupling stage 126 is positioned intermediate the twin diode tube 651 and the signal limiter stage 128 for the purpose of preventing any adverse effects of the signal limiter stage upon the plate circuits of the twin diode tube 651. It will be observed that the coupling stage 126 is cathode loaded in order that the potential signal which consists of negative components only as received on the grid of the tube in the coupling stage 126 may continue to be negative components when received on the plate circuit of the twin diode tube 710 of the signal limiter stage 128.

The full wave rectified, minor suppressed potential signal reaches the plates of the tube 710 in the signal limiter stage as negative components. The potential difference in favor of conductivity between the plates and the cathodes of the tube 710 may be set at any desired point by means of the potentiometer 721. If the potential difference between the plates and the cathodes is zero, the negative potential signal will make the plate potentials further negative with respect to the cathode and the cathode and the condenser 723 will remain constant. The result is that the potential signal will be stopped at the signal limiter stage. If, however, the plates are positive with respect to the cathode, there will be a flow of current through the tube. When the potential signal having only negative components reaches the plates, they will render the plates more negative with respect to the cathodes causing a difference in the flow of current through the tube which is reflected in the output of the condenser 723. If the potential signals reaching the plates are of an amplitude in excess of whatever potential difference normally exists between the plates and the cathodes, only the lower portions of the negative components of the potential signal will affect the conductivity of the tube, because once the tube has been rendered non-conductive by potentials having an amplitude sufficiently great to render the plates negative with respect to the cathodes, potential signals of still higher amplitude will only further assure non-conductivity in the tube and the output of the condenser 723 will not be further affected. It is evident that the potentiometer 721 may be adjusted to increase or decrease the potential difference between the plates and the cathodes so that the upper portions of large potential signals transmitted to the plates of the tube will not produce derivatives in the output of this limiter stage 128.

The potential signals from the limiter stage 128 will have negative components only, and in the uses to which these potential signals are put it will be observed that it will be necessary to phase invert where it is desired to render conductive a gas tube. The potential signals received from the limiter tube 128 are used in connection with three devices: firstly, the coupling tube 374 by means of which the potential signals are caused to modulate the vertical positioning potential acting through the vertical deflection plates 361 and 360 of the cathode ray tube 128; secondly, to operate the Z-axis amplifier 166 so as to render the modulating grid 401 of the cathode ray tube more positive with respect to the cathode 411 whereby the number of electrons in the beam of the tube will be increased concurrently with the delineation of a visible signal caused by the potential signal; and thirdly, to operate an amplification system which sounds a warning signal for all potential signals of a given amplitude and causes a pen writing a straight line on a tape to deviate from the straight line so as to delineate a visible signal.

Treating these three uses in order, the potential signal received from the signal limiter stage 128 is passed through the potentiometer 701 to the grid 468 of the coupling tube 374. The coupling tube 374 is so positioned in a circuit including two potentiometers 370 and 372 connected in series that the point on the conductor between the two potentiometers will be at zero potential while points in the potentiometer along the conductor leading to the cathode 380 of the coupling tube 374 will become increasingly positive as points on the potentiometer 372 become increasingly negative. It is evident that when the grid 468 becomes increasingly negative due to the presence of potential signals having negative components only, the coupling tube 374 will become less conductive with the result that there will be a drop in potential on the cathode 380. This drop in potential will cause a shifting of the potentials at all points in the two potentiometers 370 and 372, in the case of the potentiometer 370 any point being at a positive potential will become less positive and any point in the potentiometer 372 being at a negative potential will become more negative, and the changes will be proportionate to the amplitude of the potential signals received on the grid 468.

The two potentiometers are connected to the opposite ends of a commutator 152 which commutator is divided into seven equal resistances with contact segments at the ends of each resistance. The potentiometers 370 and 372 are adjusted so that the conductors 392 and 394 in the absence of any potential signal reaching the grid 468 will have an equal but opposite potential, the potential on the conductor 392 being positive and the potential on the conductor 394 being negative. It is apparent that the mid point of the resistance in the commutator 152 will be at zero potential and that the potential difference between adjacent contact segments will always be equal. Applicants provide a contact arm 154 which wipes the contact segments so as to produce in the conductor 434 when the commutator 152 is rotated clockwise a potential varying from a maximum negative value to a maximum positive value in equal potential changes and instantly from the maximum positive value to the maximum negative value. This changing potential is passed through the push-pull stage 156 in such a fashion that the upper vertical deflection plate 361 will have a maximum positive potential when the potential on the conductor 434 has a maximum negative potential, the potential on the lower vertical deflection plate 360 being at a minimum positive potential at this time. As a result of the changing potential in the conductor 434, the potential on the upper vertical deflection plate 361 drops from a maximum positive value while the potential on the lower vertical deflection plate 360 increases from a minimum positive value to a maximum positive value. If a potential signal from the limiter stage 128 reaches the grid 468, it will render the potential on the conductor 392 less positive and the potential on the conductor 394 more negative, changes in the same direction for either conductor. The result of this is that the plate 361 becomes more positive in response to a potential signal from the limiter stage 128 while the lower deflection plate 360 becomes equally less positive so that the beam is caused to delineate a visible signal in response to a potential signal, irrespective of what the respective base potentials may be on the two vertical deflection plates 360 and 361. Potential signals, therefore, are always delineated above a sweep.

The rotary potentiometer 160 is supplied with a positive potential at the point 346 and an equal negative potential at the point 348 whereby an arm 338 rotating clockwise in engagement with the circular resistance 332 commencing at the point 348 will conduct to the push-pull amplification stage 157 a maximum negative potential decreasing through zero to a maximum positive potential at the point 346 and then returning through zero to a maximum negative potential. When the maximum negative potential is introduced to the push-pull amplifier 157 the horizontal deflection plate 204 will have a maximum positive potential and the other horizontal deflection plate 206 will have a minimum positive potential. The maximum positive potential on the plate 204 will steadily drop to a minimum positive potential while the minimum potential on the horizontal deflection plate 206 will increase to a maximum positive potential, the rate of change in potential for the two plates being equal but opposite per unit time.

The motor 164 drives the commutator 152 and the rotary potentiometer 160 positively, the rotary potentiometer arm 338 turning four times to one rotation by the commutator 152. By setting the arm 338 so as to contact the point 346 on the circular resistance 332 at the time when the arm 154 has just engaged the contact segment 406, the commutator rotating clockwise, the beam of the tube 158 will be positioned at the point 318 on the screen of the tube, see Figure 23.

The actual voltages used in the cathode ray tube 158 are as follows: the cathode 411 is at approximately 1600 volts negative with respect to ground; the modulating grid 401 is approximately 1650 volts negative with respect to ground; the focusing grid 403 is approximately 500 volts negative with respect to ground; and the accelerating grid 405 is approximately 200 volts positive with respect to ground.

The potential signal from the signal limiter stage 128 is also transmitted by the conductor 381 to a Z-axis amplifier stage having a pentode tube therein which is coupled through a condenser 397 to the modulating grid 401 of the cathode ray tube 158. In the stage 166, the derivative of the potential signal received from the conductor 381 is phase inverted so that instead of consisting of negative components it consists of positive components which makes the modulating grid 401 less negative with respect to the cathode 411 in response to the potential signal received by the Z-axis amplifier 166. In consequence, the number of electrons in the beam of the cathode ray tube 158 is increased with the increased speed of travel of the beam due to the potential signals modifying the vertical positioning potential.

The potential signal received from the limiter stage 128 is further transmitted to a twin diode tube 783 in the major suppressor stage. This major suppressor functions in the same manner as the minor suppressor, in that a potential differential against conductivity of any desired amplitude is established between the cathodes and the plates. The potential on the plates and consequently in the condenser 789 will not be affected excepting by negative potential signals reaching the cathode of sufficient amplitude to overcome the potential difference established between the cathodes and the plates resisting conductivity. The value of the potential difference may be adjusted by means of the potentiometer 787 which provides a negative voltage of any desired amplitude to the plates of the tube 783.

Those portions of the negative signal potentials having an amplitude in excess of that required to overcome the potential difference between the cathodes and the plates of the tube 783 are transmitted as negative potential signals to the grid 790 of the tube 791. This tube is plate loaded and consequently the derivatives of the potential signals received on the grid 790 of the tube 791 that reach the gas tube 795 have been phase inverted and consist of positive components. These positive components render the gas tube 795 conductive, creating a flow of current from the cathode to the plate which closes a circuit through a solenoid 799, which being energized, opens the contacts 797 and 798 and closes the contacts 808 and 809. The closing of the contacts 808 and 809 closes a circuit from the transformer 816 to the means for actuating the bells 60 and 64. By this arrangement it is possible to adjust the negative potential on the plates of the major suppressor tube 783 to a point such that a potential signal will be transmitted for further amplification only if it is of a magnitude such that when presented on the screen of the cathode ray tube 158 it will deflect the beam by one sweep or more.

In one form, the means for causing the pen 70 to write comprises the conductor 817 leading to the grid 818 of a tetrode tube 819. The tetrode tube 819 is in a circuit deriving power from the potential source 907 and potential signals received on the grid 818 will cause a solenoid 820 to move the pen arm 70 against its mechanical bias so as to delineate an ink signals upon the tape. As mentioned elsewhere, it is possible to omit this amplification stage and still successfully operate the pen.

The foregoing explains the complete functioning of the system when an excessively strong signal, such as that produced by a rail joint or a broken rail, does not affect the system. Such signals are approximately five times the amplitude of the strongest potential signal received from the largest of internal fissures and inasmuch as it is desirable, at least in the case of rail joint signals, to see these signals visibly in order to detect modifications in their regular contour which might indicate the presence of a fissure close to the rail end, the applicants provide a rail joint attenuator which consists of a resistance 751 automatically shorting the coil 50 to ground when the coil 50 is passing over a rail joint or a broken rail. The switch that cuts the resistance 751 into the circuit of the coil 50 bears the general number 142 and comprises two contacts 752 and 753, see Figure 57. These contacts are closed by means of the solenoid 773 which is actuated in response to a potential signal received from the rail joint pick-up 92. The amplification value of the amplifier between the pick-up coil 92 and the gas tube 767 together with the adjustment of the tube is such that the tube 767 will not become conductive excepting for potential signals having an amplitude in excess of the maximum signal produced by any flaw other than a rail joint or a broken rail.

The coil 92 is connected to ground and to a low gain amplifying stage 132, which stage is plate loaded and connects to the grid of a twin triode tube 953. The twin triode tube is supplied with circuits similar to those in the full wave rectification stage in the main amplifier, the output of the twin triode tube, being connected to the plates of the diode tube 954 instead of to the cathodes, as in the case of the twin diode tube 851 in the main amplifier. The reason for this is that in order for the full wave rectified signal on the pick-up 92 to render conductive the gas tube 767, the full wave rectified signal must be positive. Inasmuch as current in the twin diode tube flows from the plates to the cathodes (that is, the electrons flow from the cathodes to the plates) only the positive components of the potential signals reaching the plates of the twin diode tube will render the tube conductive, with the result that the positive components will produce a positive derivative in the cathode circuits of this twin diode tube. These positive components are communicated by the condensers 955 and 956 directly to the grid 766 of the gas tube 767. When the gas tube 767 is rendered conductive, the circuit from the conductor 906 to ground is completed thereby energizing the coil 773, opening the contacts 774 and 775 and closing the contacts 753 and 752. The contacts 957 and 958 are also closed so as to actuate the rail joint counter 516 and the shutter on the camera 519. A condenser 781 has a capacity such that it will hold the solenoid energized for that period of time necessary for the main pick-up 50 to pass from a point five inches on one side of a rail joint to a point five inches on the other side, the main pick-up 50 being positioned approximately five inches behind the rail joint pick-up 92.

Operation

A detailed description of the operation of applicants' equipment in actual service will further assist in relating the various parts. The analyzer is dropped to its normal position on the rail and the traction motor started. The axle 24, see Figure 4, will be disengaged from the driving motor 20, which will be energized so as to cause the tachometer generator 78 to rotate at a speed approximately that at which it rotates when the exploratory equipment is moving along the rail at approximately ten feet per second. By this means, conditions simulating those during movement of the equipment along the rail are obtained.

Referring to Figure 2, the motor 66 of the pen and tape unit 51 are started and also the rotary potentiometer 160 and commutator 152, see Figure 24. All of the electronics are energized for the equipment on both rails. To adjust the apparatus, the analyzer pick up is connected to one of the amplification systems and a suitable current, such as a one-quarter ampere is passed through the spotting coil. The potential signal derived from the spotting coil flux field is adjusted so that its visible signal is of a suitable amplitude, such as one and one-half sweeps, as shown in Figure 30. When the beam of the tube is delineating the spotting coil signal regularly at this height, the major signal suppressor stage by means of the potentiometer 787, see Figure 53, is adjusted to render the gas tube 795 conductive for all potential signals derived from the coupling stage 128 having an amplitude sufficiently great to produce a visible signal on the screen exceeding in height one sweep. By this means, the entire system is adjusted so that for any visible signal exceeding in height one sweep, the bell 60 and the pen 70 will be actuated. This process is repeated for the second pen 72, the second set of bells 61 and 65, and the second amplification system.

This is done by rendering ineffective the minor suppressor stage 130, under which circumstances the reference line, see Figure 39, is modified by small signals if the rail joint attenuator is not functioning. If on passing over a rail joint no small signals or ripples appear, and the principal rail joint visible signal appears to be attenuated, all that need be done is to check the point at which the rail joint attenuator commences to function. This may require the traversing of several rail joints. With the minor suppressor not in use, small peaks such as those depicted in Figure 46 will appear along the base line at almost all points, but the rail joint attenuator will reduce these peaks to almost a straight line. At the point where this occurs, it is known that the rail joint attenuator became effective. Inasmuch as the rail joint pick up coil and the main pick up coil are separated by a predetermined distance, see Figure 43, as, for example, five inches, the duration of the cut out will not vary unless for some reason one of the positioning lugs 550 does not hold one of the two pick up housings, such as 544, in proper position.

As the equipment moves along the rail, a signal, such as those shown in Figures 10 and 11, may appear on the tube's screen. If the rail observer sees a burn in the rail, no stop will be made. When a signal such as that presented in Figure 14 is encountered, no stop will be made regardless of whether the rail observer sees a flaw.

Upon receiving a signal such as that presented in Figure 17, the equipment is stopped, the bell and pen unit are disconnected, and the rotary potentiometer 160 and commutator 162 assemblies are connected to the main generator 18 so that these assemblies function at a constant speed approximating their speed during normal movement of the equipment along the rail. The equipment is backed to the locality where the signal was received.

The analyzer is then disconnected and, with the analyzer pick up coil in operation, it is manually moved along the rail until the same visual signal is obtained as noted during the exploratory step. When this occurs, the rail observer turns on the spotting coil and continues to move the analyzer until the spotting coil flux field modifies the internal fissure flux field so as to produce a composite signal on the tube's screen.

The rail is then examined to determine the exact character of the flaw. This may require checking with a potentiometer. After locating and determining the exact nature of the flaw, the rail is suitably marked for the track maintenance crew.

In further testing rail, it may be assumed that a signal is received such as that presented in Figure 22, in passing over a rail joint, with the exception that the two sharp peaks shown in dotted outline actually appear as part of the signal. The equipment is then backed up to the rail joint and the analyzer is positioned on that side of the joint where the fissure is believed to be, the point 561 where potential signals derived from the analyzer pick up 82 ceases to be transmitted to the amplification system being to that side of the rail joint such that the pick up will not derive a potential signal from the strong rail joint flux field. It will be noted that in analyzing the rail ends, it is impossible to move the analyzer so as to utilize the spotting coil for locating the fissure. If desired, the spotting coil may be moved with respect to the carriage. However, the exact location of the flaw can be determined by measuring the distance between the spotting coil signal on the cathode ray tube and the signal from the internal fissure and multiplying the distance by the factor ten. The produce may then be actually measured off along the rail from a point immediately beneath the spotting coil.

In traversing upon hearth or carbon steel frogs, the applicants' equipment functions in the same way as it does in passing over a rail joint. In the case of spring frogs, the rail joint attenuator generally does not operate at all, the potential signal obtained by the disturbance at the point of juncture of the rail being less than that sufficient to cause the beam of the tube to rise more than nine or ten sweeps above the reference line which it is delineating. In passing over manganese frogs and manganese cross overs, no potential signals, of course, will be received.

The equipment operates well on bridges or trestles. Applicants are able to traverse such track and obtain reliable fissure indications. High bolts adjacent to the rails for holding the same or other guide or guard rails in position do not sufficiently affect the residual field which applicants are examining to produce potential signals. The same highly favorable results are obtained by applicants' equipment in the case of rail braces. A rail brace is a triangular member engaging the under-side of the ball of the rail and positioned over a tie. In mountainous stretches, it is not uncommon to find a rail brace for every tie for an entire mile of track. In certain existing flaw detecting systems, rail braces so alter the field around the rail so as to produce a signal for every rail brace traversed, with the result that such track cannot be properly examined for flaws. Rail braces do not affect the ability of applicants' equipment to obtain faithful derivatives of the flux fields above the ball of the rail.

The equipment and its operation has now been described. New methods and new apparatus have been pointed out while showing how the various parts cooperate to produce an improved visual signal of a dangerous flaw. It will be understood that the apparatus provided for practicing any particular part of the method is not the only apparatus that could be devised for such purpose. It will further be appreciated that the apparatus disclosed can be varied in many ways without departing from the spirit of the invention, It is to be understood that features of this invention can be applied to purposes other than the detection of flaws in rails. For example, the invention can be applied to detecting flaws in steel or iron pipe, or in extended electrical welds.

Where the word "magnetized" is used in the claims, i. e. "magnetized rail," applicants mean a rail which has flux fields thereabout. Whether the flux fields are sustained flux fields resulting from current flowing through the rail or from the presence of spaced apart poles of a magnet or residual flux fields is immaterial.

The terms "approach zone" and "departure zone" identify respectively the first part, and in the case of a transverse fissure substantially the first half, of the flux field as transversed by the flux responsive means, and the last part of a flux field as transversed by the flux responsive means.

We claim:

1. The method of detecting flaws in rails lying in a road bed comprising the steps of energizing a rail so as to produce flux fields thereabout, of moving flux responsive means through said flux field so as to produce potential signals having positive and negative components, of full wave rectifying the potential signals induced in said flux responsive means, applying potentials to one set of plates of a cathode ray tube so as to cause the tube beam to move along a path, and impressing the full wave rectified potential signals on the other set of plates of the cathode ray tube so as to produce visible signals all of which are positioned on the same side of the beam path, whereby the amplitude of positive components of a potential signal may be readily compared to the amplitude of negative components.

2. The method of visibly presenting potential signals derived by a flux responsive means passed through flaw flux fields adjacent to a rail which comprises moving the flux responsive means through said flux fields to produce potential signals, sweeping a beam of a cathode ray tube so as to delineate at a speed sufficiently slow to be followed by the eye, an extended path on the tube's screen exceeding in length the diameter of the screen once for each rail length traversed by the flux responsive means, impressing the potential signals on the beam in such a way that they will appear visibly as line departures from said extended path, and utilizing the potential signals to increase the intensity of the beam when the beam is moving in response to a potential signal from the magnetic pick-up.

3. That improvement in methods of locating flaws in rails lying in track that are sufficiently energized to have flux fields thereabout, which comprises moving a flux responsive means through flux fields adjacent a selected portion of a rail to produce potential signals, positioning externally of the rail a flux field of known position adjacent said rail portion whereby the flux responsive means will produce potential signals from said external flux field, and concurrently visibly depicting on a visible presentation means the potential signal from said last mentioned flux field along with potential signals produced by other flux fields in said portion of the rail whereby the space relationship of the visible signals will indicate the space relationship of the respective flux fields.

4. That improvement in methods of locating flaws in magnetized rails, which comprises the steps of moving a flux responsive means through the flux fields above a selected portion of rail to produce potential signals, modifying said flux fields at a known position by an independently produced flux field of known characteristics, of visibly depicting all of said signals derived from the selected portion of the rail, and moving said independently produced flux field with respect to the rail flux fields whereby the independently produced flux field may be caused to modify any specific flux field adjacent the rail to produce a composite visible signal.

5. That improvement in methods of locating flaws in magnetized rails, which comprises the steps of moving a flux responsive means through the flux fields adjacent a selected portion of rail to produce potential signals, of moving the beam of a cathode ray tube along a selected path, of so impressing the potential signals on the beam as to cause it to make line departures from said path, and of modifying said flux fields at a known position by an independently produced flux field of known characteristics, whereby the visible signal from the independently produced flux field will appear in a predetermined, space relationship to visible signals derived from other flux fields in the selected portion of rail.

6. That improvement in methods of locating flaws in magnetized rails, which comprises the steps of moving a flux responsive means through the flux fields adjacent a selected portion of rail to produce repeatedly potential signals from the flux fields adjacent said portion of the rail, of moving the beam of a cathode ray tube along an extended path, of repeatedly impressing all of the potential signals derived from the flux fields adjacent the selected portion of the rail upon the beam so as to cause it to make line departures from said path, of inducing a potential signal in said flux responsive means at a known position adjacent that portion of the rail being examined, and of slowly changing the selected portion of the rail being examined so as to cause the induced potential derived from the known position to modify any desired potential signal derived from a rail flux field, whereby it will be known that the latter potential signal is derived from a source adjacent to the point of known position.

7. Apparatus for detecting flaws in rails comprising means for magnetizing a length of rail, means for traversing a flux responsive means over the rail ball whereby flux fields formed by flaws cause potentials to be induced in said flux responsive means, means for translating the potentials to form intelligible signals, a spotter coil located adjacent the path of movement of the flux responsive means, whereby movement of the flux responsive means past the spotter coil likewise causes a signal, and means for adjusting the position of the spotter coil along the rail to facilitate exact location of a flaw.

8. Apparatus for providing a permanent record of rail flux fields comprising means for presenting on the screen of a cathode ray tube a visible signal of all potential signals derived from the flux fields adjacent to an entire rail, means for presenting successively such complete rail visible signals as a pick-up deriving the potential signals from said rail flux fields traverses succeeding rails lying in a track, a rail joint counter positioned adjacent the screen of the tube, and means for photographing the visible signal derived from each complete rail and the rail joint counter on successive frames of a film, whereby a permanent record of each rail flux field together with a number for each rail may be provided.

9. That improvement in methods of evaluating a selected flaw flux field adjacent to an energized rail lying in track which comprises the steps of passing a flux responsive means repeatedly at substantially regular intervals through said selected flaw flux field and through all flux fields on each side thereof for a substantial distance along the rail to produce recurrent potential signals derived from all said flux fields, of amplifying all of said potential signals proportionately, and of repeatedly depicting these recurrent potential signals on a visible presentation means, whereby it is possible not only to correctly evaluate the selected flaw flux held but also to understand its relationship to adjacent flux fields.

10. An instrument for deriving potential signals from flux fields above a rail for presentation in visible form comprising a carriage, a flux responsive means mounted on the carriage adjacent to the ball of the rail, and means mounted on the carriage for moving the flux responsive means repeatedly along and substantially parallel to the rail irrespective of movement of the carriage along the rail.

11. An instrument for deriving potential signals from flux fields above a rail for presentation in visible form comprising a carriage, a flux responsive means mounted on the carriage adjacent to the ball of the rail, means mounted on the carriage for moving the flux responsive means repeatedly along and substantially parallel to the rail irrespective of movement of the carriage along the rail, and means for grounding all potential signals derived by the flux responsive means during a selected portion of its movement.

12. An instrument for deriving potential signals from flux fields above a rail for presentation in visible form comprising a pick-up coil, a carriage supported on wheels for engaging the rails of a track, a pick-up coil depending from said carriage to a point adjacent to the rail, means mounted on the carriage for moving the pick-up coil along the rail when the carriage is not moving with respect thereto, and means mounted on the carriage for preventing the wheels from dropping into rail joints so as to alter the distance between the pick-up and the rail.

13. In apparatus for detecting flaws in rails lying in a roadbed, potential signal producing means comprising a core made of non-magnetic material disposed adjacent to the ball of the rail, and an elongated coil of wire wound on said non-magnetic core and disposed transversely to the length of the rail, said elongated coil having its ends projecting beyond each side of the ball of the rail whereby small lateral movements of the coil with respect to the rail will not substantially alter the potential signal producing characteristics of the elongated coil.

14. In apparatus for detecting flaws in rails lying in a roadbed, potential signal producing means comprising a core made of non-magnetic material disposed adjacent to the ball of the rail, and a pair of flat, elongated coils of wire wound on said non-magnetic core and connected in series oposition having a common major axis and disposed transversely to the length of the rail, one above the other, whereby potential signals produced by vertical movements of the potential signal producing means with respect to the rail will be minimized without eliminating potential signals produced by horizontal movement of said means along the rail.

15. That improvement in the method of detecting flaws in rails wherein a rail is energized to produce flux fields thereabout and a flux responsive means is moved through said flux fields to produce potential signals proportional to the density of the flux and rate of speed of the flux responsive means therethrough, which comprises the steps of conducting all potential signals produced by the flux responsive means to a cathode element of a vacuum tube, of establishing on the plate of said tube a potential against tube conductivity equal to the maximum amplitude of such potential signals as experience shows do not have fissure significance, of connecting the plate circuit of said tube to one set of plates of a cathode ray tube, and of applying potentials to the plates of said tube to cause the beam to move along a path on the tube screen, whereby only signals having a selected large amplitude will cause a deflection of the tube beam from its normal path.

16. Apparatus for finding flaws in magnetized rails lying in a roadbed, comprising means for producing potential signals derived from flux fields adjacent to a rail being traversed by said apparatus, means for amplifying such potential signals to a selected strength, means for eliminating all voltage of potential signals in excess of a given amplitude without altering the character of the uneliminated remainder of the potential signals to produce limited potential signals, and means for faithfully presenting said limited potential signals in visible form, whereby the visible signals from potential signals of small amplitude may be increased in size to a point where they may be evaluated on the visible presentation means while the visible signals derived from the larger potential signals may nevertheless be held within the confines of the visible presentation means.

17. Apparatus for finding flaws in magnetized rails lying in a roadbed, comprising means for producing potential signals derived from flux fields adjacent to a rail being traversed by said apparatus, means for amplifying such potential signals to a selected strength, means for eliminating all voltage of potential signals in excess of a given amplitude without altering the character of the uneliminated remainder of the potential signals to produce limited potential signals, a cathode ray tube, and means for impressing said limited potential signals on the beam of the cathode ray tube in such a manner that the potential signals will cause the beam to make line departures from a normal path of the tube beam whereby movements of the beam from its normal path in response to potential signals may not exceed a selected distance.

18. Apparatus for finding flaws in magnetized rails lying in a roadbed, comprising means for producing potential signals derived from flux fields adjacent to a rail being traversed by said apparatus, means for amplifying said potential signals to a selected strength, means for eliminating all voltage of potential signals in excess of a given amplitude without altering the character of the uneliminated remainder of the potential signals to produce limited potential signals, a cathode ray tube, means for causing the beam of the cathode ray tube to delineate a path on the tube screen, means for impressing said limited potential signals on the beam of the cathode ray tube in such a manner that the potential signals will cause the beam to make line departures from said path, and a Z-axis amplifier actuated by said limited potential signals and connected to the modulating grid of the cathode ray tube, whereby the beam of the tube when deflected from its normal path will be intensified to produce a readily visible trace when the beam is moving responsive to a resultant potential signal.

19. Apparatus for finding flaws in magnetized rails lying in a roadbed comprising flux responsive means, means for moving the flux responsive means along the rail to produce potential signals derived from flux fields adjacent to the rails, means for attenuating all potential signals while the potential signal producing means is traversing flux fields of a selected high amplitude such as rail joint, frog and broken rail flux fields, to produce an attenuated signal, means for amplifying both the potential signals and the attenuated signals, and means for presenting faithfully in visible form both the potential signals and the attentuated potential signals, whereby the strong potential signals derived by the flux responsive means at rail joints, etc., may be safely introduced as attenuated potential signals to the amplification means and may be seen in attenuated form on the visible presentation means.

20. Apparatus for detecting flaws in magnetized rails lying in a roadbed comprising means for producing potential signals derived from flux fields adjacent to rails, means for amplifying said potential signals, a cathode ray tube, means for causing the beam of a cathode ray tube to delineate a path on its screen, means for impressing said potential signals on the beam of the cathode ray tube in such a manner that the potential signals will cause the beam to make line departures from said path, and means for attenuating all potential signals produced by the potential signal producing means while it is traversing flux fields of selected high amplitude such as rail joint, frogs or broken rails flux fields, whereby said potential signals will produce visible signals of a size capable of evaluation without danger to the amplification means.

21. Apparatus for visibly presenting potential signals derived by a flux responsive means passed through flux fields adjacent a rail lying in track comprising flux responsive means for producing potential signals, means for rendering said potential signals negative with respect to ground connected to the flux responsive means, a push-pull amplifier stage connected to the output of the last mentioned means, a cathode ray tube having two sets of deflection plates positioned on axes 90 degrees apart, means for connecting the output of said push-pull stage to one set of the deflection plates, and means operable on the other set of the deflection plates for causing the beam to sweep back and forth at a speed proportional to the speed of the flux responsive means through the flux fields adjacent the rail.

22. Apparatus for visibly presenting potential signals derived by a flux responsive means passed through flux fields adjacent a rail lying in track comprising means for deriving potential signals from flux fields adjacent to the rail, a cathode ray tube having horizontal and vertical sets of deflection plates, a horizontal positioning potential operable on the horizontal set of deflection plates for causing the beam to sweep back and forth at a speed proportional to the rate of travel of the flux responsive means along the rail, a vertical positioning potential operable on the vertical deflection plates for causing the tube beam to make a series of horizontal sweeps each at a different level on the tube screen from the preceding sweep commencing in the upper part of the tube's screen and working down until the first delineated sweep has faded and then returning to repeat the series of horizontal sweeps, and means for impressing the potential signals upon said vertical positioning potential, said means comprising a resistance positioned between a potential positive with respect to ground and a potential equally negative with respect to ground and means for tapping said resistance at selected points for altering the potential output to the vertical deflection plates.

23. Apparatus for visibly presenting potential signals derived by a flux responsive means passed through flux fields adjacent a rail lying in track comprising means for deriving potential signals from flux fields adjacent to the rail, a cathode ray tube having horizontal and vertical sets of deflection plates, a horizontal positioning potential operable on the horizontal set of deflection plates for causing the beam to sweep back and forth at a speed proportional to the rate of travel of the flux responsive means along the rail, a vertical positioning potential operable on the vertical deflection plates for causing the tube beam to make a series of horizontal sweeps each at a different level on the tube screen from the preceding sweep commencing in the upper part of the tube's screen and working down until the first delineated sweep has faded and then returning to repeat the series of horizontal sweeps, and means for impressing the potential signals upon said vertical positioning potential, said means comprising a resistance positioned between a potential positive with respect to ground and a potential equally negative with respect to ground, a rotatable wheel having segmental contacts each of which is connected to one point on the resistance which points divide the resistance into a number of segments equal to the number of levels that the beam is to move along on the screen, means for successively tapping each segment to derive therefrom the potential on the segment, and means for conducting said potential to the vertical deflection plates of the cathode ray tube.

24. Apparatus for visibly presenting potential signals derived by a flux responsive means passed through the flux fields adjacent a rail lying in track comprising a flux responsive means for deriving potential signals from flux fields adjacent to a rail, means connecting the flux responsive means to the grid of a vacuum tube, a source of positive potential applied to the plate of said tube, means connecting the cathode of said tube to a pair of potentiometers having like resistances in series and thence to a resistance equalling that of the vacuum tube, the free end of the last named resistance being connected to a source of negative potential equal to the aforesaid positive potential, a tap from each of the potentiometers, a second resistance connecting said pair of taps, a plurality of taps on said resistance each tap connected to a segmental contact on a rotatable wheel, a contact arm engageable with said contact segments successively as the wheel is rotated whereby the potential on the contact arm may start at a maximum positive with respect to ground derived from one of the potentiometers and drop by equal steps to a maximum negative obtained from the other potentiometer, means connecting the contact arm through a push-pull stage to the vertical control plates of a cathode ray tube, means for converting all potential signals derived from the flux responsive means to a potential negative with respect to ground, and means operable upon the horizontal deflection plates of the cathode ray tube for causing the beam of the tube to sweep back and forth at a speed proportional to the speed of the flux responsive means through the flux fields adjacent to the rail.

25. Apparatus for visibly presenting potential signals derived by a flux responsive means passed through the flux fields adjacent a rail lying in track comprising a flux responsive means for deriving potential signals from flux fields adjacent to a rail, means connecting the flux responsive means to the grid of a vacuum tube, a source of positive potential applied to the plate of said tube, means connecting the cathode of said tube to a pair of potentiometers having like resistances in series and thence to a resistance equalling that of the vacuum tube, the free end of the last named resistance being connected to a source of negative potential equal to the aforesaid positive potential, a tap from each of the potentiometers, a second resistance connecting said pair of taps, a plurality of taps on said resistance each tap connected to a segmental contact on a rotatable wheel, a contact arm engageable with said contact segments successively as the wheel is rotated whereby the potential on the contact arm may start at a maximum positive with respect to ground derived from one of the potentiometers and drop by equal steps to a maximum negative obtained from the other potentiometer, means connecting the contact arm through a push-pull stage to the vertical control plates of a cathode ray tube, means for converting all potential signals derived from the flux responsive means to a potential negative with respect to ground, and means operable upon the horizontal deflection plates of the cathode ray tube for causing the beam of the tube to sweep back and forth at a speed proportional to the speed of the flux responsive means through the flux fields adjacent to the rail, said means comprising a resistance positioned between a positive potential and an equal negative potential, a tap movably engaging said resistance, means for causing said tap to derive a maximum positive potential dropping regularly to a maximum negative potential proportionately with the speed of the flux responsive means through the flux fields adjacent to the rail and thence back again to a maximum positive potential, and means connecting said tap arm through a push-pull stage to the horizontal deflection plates of the cathode ray tube whereby the beam of the tube will sweep back and forth at different levels on the tube screen while the potential signals will cause the beam to make line departures from the resulting path.

26. Apparatus for visibly presenting potential signals derived by a flux responsive means passed through the flux fields adjacent a rail lying in track comprising a flux responsive means for deriving potential signals from flux fields adjacent to a rail, means connecting the flux responsive means to the grid of a vacuum tube, a source of positive potential applied to the plate of said tube, means connecting the cathode of said tube to a pair of potentiometers having like resistances in series and thence to a resistance equalling that of the vacuum tube, the free end of the last named resistance being connected to a source of negative potential equal to the aforesaid positive potential, a tap from each of the potentiometers, a second resistance connecting said pair of taps, a plurality of taps on said resistance each tap connected to a segmental contact on a rotatable wheel, a contact arm engageable with said contact segments successively as the wheel is rotated whereby the potential on the contact arm may start at a maximum positive with respect to ground derived from one of the potentiometers and drop by equal steps to a maximum negative obtained from the other potentiometer, means connecting the contact arm through a push-pull stage to the vertical control plates of a cathode ray tube, means for converting all potential signals derived from the flux responsive means to a potential negative with respect to ground, and means operable upon the horizontal deflection plates of the cathode ray tube for causing the beam of the tube to sweep back and forth at a speed proportional to the speed of the flux responsive means through the flux fields adjacent to the rail, said means comprising a circular resistance tapped at two points 180 degrees apart by a source of positive potential and a source of equal negative potential, an arm rotatable about the center of said circular resistance and in contact therewith whereby the arm may derive a potential varying from a maximum positive to a maximum negative and back to a maximum positive when the arm is moved in one direction, means for rotating the arm at a speed proportional to the rate of travel of the flux responsive means through the flux fields adjacent a rail, and means connecting the rotatable arm through a push-pull stage to the horizontal deflection plates of the cathode ray tube whereby the beam of the tube will be caused to move successively along horizontal paths, repeating after a predetermined interval, and whereby potential signals will cause the beam to make line departures from said horizontally sweeping beam.

27. Apparatus for visibly presenting potential signals derived by a flux responsive means passed through the flux fields adjacent a rail lying in track comprising a flux responsive means for deriving potential signals from flux fields adjacent to a rail, means connecting the flux responsive means to the grid of a vacuum tube, a source of positive potential applied to the plate of said tube, means connecting the cathode of said tube to a pair of potentiometers having like resistances in series and thence to a resistance equalling that of the vacuum tube, the free end of the last named resistance being connected to a source of negative potential equal to the aforesaid positive potential, a tap from each of the potentiometers, a second resistance connecting said pair of taps, a plurality of taps on said resistance each tap connected to a segmental contact on a rotatable wheel, a contact arm engageable with said contact segments successively as the wheel is rotated whereby the potential on the contact arm may start at a maximum positive with respect to ground derived from one of the potentiometers and drop by equal steps to a maximum negative obtained from the other potentiometer, means connecting the contact arm through a push-pull stage to the vertical control plates of a cathode ray tube, means for converting all potential signals derived from the flux responsive means to a potential negative with respect to ground, and means operable upon the horizontal deflection plates of the cathode ray tube for causing the beam of the tube to sweep back and forth at a speed proportional to the speed of the flux responsive means through the flux fields adjacent to the rail, said means comprising a circular resistance tapped at two points 180 degrees apart by a pair of conductors, one leading to a potentiometer connected to the positive terminal of a source of current and the other potentiometer connected to the negative terminal of a source of current, an arm rotatable about the center of the circular resistance and engageable therewith, a motor for rotating said arm at a speed proportional to the speed of the flux responsive means along the rail, and means connecting said arm through a push-pull stage to the horizontal deflection plate of the cathode ray tube.

28. Apparatus for permanently recording in visible form changes in flux density adjacent a rail lying in track comprising a rail car, a pick-up suspended from said car adjacent to the rail, means for presenting all of the potential signals derived from said pick-up from the flux fields adjacent to a single rail on the screen of a cathode ray tube in non-overlapping relationship, a camera focussed on said screen, a second pick-up positioned adjacent to the first pick-up, means for positioning a film behind the camera lens and opening its shutter, and means for functioning the last named means in response to potential signals of a selected amplitude derived by the second pick-up.

29. Apparatus for permanently recording in visible form changes in flux density adjacent a rail lying in track comprising a rail car, a pick-up suspended from said car adjacent to the rail, means for presenting all of the potential signals derived from said pick-up from the flux fields adjacent to a single rail on the screen of a cathode ray tube in non-overlapping relationship, a camera focussed on said screen, a second pick-up positioned adjacent to the first pick-up, means for positioning a film behind the camera lens and opening its shutter, a relay for actuating said film positioning and shutter opening means, an amplifier connecting the primary circuit of the relay to the second pick-up, and means for rendering ineffective all potential signals derived by the second pick-up having an amplitude less than the amplitude of the signal produced by the flux field adjacent to a rail joint, whereby the film will be and the shutter opened as each rail joint is traversed by the second pick-up.

30. That improvement in methods of evaluating a selected flaw flux field adjacent to an energized rail lying in track which comprises the steps of positioning a flux field of known amplitude adjacent the rail, of moving a flux responsive means repeatedly at substantially regular intervals through said selected flaw flux field and through the flux field of known amplitude so as to produce a recurrent potential signal derived from both flux fields, of amplifying all of said potential signals proportionately, and of repeatedly depicting these recurrent potential signals on a visible presentation means, whereby it is possible to compare the selected flaw flux field in the rail with the flaw flux field of known amplitude by comparing the amplitude of the signal derived from the selected flaw flux field with the amplitude of the signal derived from the flux field of known amplitude.

31. The method of evaluating a potential signal derived from an internal transverse fissure flux field adjacent to an energized rail lying in track comprising the steps of positioning in the vicinity of a suspected dangerous flaw flux field a flux field of known amplitude and of a length along the rail approximating the length of a typical internal transverse fissure flux field, of moving a flux responsive device through both the fields adjacent that portion of the rail containing the suspected flaw flux field at a substantially constant speed and through the flux field of known amplitude and length so as to produce two potential signals, and of concurrently translating both potential signals into concurrently visible signals so that the amplitude and length of the suspected flaw flux field may be compared to the amplitude and length of the known flux field, whereby it is possible to select as the amplitude for the flux field of known amplitude a flux strength approximately equal to the flux strength of the smallest internal transverse fissure flux field that it is desirable to discover—called the criterion dangerous flux field—with the result that by mere inspection, an operator can tell if a suspected flaw flux field is larger or smaller than the criterion dangerous flux field.

32. The method of evaluating a potential signal derived from an internal transverse fissure flux field adjacent to an energized rail lying in track comprising the steps of positioning in the vicinity of a suspected dangerous flaw flux field a flux field of known amplitude and of a length along the rail approximating the length of a typical internal transverse fissure flux field, of moving a flux responsive device through both the fields adjacent that portion of the rail containing the suspected flaw flux field at a substantially constant speed and through the flux field of known amplitude and length so as to produce two potential signals, and of applying concurrently a vertical positioning potential and a horizontal positioning potential to the beam of a cathode ray tube so that the beam will delineate an extended path on the tube screen at a substantially constant speed readily visible to the eye, and of impressing the potential signals from the suspected flaw flux field and from the flux field of known amplitude on one of the positioning potentials so as to cause the beam to make line departures from said path, whereby it is possible to select as the amplitude for the flux field of known amplitude a flux strength approximately equal to the flux strength of the smallest internal transverse fissure flux field that it is desirable to discover—called the criterion dangerous flux field—with the result that by mere inspection, an operator can tell if a suspected flaw flux field is larger or smaller than the criterion dangerous flux field.

33. Apparatus for deriving potential signals from flux fields adjacent a rail lying in track comprising a carriage, a pair of wheels for supporting the carriage on a rail, a flux responsive means reciprocatable adjacent to and substantially parallel to the rail in substantial alignment with said two wheels, and means for reciprocating said flux responsive means.

34. Apparatus for deriving potential signals from flux fields adjacent a rail lying in track comprising a carriage, a pair of wheels for supporting the carriage on a rail, a track supported on said carriage and extending substantially along a line connecting the two wheels, a flux responsive means reciprocable along said track adjacent to the rail supporting the two wheels, and means for reciprocating the flux responsive means.

35. Apparatus for deriving potential signals from flux fields adjacent a rail lying in track comprising a frame positioned between two rail engaging supports, a guide supported on said frame and extending along a line connecting the rail engaging supports, a closed belt positioned adjacent said guide, a flux responsive means fastened to said belt and riding said guide whereby the flux responsive means is caused to reciprocate along said guide, means for driving said belt, and means for connecting said flux responsive means to a means for visibly presenting the potential signals derived by said flux responsive means.

36. Apparatus for deriving potential signals from flux fields adjacent a rail lying in track comprising a frame positioned between two rail engaging supports, a guide supported on said frame and extending along a line connecting the rail engaging supports, a pair of spaced shafts positioned substantially at right angles to said guide, sprockets on said shafts adjacent to the guide, a closed chain over said sprockets, means for rotating one of said sprockets, a flux responsive means reciprocatable along said guide and fastened to one of the links of said chain, and means for connecting said flux responsive means to a means for visibly presenting the potential signals derived by said flux responsive means.

37. Apparatus for deriving potential signals from flux fields adjacent a rail lying in track comprising a frame positioned between two rail engaging supports, a guide supported on said frame and extending along a line connecting the rail engaging supports, a pair of spaced shafts positioned substantially at right angles to said guide, a sprocket on each shaft adjacent said guide, a closed chain over said sprockets and extending substantially parallel to said guide, a carriage reciprocatable along said guide, a track on said carriage at substantially right angles to its reciprocable motion, a driving link mounted on said chain and engaging said track, a flux responsive means suspended from said carriage, and means for rotating one of said sprockets whereby the flux responsive means will reciprocate along the guide.

38. Apparatus for deriving potential signals from flux fields adjacent a rail lying in track comprising a frame positioned between two rail engaging supports, a guide supported on said frame and extending along a line connecting the rail engaging supports, a pair of spaced shafts positioned substantially at right angles to said guide, a sprocket on each shaft adjacent said guide, a closed chain over said sprockets and extending substantially parallel to said guide, a carriage reciprocatable along said guide, a track on said carriage at substantially right angles to its reciprocable motion, a driving link mounted on said chain and engaging said track, a flux responsive means suspended from said carriage, shock absorbent means near each end of the chain for slowing down and accelerating the flux responsive means at each end of the reciprocating stroke, and means for rotating one of said sprockets whereby the flux responsive means will reciprocate along the guide.

39. Apparatus for deriving potential signals from flux fields adjacent a rail lying in track comprising a frame positioned between two rail engaging supports, a guide supported on said frame and extending along a line connecting the rail engaging supports, a pair of spaced shafts positioned substantially at right angles to said guide, a sprocket on each shaft adjacent said guide, a closed chain over said sprockets and extending substantially parallel to said guide, a carriage reciprocatable along said guide, a track on said carriage at substantially right angles to its reciprocable motion, a driving link mounted on said chain and engaging said track, a flux responsive means suspended from said carriage, a flexible member fastened to the frame and having a portion flexible in the direction of travel of the flux responsive means at each end of the flux responsive means travel whereby to cushion the flux responsive means' reversal of direction, and means for rotating one of said sprockets whereby the flux responsive means will reciprocate along the guide.

40. Apparatus for deriving potential signals from flux fields adjacent a rail lying in track comprising a frame positioned between two rail engaging supports, a flux responsive means reciprocatable adjacent and substantially parallel to the rail and supported by said frame, means on the frame for reciprocating said flux responsive means at a substantially constant speed during all but the end portions of the fore stroke, a circuit connected to the flux responsive means for connecting the flux responsive means to amplification and visual presentation means and means for shorting said circuit to ground on all but that portion of the forestroke wherein the flux responsive means is moving at substantially constant speed.

41. Apparatus for deriving potential signals from flux fields adjacent to a rail lying in track comprising a frame positioned between two rail engaging supports, a flux responsive means mounted on said frame and reciprocatable adjacent the rail between said rail engaging supports, means for reciprocating said flux responsive means, means for transmitting potential signals derived by the flux responsive means to visual presentation means, and means for producing a flux field of sufficient strength to produce a potential signal in the flux responsive means positioned adjacent the path of the flux responsive means at a known position.

42. Apparatus for deriving potential signals from flux fields adjacent to a rail lying in track comprising a frame positioned between two rail engaging supports, a flux responsive means mounted on the frame and reciprocatable adjacent the rail between said rail engaging supports, means for reciprocating said flux responsive means, means for transmitting potential signals derived by the flux responsive means to visual presentation means, and means for producing a flux field of sufficient strength to produce a potential signal in the flux responsive means and known length along the rail positioned between the flux responsive means and the rail at a known position.

43. Apparatus for deriving potential signals from flux fields adjacent to a rail lying in track comprising a frame positioned between two rail engaging supports, a flux responsive means reciprocatable adjacent the rail between said rail engaging supports, means for reciprocating said flux responsive means, means for transmitting potential signals derived by the flux responsive means to visual presentation means, a non-magnetic sheet positioned between the flux responsive means and the rail, and a turn of wire laid on said sheet together with means for conducting through the wire a current of known amplitude.

44. Apparatus for deriving potential signals from flux fields adjacent to a rail lying in track comprising a carriage, a flux responsive means suspended from said carriage and adjacent to a rail, a second flux responsive means positioned on the carriage in advance of the first flux responsive means, means responsive to the second flux responsive means for attenuating all potential signals derived by the first flux responsive means in response to flux fields adjacent the rail, and means for reciprocating substantially parallel to the rail the first flux responsive means with respect to the carriage.

45. Apparatus for deriving potential signals from flux fields adjacent a rail lying in track comprising a frame positioned between two rail engaging supports, a guide supported on said frame and extending along a line connecting the rail engaging supports, a pair of spaced shafts positioned substantially at right angles to said guide, sprockets on said shafts adjacent to the guide, a closed chain over said sprockets, a flux responsive means reciprocatable along said guide and fastened to one of the chain links, means for rotating one of said sprockets at a constant speed whereby the flux responsive means reciprocates at a constant speed excepting when its holding link is moving around one of the sprockets, a circuit connecting said flux responsive means to means for visually presenting potential signals derived thereby, and means for disabling said circuit when the flux responsive means holding link is moving around one of the sprockets, said means comprising a disc mounted on one of said shafts, a grounding switch for said circuit, a lever normally holding said grounding switch in closed position, said lever engaging said disc, and a shoulder on said disc having a length with respect to the balance of the circumference of the disc proportional to a selected portion of the forestroke or backstroke of the flux responsive means to the complete length of the chain.

46. That improvement in methods of locating a dangerous flaw in those portions of a magnetized rail immediately adjacent to and lying inside of the joint bars at a rail joint which comprises repeatedly moving a flux responsive means along and substantially parallel to the rail at the joint to produce potential signals, conducting the potential signals through amplification means to visible signal presentation means, and grounding the flux responsive means when it moves into the strong field adjacent the abutting ends of the two rails at the joint, whereby the exceptionally powerful signal which would be derived by moving the flux responsive means through the flux field of high density adjacent the end of the rail will not be conducted to the amplification means.

47. In apparatus for detecting flaws in rails lying in a roadbed, potential signal producing means comprising a core made of non-magnetic material disposed adjacent to the ball of the rail, and an elongated coil of wire wound on said non-magnetic core and disposed transversely to the length of the rail and having its axis disposed at substantially right angles to the top of the ball of the rail, said elongated coil having its ends projecting beyond each side of the ball of the rail whereby small lateral movements of the coil with respect to the rail will not substantially alter the potential signal producing characteristics of the elongated coil.

48. In apparatus for detecting flaws in rails lying in a roadbed, potential signal producing means comprising a core made of non-magnetic material disposed adjacent to the ball of the rail, and a pair of coils wound in series opposition on said non-magnetic core and disposed transversely to the length of the rail, said coils having their ends projecting beyond each side of the ball of the rail whereby small lateral movements of the coils with respect to the rail will not substantially alter the potential signal producing characteristics of the coils.

49. Apparatus for detecting flaws in rails lying in track comprising means for energizing a rail so as to produce flux fields thereabout, a flux responsive means having a length longitudinal of a rail of less than the length of a flux field created by a transverse internal fissure, means for moving the flux responsive means along the rail to produce potential signals which resultantly will have one positive and one negative component for each transverse fissure flux field traversed by the flux responsive means, means for full wave rectifying said potential signals, and means for visibly presenting both halves of said potential signals.

50. Apparatus for detecting flaws in rails lying in track comprising means for energizing a rail so as to produce flux fields thereabout, a flux responsive means having a length longitudinal of a rail of less than the length of a flux field created by a typical transverse internal fissure, means for moving the flux responsive means through said flux fields to produce potential signals having one positive and one negative component for each transverse fissure flux field traversed by the flux responsive means, means for phase inverting one component of said potential signal, and means for combining the other component of the potential signal before phase inversion with the phase inverted component so as to produce a single phase signal exactly representing both positive and negative components of the original potential signal, and means for visibly presenting said rectified signal.

51. Apparatus for detecting flaws in rails lying in track comprising means for energizing a rail so as to produce flux fields thereabout, a flux responsive means having a length longitudinal of a rail of less than the length of a flux field created by a transverse internal fissure, means for moving the flux responsive means along the rail to produce potential signals which resultantly will have one positive and one negative component for each transverse fissure flux field traversed by the flux responsive means, means for impressing said potential signals on one cathode of a twin vacuum tube, means for phase inverting said potential signals and impressing the phase inverted derivative on the other cathode of the same tube, means for combining the output of said twin vacuum tube on a single conductor, and means for visibly presenting the derivative of said signals.

52. Apparatus for detecting flaws in rails lying in track comprising means for energizing a rail so as to produce flux fields thereabout, a flux responsive means having a length longitudinal of a rail of less than the length of a flux field created by a transverse internal fissure, means for moving the flux responsive means along the rail to produce potential signals which resultantly will have one positive and one negative component for each transverse fissure flux field traversed by the flux responsive means, means for impressing said potential signals on one cathode of a twin vacuum tube, means for phase inverting said potential signals and impressing the phase inverted derivative on the other cathode of the same tube, a condenser in the circuit of each plate of the vacuum tube, means for combining the output of said two condensers, and means for visibly presenting potential signals derived from said combined output.

53. Apparatus for detecting flaws in rails lying in track comprising means for energizing a rail so as to produce flux fields thereabout, a flux responsive means having a length longitudinal of a rail of less than the length of a flux field created by a transverse internal fissure, means for moving the flux responsive means along the rail to produce potential signals which resultantly will have one positive and one negative component for each transverse fissure flux field traversed by the flux responsive means, means for impressing such potential signals on one grid of a twin vacuum tube, means for conducting the output of the circuit of the plate associated with said grid to one cathode of a twin vacuum tube and also to the other grid of the twin vacuum tube, means for conducting the output of the plate associated with the second grid of the twin vacuum tube to the other cathode of the twin vacuum tube, means for combining signals received by the two plates of the twin vacuum tube, and means for visibly presenting such signals.

54. Apparatus for detecting flaws in rails lying in track comprising means for energizing a rail so as to produce flux fields thereabout, a flux responsive means having a length longitudinal of a rail of less than the length of a flux field created by a transverse internal fissure, means for moving the flux responsive means along the rail to produce potential signals which resultantly will have one positive and one negative component for each transverse fissure flux field traversed by the flux responsive means, means for impressing such potential signals on one grid of a twin vacuum tube, a circuit carrying a selected potential with respect to ground connecting the plate associated with said grid of the twin vacuum tube through a condenser to one cathode of a twin vacuum tube, a second circuit connecting said plate circuit to the second grid of the twin vacuum tube, means in the said second circuit for reducing or amplifying potential signals derived from the first circuit to the same value as the potential signal impressed on the first grid, a third circuit connecting the second plate of the twin vacuum tube through a condenser to the second cathode of the twin vacuum tube, means for impressing like voltages on the tube plates of the twin vacuum tube, means for combining potential signal derivatives received by said plates, and means for visibly presenting said potential signal derivatives.

55. Apparatus for detecting flaws in rails lying in track comprising means for energizing a rail so as to produce flux fields thereabout, a flux responsive means having a length longitudinal of a rail of less than the length of a flux field created by a transverse internal fissure, means for moving the flux responsive means along the rail to produce potential signals which resultantly will have one positive and one negative component for each transverse fissure flux field traversed by the flux responsive means, means for impressing such potential signals on one grid of a twin vacuum tube, a circuit carrying a selected potential with respect to ground connecting the plate associated with said grid of the twin vacuum tube through a condenser to one cathode of a twin vacuum tube, a second circuit connecting said plate circuit to the second grid of the twin vacuum tube, a potentiometer in the said second circuit for reducing or amplifying potential signals derived from the first circuit to the same value as the potential signal impressed on the first grid, a third circuit connecting the second plate of the twin vacuum tube through a condenser to the second cathode of the twin vacuum tube, means for impressing like voltages on the tube plates of the twin vacuum tube, means for combining potential signal derivatives received by said plates, and means for visibly presenting said potential signal derivatives.

56. Appartus for detecting flaws in rails lying in track comprising means for energizing a rail so as to produce flux fields thereabout, means for producing potential signals derived from flux fields adjacent to a rail, means for impressing such potential signals on the cathode of a vacuum tube, means for holding the cathode of said tube normally at ground potential, adjustable means for impressing a selected potential on the plate of said tube to establish a differential against tube conductivity between the cathode and the plate whereby the plate circuit will show a potential due to flow of current through the tube only when a potential signal of a selected high amplitude has reached the cathode of the vacuum tube, and means for visibly presenting the output of said plate circuit.

57. Apparatus for detecting flaws in rails lying in track comprising means for energizing a rail so as to produce flux fields thereabout, means for producing a potential signal having only one negative and only one positive component for each internal transverse fissure flux field traversed by a pick-up, means for impressing such potentials on one cathode of a twin vacuum tube and for impressing a phase inverted derivative of such potential signals on the other cathode of a twin vacuum tube, adjustable means for impressing a selected potential on the plates of said twin vacuum tube to render the tube non-conductive, and means for visibly presenting potential signal derivatives received on the plate circuits.

58. Apparatus for visibly presenting magnetic flux fields adjacent to a magnetized rail lying in track comprising means for deriving potential signals from said flux fields, a cathode ray tube means for amplifying said potential signals to a potential capable of deflecting the beam of a cathode ray tube on its screen by a readily visible extent, a conductor connecting the output of the amplifying means to a cathode loaded coupling stage, a vacuum tube having as plate and a cathode, a conductor connecting the plate of the vacuum tube to the plate of said cathode loaded coupling stage, means for providing said vacuum tube with a potential difference in favor of conductivity between its cathode and its plate, a conductor connecting the cathode of the vacuum tube to one set of plates of the cathode ray tube whereby those voltages of any potential signals reaching the plate of the vacuum tube from the cathode loaded coupling stage and having an amplitude sufficiently great to render the vacuum tube non-conductive will not produce a derivative in the output of the vacuum tube nor increase the potential on the connected plates of the cathode ray tube.

59. Apparatus for visibly presenting magnetic flux fields adjacent to a magnetized rail lying in track comprising means for deriving potential signals from said flux fields, a cathode ray tube, means for amplifying said potential signals to a potential capable of deflecting the beam of the cathode ray tube on its screen by a readily visible extent, a conductor for carrying the amplified potential signals to a means for converting the potential signals to a character negative with respect to ground, a conductor for carrying the negative potential signals to the plate of a vacuum tube, a conductor connecting the plate of the vacuum tube to a condenser, a conductor connecting the condenser to one set of plates of the cathode ray tube, and means for creating a potential difference in favor of the conductivity of the vacuum tube between the cathode and the plate whereby those voltages of a negative potential signal exceeding the potential required to render the tube non-conductive will not produce a derivative in the potential signal passed on by the condenser to the plates of the cathode ray tube.

60. Apparatus for visibly presenting magnetic flux fields adjacent to a magnetized rail lying in track comprising means for deriving potential signals from said flux fields, a cathode ray tube, means for amplifying said potential signals to a potential capable of deflecting the beam of the cathode ray tube on its screen by a readily visible extent, a conductor for carrying the amplified potentials to a means for converting the potential signals to a character negative with respect to ground, a conductor for carrying the negative potential signals to the plate of a vacuum tube, a conductor connecting the plate of the vacuum tube to a condenser, a conductor connecting the condenser to one set of plates of the cathode ray tube and means for creating a potential difference in favor of the conductivity of the vacuum tube between the cathode and the plate whereby that portion of a negative potential signal exceeding the potential required to render the tube non-conductive will not produce a derivative in the potential signal passed on by the condenser to the plates of the cathode ray tube, said means comprising a source of positive potential, a conductor from said source of positive potential connected to the cathode of the vacuum tube, there being a potentiometer positioned in said conductor for varying the potential on the cathode, and a second conductor positioned between the source of positive potential and the plate of the vacuum tube, whereby the potential difference between the cathode and the plate in favor of conductivity may be varied to suit incoming negative potential signals from the cathode loaded coupling stage.

61. In the field of depicting on a visual presentation means of limited size changes in magnetic flux density in flaw flux fields adjacent to a magnetized rail lying in track wherein as a factual matter the difference between the density varying from normal of a flux field caused by the smallest dangerous fissure is about one-fiftieth to one-hundredth of the density of the flux field changes caused by a rail joint, that improvement in methods of visibly presenting the signals which comprises the steps of amplifying all of the signals to a point such that the smallest potential signal produced by a dangerous fissure may be readily seen on the visual presentation means, and of thereafter cutting off the upper voltage components of all potential signals above a selected potential, whereby the range of the visual presentation means need not be fifty or one hundred to one but considerably less.

62. Apparatus for detecting flaws in magnetized rails lying in a roadbed comprising means for moving a flux responsive means through flux fields adjacent to the rail to produce potential signals, a second flux responsive means positioned in advance of the first flux responsive means and movable with it in fixed relationship thereto, means responsive to the second flux responsive means encountering a flux field of a predetermined magnitude such as occurs adjacent to a rail joint for attenuating all of the potential signals derived by the first flux responsive means, a cathode ray tube, means for causing the beam of the cathode ray tube to traverse a path, and means for impressing both potential signals and attenuated potential signals on said tube beam so as to deflect it at substantially right angles to the path.

63. The method of visibly presenting potential signals derived from both small fissures and rail joints in magnetized rails lying in track which comprises the steps of moving a flux responsive means through the flux fields adjacent to the rails to produce potential signals, of introducing all potential signals to an amplifier of sufficient power to cause a potential signal derived from the weakest flux field desired to be studied to deflect the beam of a cathode ray tube by a distance readily discernible to the eye, impressing said potential signals on the beam of the cathode ray tube in such a way as to cause the beam to make line departure from a normal path, while the flux responsive means is traversing a flux field of a predetermined strength such as that which occurs adjacent to a rail joint, attenuating all potential signals derived during such traverse before introducing them to the amplifier.

64. The method of visibly presenting potential signals derived from both small fissures and rail joints in magnetized rails lying in track which comprises the steps of moving a flux responsive means through the flux fields adjacent to the rails to produce potential signals, of introducing all potential signals to an amplifier of sufficient power to cause a potential signal derived from the weakest flux field which it is desired to study to have a first selected amplitude sufficient to deflect the beam of a cathode ray tube by a distance readily discernible to the eye, limiting the maximum potential of all amplified potential signals to a second selected amplitude above said first selected amplitude, impressing the resulting potential signals on a cathode ray tube to produce deflections of the beam thereof in proportion to the amplitude of said signals and attenuating all potential signals derived from such movement before introducing them to the amplifier at all times when the flux responsive means is traversing a flux field of a predetermined strength such as that which occurs adjacent to a rail joint.

65. Apparatus for detecting flaws in magnetized rails lying in a roadbed comprising flux responsive means, means for moving the flux responsive means through flux fields adjacent to the rail to produce in the flux responsive means potential signals, a cathode ray tube, means for presenting said signals in visible form on the screen of the cathode ray tube, a second flux responsive means positioned in advance of the first flux responsive means and movable with it in fixed relationship thereto, and means responsive to the second pick-up encountering a flux field of a predetermined magnitude such as occurs adjacent to a rail joint for attenuating all of the potential signals derived by the first flux responsive means, said means comprising an amplifier for increasing the voltage of potential signals derived from the second flux responsive means, and means responsive to those potential signals derived by the second flux responsive means having a selected high amplitude for grounding the first pick-up through a variable resistance.

66. Apparatus for detecting flaws in magnetized rails lying in a roadbed comprising flux responsive means, means for moving the flux responsive means through flux fields adjacent to the rail to produce in the flux responsive means potential signals, a cathode ray tube, means for presenting said signals in visible form on the screen of the cathode ray tube, a second flux responsive means positioned in advance of the first flux responsive means and movable with it in fixed relationship thereto, and means responsive to the second flux responsive means encountering a flux field of a predetermined magnitude such as occurs adjacent to a rail joint for attenuating all of the potential signals derived by the first flux responsive means, said means comprising an amplifier for increasing the voltage of the potential signals derived from the second flux responsive means, a relay circuit actuatable only by potential signals of a predetermined high intensity, and a load circuit for the relay connecting the amplifier line of the first flux responsive means through a variable resistance to ground, whereby closing of the relay will ground a portion of the potential signals derived by the first flux responsive means depending upon the potentiometer's position and resulting in attenuation of all potential signals derived by the first flux responsive means.

67. Apparatus for detecting flaws in magnetized rails lying in a roadbed comprising flux responsive means, means for moving the flux responsive means through flux fields adjacent to the rail to produce in the flux responsive means potential signals, a cathode ray tube, means for presenting said signals in visible form on the screen of a cathode ray tube, a second flux responsive means positioned in advance of the first flux responsive means and movable with it in fixed relationship thereto, and means responsive to the second flux responsive means encountering a flux field of a predetermined magnitude such as occurs adjacent to a rail joint for attenuating all of the potential signals derived by the first flux responsive means, said means comprising a stage for amplifying potential signals derived by the second flux responsive means, a stage for full wave rectifying such potential signals, a relay circuit actuatable in response to potential signals derived by the second flux responsive means exceeding a selected amplitude, and a load circuit through the relay connecting the amplifier side of the first flux responsive means through a variable potentiometer to ground whereby potential signals derived by the first flux responsive means will be attenuated to a point determined by the potentiometer.

68. Apparatus for detecting flaws in magnetized rails lying in a roadbed comprising flux responsive means, means for moving the flux responsive means through flux fields adjacent to the rail to produce in the flux responsive means potential signals, a cathode ray tube, means for presenting said signals in visible form on the screen of the cathode ray tube, a second flux responsive means positioned in advance of the first flux responsive means and movable with it in fixed relationship thereto, and means responsive to the second flux responsive means encountering a flux field of a predetermined magnitude such as occurs adjacent to a rail joint for attenuating all of the potential signals derived by the first flux responsive means, said means comprising a stage for amplifying the second flux responsive means potential signals, a stage for full wave rectifying said potential signals, a gas tube having its plate connected to a relay circuit including its armature and a closed contact when the relay is open to a source of current and having its grid connected to the output of the rectification stage, and a load circuit through the relay connecting the amplification side of the first flux responsive means through a potentiometer to ground whereby when a signal of selected intensity reaches the grid of the gas tube, the tube becomes conductive and closes the relay, thereby attenuating in accordance with the position of the potentiometer the potential signals derived by the first flux responsive means and also thereby opening its own circuit and rendering it non-conductive thereby restoring the relay to its original position.

69. Apparatus for detecting flaws in magnetized rails lying in a roadbed comprising flux responsive means, means for moving the flux responsive means through flux fields adjacent to the rail to produce in the flux responsive means potential signals, means for presenting said signals in visible form on the screen of a cathode ray tube, a second flux responsive means positioned in advance of the first flux responsive means and movable with it in fixed relationship thereto, and means responsive to the second flux responsive means encountering a flux field of a predetermined magnitude such as occurs adjacent to a rail joint for attenuating all of the potential signals derived by the first flux responsive means, said means comprising a stage for amplifying the second flux responsive means potential signals, a gas tube having its grid connected to the output of the full wave rectification stage and having its cathode connected to ground and its plate connected through the coil of a relay and through closed contacts to a source of electrical energy, there being a condenser in the last named circuit in parallel with the relay coil, and a load circuit for the relay connecting the amplification side of the first flux responsive means through a potentiometer to ground whereby when a potential signal of a predetermined size reaches the grid of the gas tube and renders the gas tube conductive, the load circuit is instantly closed and attenuates the first flux responsive means potential signals in accordance with the setting of the potentiometer while the circuit through the gas tube is instantly broken although the relay is temporarily held closed during the discharging of the condenser.

70. Apparatus for detecting flaws in magnetized rails lying in a roadbed comprising flux responsive means, means for moving the flux responsive means through flux fields adjacent to the rail to produce in the flux responsive means potential signals, means for presenting said signals in visible form on the screen of a cathode ray tube, a second flux responsive means positioned in advance of the first flux responsive means and movable with it in fixed relationship thereto, and means responsive to the second flux responsive means encountering a flux field of a predetermined magnitude such as occurs adjacent to a rail joint for attenuating all of the potential signals derived by the first flux responsive means, said means comprising a gas tube having its grid connected to the output of the second flux responsive means and being positioned in a circuit from ground to the tube to a relay coil to a source of power, said relay having a load circuit connecting the amplifier side of the first flux responsive means through a potentiometer to ground whereby rendering the gas tube conductive will close the relay and attenuate potential signals derived by the first flux responsive means in accordance with the position of said potentiometer.

71. That improvement in methods of checking the condition of the flux responsive means, the amplification means and the visual presentation means of fissure detecting apparatus for use with respect to rails lying in track which comprises the steps of conditioning the apparatus so that the visual presentation means exhibits a signal of visible amplitude while the flux responsive means traverses a fissure flux field of known amplitude, of positioning adjacent the path of the flux responsive means a means for creating a flux field of varying intensities, and of adjusting the strength of this flux field until it produces in the visual presentation means a signal having the same amplitude as that of the signal from the fissure flux field, whereby the second created field which has a known strength may be used in the field to check the condition of the apparatus.

72. In the practice of detecting fissures in magnetized rails wherein a flux responsive means is moved at a substantially constant speed longitudinally of the ball of the rail, the method of comparing the intensity of the zones of opposite polarity in said flux fields which comprises the steps of moving a flux responsive means through an approach zone of a flux field to produce a potential signal of one polarity, and then moving the flux responsive means through a departure zone of the flux field to produce a potential signal of opposite polarity, of full wave rectifying said potential signals to produce potential signals of a single polarity, of impressing said full wave rectifying signals upon one set of plates of a cathode ray tube and of applying potentials to the other set of plates of a cathode ray tube so as to cause the beam to move along a path, whereby departures of the beam from the selected path due to the action of the potential signals will always be on the same side of the path.

73. In the practice of detecting fissures in magnitized rails wherein a flux responsive means is moved at a substantially constant speed longitudinally adjacent the ball of the rail, the method of segregating short fissure flux fields from longer burn spot flux fields and magnetic spot flux fields each of which have an approach zone and a departure zone of opposite polarity, which comprises the steps of moving a flux responsive means substantially through the approach zone only of a fissure flux field to produce a potential signal of one polarity, of then moving the flux responsive means substantially through the departure zone only of the fissure flux field to produce a potential signal of opposite polarity, of moving this same flux responsive means through the approach and departure zones of other flaw flux fields adjacent the rail, and of delineating for all potential signals a visible line signal in one direction as along the X-axis at a speed sufficient to traverse a readily visible distance when the flux responsive means moves completely through the fissure flux field and along the Y-axis at a speed proportional to the amplitude of the potential signals, whereby the visible signal from a fissure flux field will have a readily perceptible shorter time duration than the visible signal derived from burn spot and magnetic spot flux fields.

74. In the practice of detecting fissures in magnetized rails wherein a flux responsive means is moved at a substantially constant speed longitudinally adjacent the ball of the rail, the method of segregating short fissure flux fields from longer burn spot flux fields and magnetic spot flux fields each of which have an approach zone and a departure zone of opposite polarity, which comprises the steps of moving a flux responsive means substantially through the approach zone only of a fissure flux field to produce a potential signal of one polarity, of then moving the flux responsive means substantially through the departure zone only of the fissure flux field to produce a potential signal of opposite polarity, of moving this same flux responsive means through the approach and departure zones of other flaw flux fields adjacent the rail, of amplifying all potential signals, of impressing said potential signals upon one set of plates of a cathode ray tube, and of applying potentials to the other set of plates of the cathode ray tube so as to cause the beam to move at a rate of speed such that the beam will traverse a visible distance when the flux responsive means moves completely through a fissure flux field, whereby the visible signal from a fissure flux field will have a readily perceptible shorter time duration than the visible signal derived from burn spot and magnetic spot flux fields.

75. In the practice of detecting fissures in rails which have been magnetized longitudinally so that the lines of flux run lengthwise thereof wherein a flux responsive means is moved at a substantially constant speed longitudinally adjacent the ball of the rail, the method of segregating short fissures flux fields from longer burn spot flux fields and magnetic spot flux fields each of which have an approach zone and a departure zone of opposite polarity, which comprises the steps of moving a flux responsive means substantially through the approach zone only of a fissure flux field to produce a potential signal of one polarity, of then moving the flux responsive means substantially through the departure zone only of the fissure flux field to produce a potential signal of opposite polarity, of moving this same flux responsive means through the approach and departure zones of other flaw flux fields adjacent the rail, and of delineating for all potential signals a visible line signal in one direction as along the X-axis at a speed sufficient to traverse a readily visible distance when the flux responsive means moves completely through the fissure flux field and along the Y-axis at a speed proportional to the amplitude of the potential signals, whereby the visible signal from a fissure flux field will have a readily perceptible shorter time duration than the visible signal derived from burn spot and magnetic spot flux fields.

76. In the practice of detecting fissures in rails which have been magnetized longitudinally so that the lines of flux run lengthwise thereof wherein a flux responsive means is moved at a substantially constant speed longitudinally adjacent the ball of the rail, the method of segregating short fissure flux fields from longer burn spot flux fields and magnetic spot flux fields each of which have an approach zone and a departure zone of opposite polarity, which comprises the steps of moving a flux responsive means substantially through the approach zone only of a fissure flux field to produce a potential signal of one polarity, of then moving the flux responsive means substantially through the departure zone only of the fissure flux field to produce a potential signal of opposite polarity, of moving this same flux responsive means through the approach and departure zones of other flaw flux fields adjacent the rail, of amplifying all potential signals, of impressing said potential signals upon one set of plates of a cathode ray tube, and of applying potentials to the other set of plates of the cathode ray tube so as to cause the beam to move at a rate of speed such that the beam will traverse a visible distance when the flux responsive means moves completely through a fissure flux field, whereby the visible signal from a fissure flux field will have a readily perceptible shorter time duration than the visible signal derived from burn spot and magnetic spot flux fields.

77. Flaw detection apparatus for segregating short fissure flux fields from longer burn spot and magnetic spot flux fields in magnetized rails, each of which fields have an approach zone and a departure zone of opposite polarity, comprising a car movable along rails lying in track, a flux responsive means having a length longitudinally of the rail of less than substantially one-half the length of a typical fissure flux field mounted on the car adjacent a rail, means for moving the car along the track so that the flux responsive means in moving adjacent the magnetized rail will produce potential signals, means for delineating a line signal along a predetermined path at a speed such that while the flux responsive means moves completely through a fissure flux field a distance having a visually perceptible length will be traversed by the line delineating means, and means energized from said flux responsive means for deflecting the line delineating means from its predetermined path by a distance proportional to the amplitude of the potential signals, whereby the visible signal from a fissure flux field will have a readily perceptible shorter time duration than the visible signal derived from burn spot and magnetic spot flux fields.

78. Flaw detection apparatus for segregating short fissure flux fields from longer burn spot and magnetic spot flux fields in magnetized rails, each of which fields have an approach zone and a departure zone of opposite polarity, comprising a car movable along rails lying in track, a flux responsive means having a length longitudinally of the rail of less than one-half the length of a typical fissure flux field mounted on the car adjacent a rail, means for moving the car along the track so that the flux responsive means in moving adjacent the magnetized rail will produce potential signals, a cathode ray tube having two pairs of plates disposed at right angles to each other, means for impressing potentials on one pair of plates of the cathode ray tube so that the tube beam will move across the screen at a speed such that it will traverse a perceptible distance when the flux responsive means moves completely through a fissure flux field, and a conductor connecting the flux responsive means to the other pair of plates of the cathode ray tube, whereby the visible signal from a fissure flux field will have a readily perceptible shorter time duration than the visible signal derived from burn spot and magnetic spot flux fields.

79. Flaw detection apparatus for segregating short fissure flux fields from longer burn spot and magnetic spot flux fields in magnetized rails, each of which fields have an approach zone and a departure zone of opposite polarity, comprising a car movable along rails lying in track, a flux responsive means having a length longitudinally of the rail of less than substantially one-half the length of a typical fissure flux field mounted on the car adjacent a rail, a second flux responsive means mounted above and connected in series opposition with the first flux responsive means, means for moving the car along the track so that the flux responsive means in moving adjacent the magnetized rail will produce potential signals, means for delineating a line signal along a predetermined path at a speed such that while the flux responsive means moves completely through a fissure flux field a distance having a visually perceptible length will be traversed by the line delineating means, and means energized from the output of said two flux responsive means for deflecting the line delineating means from its predetermined path by a distance proportional to the amplitude of the potential signals, whereby the visible signal from a fissure flux field will have a readily perceptible shorter time duration than the visible signal derived from burn spot and magnetic spot flux fields.

80. Flaw detection apparatus for segregating short fissure flux fields from longer burn spot and magnetic spot flux fields in magnetized rails, each of which fields have an approach zone and a departure zone of opposite polarity, comprising a car movable along rails lying in track, a flux responsive means having a length longitudinally of the rail of less than substantially one-half the length of a typical fissure flux field mounted on the car adjacent a rail, said flux responsive means having a non-magnetic core, means for moving the car along the track so that the flux responsive means in moving adjacent the magnetized rail will produce potential signals, means for delineating a line signal along a predetermined path at a speed such that while the flux responsive means moves completely through a fissure flux field a distance having a visually perceptible length will be traversed by the line delineating means, and means energized from said flux responsive means for deflecting the line delineating means from its predetermined path by a distance proportionate to the amplitude of the potential signals, whereby the visible signal from a fissure flux field will have a readily perceptible shorter time duration than the visible signal derived from burn spot and magnetic spot flux fields.

81. Flaw detection apparatus for segregating short fissure flux fields from longer burn spot and magnetic spot flux fields in magnetized rails, each of which fields have an approach zone and a departure zone of opposite polarity, comprising a car movable along rails lying in track, a flux responsive means having a length longitudinally of the rail of less than substantially one-half the length of a transverse fissure flux field mounted on the car adjacent a rail, said flux responsive means having a non-magnetic core, a second flux responsive means having a non-magnetic core mounted above and connected in series opposition with the first flux responsive means, means for moving the car along the track so that the flux responsive means in moving adjacent the magnetized rail will produce potential signals, means for delineating a line signal along a predetermined path at a speed such that while the flux responsive means move completely through a fissure flux field a distance having a visually perceptible length will be traversed by the line delineating means, and means energized from the output of said two flux responsive means for deflecting the line delineating means from its predetermined path by a distance proportional to the amplitude of the potential signals, whereby the visible signal from a fissure flux field will have a readily perceptible shorter time duration than the visible signal derived from burn spot and magnetic spot flux fields.

82. A fissure detector for rails lying in track comprising a car mounted on wheels, power means on said car, a positive drive connection between the power means with a wheel of the car, a tachometer generator, a positive connection between the power means and the tachometer generator, a cathode ray tube, rotatable means for causing the beam of the cathode ray tube to delineate a path on the tube screen, a synchronous motor driving said rotatable means, a circuit connecting the synchronous motor to the tachometer generator, a flux responsive means mounted adjacent the rail to produce potential signals, means for amplifying these potential signals, means for impressing these potential signals upon one set of plates of the cathode ray tube, means for opening the drive connection between the power means and the wheel, and means for moving the flux responsive means along the rail irrespective of movement of the car along the rail, whereby the tachometer generator may be used to function the equipment driving the cathode ray tube irrespective of whether the car is moving along the track or is standing still deriving potential signals from the moving flux responsive means.

ROYAL E. FRICKEY.
CHESTER W. McKEE.